United States Patent
Shen et al.

(10) Patent No.: US 12,501,200 B2
(45) Date of Patent: Dec. 16, 2025

(54) HEADSET, HEADSET ASSEMBLY, AND RELATED METHOD

(71) Applicant: HUAWEI TECHNOLOGIES CO., LTD., Guangdong (CN)

(72) Inventors: Chengjie Shen, Shanghai (CN); Dexin Xu, Shenzhen (CN); Yinhu Zhu, Shanghai (CN); Xun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 18/547,875

(22) PCT Filed: Feb. 26, 2022

(86) PCT No.: PCT/CN2022/078121
§ 371 (c)(1),
(2) Date: Aug. 24, 2023

(87) PCT Pub. No.: WO2022/179633
PCT Pub. Date: Sep. 1, 2022

(65) Prior Publication Data
US 2024/0137686 A1   Apr. 25, 2024
US 2024/0236544 A9   Jul. 11, 2024

(30) Foreign Application Priority Data

Feb. 27, 2021 (CN) .......................... 202110221281.3
Aug. 18, 2021 (CN) .......................... 202110950428.2

(51) Int. Cl.
A61F 11/12     (2006.01)
H04R 1/10      (2006.01)

(52) U.S. Cl.
CPC ......... *H04R 1/1041* (2013.01); *H04R 1/1008* (2013.01); *H04R 1/1016* (2013.01); *H04R 1/105* (2013.01); *H04R 1/1058* (2013.01)

(58) Field of Classification Search
CPC ......... A61F 11/12; B29C 33/42; C08G 63/16; F03G 7/06143; F03G 7/0616;
(Continued)

(56) References Cited

U.S. PATENT DOCUMENTS 6,810,987 B1 * 11/2004 DeKalb ................. H04R 1/105
                                                          381/328
7,362,875 B2 *  4/2008 Saxton ................ H04R 25/658
                                                          381/328
(Continued)

FOREIGN PATENT DOCUMENTS

CN       2888781 Y    4/2007
CN     202740222 U    2/2013
(Continued)

*Primary Examiner* — Gerald Gauthier

(57) ABSTRACT

This application discloses a headset, where the headset includes an ear housing and an earbud fastened to the ear housing, the earbud includes an earbud body and an SMA component embedded in the earbud body, and the earbud can automatically adjust a shape to adapt to a wearing environment. This application further discloses another headset, where the headset includes a headband and earmuffs connected to the headband, the earmuff includes an ear housing, an earpad fastened to the ear housing, and an SMA component embedded in the earpad, and the earpad can automatically adjust a shape to adapt to a wearing environment. The headset has high wearing comfort. This application further discloses a headset assembly including the foregoing headset and a related method.

21 Claims, 46 Drawing Sheets

(58) Field of Classification Search
CPC ....... F03G 7/0633; G06F 3/044; H04R 1/083;
H04R 1/1008; H04R 1/1016; H04R
1/1041; H04R 1/105; H04R 1/1058;
H04R 1/1066; H04R 25/456; H04R
25/554; H04R 25/652; H04R 25/659;
H04R 2201/10; H04R 1/025; H04R
5/033; H04R 25/658; C08K 5/06; H01R
13/2428
See application file for complete search history.

(56) References Cited

U.S. PATENT DOCUMENTS

| | | | | |
|---|---|---|---|---|
| 7,778,434 | B2 * | 8/2010 | Juneau | H04R 25/659 |
| | | | | 381/328 |
| 8,111,864 | B2 * | 2/2012 | Oliveira | H04R 1/1058 |
| | | | | 381/328 |
| 8,582,755 | B2 * | 11/2013 | Bradford | H04R 1/1058 |
| | | | | 379/430 |
| 8,867,758 | B2 * | 10/2014 | Terlizzi | H01R 13/2428 |
| | | | | 381/74 |
| 9,179,211 | B2 * | 11/2015 | Kirkpatrick | H04R 1/1016 |
| 9,628,890 | B2 * | 4/2017 | Bibl | H04R 1/1041 |
| 9,635,452 | B2 * | 4/2017 | Cheng | H04R 1/1075 |
| 10,149,038 | B2 * | 12/2018 | Kirkpatrick | A61F 11/08 |
| 10,291,974 | B2 * | 5/2019 | Scheimberg | H04R 1/1016 |
| 10,299,025 | B2 * | 5/2019 | Sakai | H04R 1/1041 |
| 10,531,174 | B2 * | 1/2020 | Prevoir | C08K 5/06 |
| 10,623,861 | B2 * | 4/2020 | Prevoir | H04R 5/0335 |
| 10,827,246 | B1 * | 11/2020 | Oommen | H04R 1/1041 |
| 10,827,252 | B2 * | 11/2020 | Trainer | H04R 1/105 |
| 10,937,407 | B2 * | 3/2021 | Goldstein | A61B 5/6817 |
| 11,782,287 | B2 * | 10/2023 | Eddington | F03G 7/0616 |
| | | | | 348/207.99 |
| 12,037,991 | B2 * | 7/2024 | Easton | F03G 7/062 |
| 2004/0258263 | A1 | 12/2004 | Saxton et al. | |
| 2006/0147079 | A1 * | 7/2006 | Jaakkola | H04R 5/033 |
| | | | | 381/374 |
| 2007/0183613 | A1 | 8/2007 | Juneau et al. | |
| 2008/0166005 | A1 * | 7/2008 | Terlizzi | H04R 1/083 |
| | | | | 381/375 |
| 2010/0316229 | A1 * | 12/2010 | Bibl | G06F 3/044 |
| | | | | 381/74 |
| 2011/0268308 | A1 * | 11/2011 | Vasquez | H04R 1/1016 |
| | | | | 381/380 |
| 2012/0002834 | A1 * | 1/2012 | Shahpuri | H04R 1/083 |
| | | | | 381/375 |
| 2012/0057739 | A1 * | 3/2012 | Smith | H04R 1/105 |
| | | | | 381/379 |
| 2015/0146909 | A1 * | 5/2015 | Kirkpatrick | B29C 33/42 |
| | | | | 381/380 |
| 2015/0230019 | A1 * | 8/2015 | Sakai | H04R 1/1041 |
| | | | | 381/74 |
| 2016/0150310 | A1 * | 5/2016 | Bakalos | H04R 1/1041 |
| | | | | 381/372 |
| 2017/0041701 | A1 * | 2/2017 | Cheng | H04R 1/105 |
| 2017/0112671 | A1 * | 4/2017 | Goldstein | H04R 25/554 |
| 2018/0109861 | A1 | 4/2018 | Prevoir et al. | |
| 2018/0184191 | A1 * | 6/2018 | Kim | H04R 1/1041 |
| 2018/0213315 | A1 * | 7/2018 | Kirkpatrick | A61F 11/12 |
| 2020/0077170 | A1 * | 3/2020 | Wexler | H04R 1/1016 |
| 2020/0077192 | A1 * | 3/2020 | Prevoir | C08G 63/16 |
| 2020/0084558 | A1 * | 3/2020 | Lindberg | H04R 25/652 |
| 2020/0100011 | A1 * | 3/2020 | Bruss | H04R 1/1016 |
| 2020/0136241 | A1 * | 4/2020 | Shriner | H04R 1/025 |
| 2020/0196044 | A1 * | 6/2020 | Tiefenau | H04R 25/456 |
| 2021/0263392 | A1 * | 8/2021 | Brown | F03G 7/0633 |
| 2022/0106941 | A1 * | 4/2022 | Easton | F03G 7/06143 |
| 2024/0137686 | A1 * | 4/2024 | Shen | H04R 1/1041 |
| 2024/0236544 | A9 * | 7/2024 | Shen | H04R 1/1008 |

FOREIGN PATENT DOCUMENTS

| | | |
|---|---|---|
| CN | 104093096 A | 10/2014 |
| CN | 104093097 A | 10/2014 |
| CN | 205144867 U | 4/2016 |
| CN | 108429971 A | 8/2018 |
| CN | 210820652 U | 6/2020 |
| CN | 111683320 A | 9/2020 |
| CN | 111935582 A | 11/2020 |
| JP | 2007180733 A | 7/2007 |
| JP | 2012075850 A | 4/2012 |
| WO | 2020021815 A1 | 1/2020 |

* cited by examiner

HEADSET, HEADSET ASSEMBLY, AND RELATED METHOD

CROSS-REFERENCE TO RELATED APPLICATIONS

This application is a national stage of International Application No. PCT/CN2022/078121, filed on Feb. 26, 2022, which claims priority to Chinese Patent Application No. 202110221281.3, filed on Feb. 27, 2021, and Chinese Patent Application No. 202110950428.2, filed on Aug. 18, 2021. All the aforementioned priority applications are hereby incorporated by reference in their entirety.

TECHNICAL FIELD

This application relates to the field of audio device technologies, and in particular, to a headset, a headset assembly, and a related method.

BACKGROUND

As a rigid demand in application scenarios such as music listening and calling by users, headsets are used quite frequently for long duration. As shown in FIG. 1, because shapes of parts such as ear canals and cavities of auricular concha of users are different, different people have different ear shapes. To meet a market requirement of different people with different ear shapes, headset manufacturers need to provide earbuds with various sizes for selection by users, to meet a requirement for wearing comfort. However, even if earbuds with various sizes are provided, it is still difficult to meet requirements of all users.

SUMMARY

This application provides a headset including at least one earbud and a headset assembly. The earbud includes an earbud body and an SMA component embedded in the earbud body. The earbud can automatically adapt to a wearing environment through deformation of the SMA component, so that the headset has high wearing comfort. This application further provides a manufacturing method for an earbud and a method for controlling deformation of an earbud.

This application provides a headset including at least one earmuff and a headset assembly. The earmuff includes an earpad and an SMA component embedded in the earpad. The earmuff can automatically adjust a wearing status by controlling deformation of the SMA component, so that the headset has high wearing comfort. This application further provides a method for controlling deformation of an earmuff.

According to a first aspect, this application provides a headset, including at least one ear housing and at least one earbud. The earbud includes a base, an earbud body, and an SMA component. The base is fastened to the ear housing. The earbud body includes a stationary portion and a contact portion. The contact portion is disposed around the stationary portion, the top of the contact portion is connected to the top of the stationary portion, and the bottom of the stationary portion is fastened to the base. The earbud body is made of an elastic material. The SMA component is embedded in the earbud body in an encircling manner. When a user wears the headset, the earbud body at least partially fits into an ear canal of the user, and the SMA component deforms at ear temperature, to drive the contact portion to abut against an ear canal wall of the user.

In this application, the earbud can sense the ear temperature of the user through the SMA component to adaptively deform, so that the earbud can adapt to a shape of the ear canal of the user and well fit to the ear canal wall. Therefore, the headset is applicable to different users and has a wide adaptability range, and there is no need to configure a plurality of types of earbuds. This reduces costs and improves convenience. In addition, because the earbud adapts to the shape of the ear canal of the user, the headset has high wearing comfort and high wearing stability, so that acoustic leakage caused by improper wearing by the user can also be avoided, to ensure sound quality and active noise cancellation of the headset.

In some possible implementations, the SMA component has phase transition temperature, the SMA component has an expanded form in an environment in which temperature is higher than or equal to the phase transition temperature, and the SMA component drives the earbud body to deform to an expanded form. In this case, an initial shape of the earbud body may be set to a shrunk form. When the headset is used in a normal temperature environment, the earbud body is in the shrunk form, and the SMA component is in a shrunk form. When the headset is in an environment in which temperature is higher than or equal to the phase transition temperature, the SMA component deforms to the expanded form, and drives the earbud body to expand, so that the earbud body deforms to the expanded form.

In some possible implementations, the phase transition temperature falls in a range of 36° C. to 40° C. For example, the phase transition temperature of the SMA component may be 36° C., 36.5° C., 37° C., or 37.3° C. The SMA component may start to deform and produce driving strain in an environment in which temperature (for example, approximately 30° C.) is close to the phase transition temperature.

In some possible implementations, the SMA component includes a plurality of SMA wires, the plurality of SMA wires are arranged at spacings in a circumferential direction of the earbud body, and each SMA wire extends from the bottom of the stationary portion to the bottom of the contact portion through the top of the stationary portion and the top of the contact portion.

In this application, the plurality of SMA wires of the SMA component are roughly arranged in an "umbrella" shape, so that the expanded form and the shrunk form of the SMA component are similar to an open state and a closed state of an umbrella, and are also similar to a deformation trend of the earbud body. In this way, the SMA component is still well bonded to the earbud body after deformation, to retain good adhesion between the SMA component and the earbud body after a plurality of times of expansion and shrinkage. This improves reliability of the earbud.

In some possible implementations, the SMA wire is a single-stranded wire. In this case, the SMA wire has a simple structure, is easy to implement, and has low costs.

In some possible implementations, the SMA wire is a double-stranded wire, and the two strands are connected to each other at the bottom of the contact portion.

In this implementation, because the SMA wire is in a double-stranded wire structure, structural strength of the SMA component is higher. This improves pressure resistance reliability of the earbud, reduces a risk that the SMA wire is depressed and cannot be recovered because the user accidentally applies extra pressure at a specific angle when using the headset, and improves structural reliability of the earbud. In addition, a connection structure between the SMA component and the earbud body is more stable. This helps improve structural reliability of the earbud.

In some possible implementations, the SMA component is a continuous single SMA wire, the SMA component includes a plurality of deformable parts, the plurality of deformable parts are arranged in a circumferential direction of the earbud body, and each deformable part extends from the bottom of the stationary portion to the bottom of the contact portion through the top of the stationary portion and the top of the contact portion.

In this implementation, the SMA component is disposed as an integrated continuous SMA wire. In this way, temperature variation coefficients of the plurality of deformable parts of the SMA component are the same, and temperature rise statuses of the plurality of deformable parts of the SMA component are the same or similar, so that the plurality of deformable parts deform at the same time, to better match the ear canal of the user and improve wearing comfort of the headset.

In some possible implementations, the SMA component includes a first SMA wire and a second SMA wire, both the first SMA wire and the second SMA wire are continuous SMA wires, and the first SMA wire and the second SMA wire are arranged in a nested manner and are spaced apart from each other. The first SMA wire includes a plurality of first deformable parts. The plurality of first deformable parts are arranged in a circumferential direction of the earbud body. Each first deformable part extends from the bottom of the stationary portion to the bottom of the contact portion through the top of the stationary portion and the top of the contact portion. The second SMA wire includes a plurality of second deformable parts. The plurality of second deformable parts are arranged in the circumferential direction of the earbud body. Each second deformable part extends from the bottom of the stationary portion to the bottom of the contact portion through the top of the stationary portion and the top of the contact portion.

Wire diameters of the second SMA wire and the first SMA wire may be the same or different. Phase transition temperature of the second SMA wire and the first SMA wire may be the same or different.

In some possible implementations, the SMA component is a continuous single SMA wire, the SMA component is located in the contact portion, and the SMA component is shaped like a spiral.

In some possible implementations, the SMA component is a continuous single SMA wire, the SMA component is located at the bottom of the contact portion, and the SMA component extends like a wave and is shaped like a ring.

In some possible implementations, the SMA component includes a first SMA wire and a second SMA wire. The first SMA wire has first phase transition temperature. The first SMA wire has an expanded form in an environment in which temperature is higher than or equal to the first phase transition temperature, and the first SMA wire drives the earbud body to deform to an expanded form. The second SMA wire has second phase transition temperature. The second phase transition temperature is higher than the first phase transition temperature. The second SMA wire has a shrunk form in an environment in which temperature is higher than or equal to the second phase transition temperature, and the second SMA wire drives the earbud body to deform to a shrunk form.

In this implementation, the SMA component can implement bidirectional deformation: expansion and shrinkage.

For example, in a high temperature environment, after the user opens a headset case, power may be supplied to heat a "heat shrinkable" wire, so that the earbud body is in the shrunk form, and the earbud can comfortably fit into the ear canal. After the user puts the earbud into the ear canal, heating for the "heat shrinkable" wire is stopped based on wearing detection, and a "heat expandable" wire is heated, so that the earbud body quickly expands to a position comfortable for the user. After heating is performed for a short period of time (for example, several seconds), internal temperature of the ear canal can also quickly reach 35° C. or above. In this case, heating for the "heat expandable" wire may be stopped to cope with a power consumption issue. For example, for the high temperature environment, when ambient temperature is higher than 35° C. at high temperature in summer, it may be determined that this environment is a high temperature environment.

For example, in a low temperature environment, after the user opens the headset case, the environment is at low temperature, and the earbud body is in the shrunk form, and the user can comfortably put the earbud into the ear canal. After the user puts the earbud into the ear canal, a "heat expandable" wire is heated based on wearing detection, so that the earbud body quickly expands to a position comfortable for the user. After heating is performed for a short period of time (for example, several seconds), internal temperature of the ear canal can also quickly reach 35° C. or above. In this case, heating for the "heat expandable" wire may be stopped to cope with a power consumption issue. For example, for the low temperature environment, when ambient temperature is lower than 0° C. at low temperature in winter, it may be determined that this environment is a low temperature environment.

In some possible implementations, both the first SMA wire and the second SMA wire are continuous SMA wires, and the first SMA wire and the second SMA wire are arranged in a nested manner and are spaced apart from each other. The first SMA wire includes a plurality of first deformable parts. The plurality of first deformable parts are arranged in a circumferential direction of the earbud body. Each first deformable part extends from the bottom of the stationary portion to the bottom of the contact portion through the top of the stationary portion and the top of the contact portion. The second SMA wire includes a plurality of second deformable parts. The plurality of second deformable parts are arranged in the circumferential direction of the earbud body. Each second deformable part extends from the bottom of the stationary portion to the bottom of the contact portion through the top of the stationary portion and the top of the contact portion.

In some possible implementations, the contact portion includes a plurality of contact regions and a plurality of recessed regions, the contact regions and the recessed regions are alternately arranged around the stationary portion, and the recessed regions are closer to the stationary portion relative to the contact regions.

In this implementation, when the earbud body deforms, deformation of the contact portion of the earbud body may be mainly implemented through deformation of the recessed region, and two adjacent contact regions may be close to or away from each other, so that the earbud body deforms more easily, and a deformation shape is controllable. This helps improve reliability of the earbud body.

In some possible implementations, a recess depth of the recessed region increases in a direction from the top of the contact portion to the bottom. During deformation of the earbud body, an amount of deformation at the bottom of the contact portion is greater than that at the top of the contact portion. The recess depth of the recessed region increases in the direction from the top of the contact portion to the bottom, so that deformation of the entire contact portion is easier to implement, and structural reliability of the earbud body is higher.

In some possible implementations, the earbud body is made of an elastic polymer material.

In some possible implementations, a coefficient of thermal conductivity of the earbud body may be greater than or equal to 0.1 W/(m·k).

In some possible implementations, a thickness of the earbud body falls in a range of 0.4 mm to 0.6 mm.

In some possible implementations, the earbud further includes a conductor, the conductor is fastened to the base, and the SMA component is electrically connected to the conductor. In this case, the SMA component may be connected to a circuit of the headset through the conductor, to implement circuit control on the SMA component.

In some possible implementations, the headset further includes a circuit board and a power supply chip fastened to the circuit board, and the power supply chip is electrically connected to the conductor and is configured to control a deformation status of the SMA component.

In some possible implementations, the headset further includes a temperature sensor and a microcontroller unit. The temperature sensor is fastened to the circuit board or the contact portion. The microcontroller unit is fastened to the circuit board, and the microcontroller unit is electrically connected to the temperature sensor and the power supply chip.

There may be one or more temperature sensors. The temperature sensor may be fastened to the circuit board and/or the contact portion of the earbud body. When the user wears the headset, a temperature sensor fastened to the contact portion of the earbud body may detect temperature in the ear canal, and a temperature sensor fastened to the circuit board may detect temperature outside the ear canal. Certainly, in some other embodiments, the temperature sensor may alternatively be fastened at another position on the headset, and may also detect temperature in the ear canal and/or temperature outside the ear canal.

The microcontroller unit may perform a subsequent operation based on data of the temperature in the ear canal and/or the temperature outside the ear canal; or may also perform processing such as averaging and correction on the temperature in the ear canal and/or the temperature outside the ear canal to obtain processed data, and then perform a subsequent operation based on the processed data.

In some possible implementations, the earbud body is made of an ultraviolet cured soft rubber material or a room temperature vulcanized silicone rubber material.

In this implementation, the earbud body is made of the ultraviolet cured soft rubber material or the room temperature vulcanized silicone rubber material, so that molding can be performed at low temperature, without affecting phase change effect or deformation of the SMA component during molding. Therefore, molding quality and a yield of the earbud are high.

According to a second aspect, this application further provides a headset, including a headband and two earmuffs. The two earmuffs are respectively connected to two ends of the headband. The earmuff includes an ear housing, an earpad, a first SMA component, and a second SMA component. The ear housing is connected to the headband. The earpad is fastened to the ear housing, and the earpad is made of a flexible material or an elastic material. The first SMA component is embedded in the earpad. When the first SMA component reaches phase transition temperature, the earpad is driven to deform to an expanded form. The second SMA component is embedded in the earpad. The second SMA component and the first SMA component are independent of each other. When the second SMA component reaches phase transition temperature, the earpad is driven to deform to a shrunk form.

In this application, the earmuff may control deformation statuses of the first SMA component and the second SMA component, so that a height of the earpad changes, and a depth of a cavity changes, to adjust pressure between the earpad and a surface of an ear of a user to a comfortable status. In this way, the headset has high wearing comfort. In addition, through repeated deformation of the first SMA component and the second SMA component, air in the cavity of the earmuff may also be exchanged with air in external space, to produce airflow. In this way, humid and hot air in the cavity of the earmuff is discharged, to reduce temperature and humidity in the cavity, alleviate a stuffy feeling during long-time wearing, and improve comfort.

In some possible implementations, the earpad is in a ring shape, the earpad and the ear housing constitute a cavity, the cavity has a first depth when the earpad is in the expanded form, the cavity has a second depth when the earpad is in the shrunk form, and the second depth is less than the first depth.

In some possible implementations, the earmuff further includes a circuit board, a power supply chip, a microcontroller unit, and a pressure sensor. The circuit board is mounted in the ear housing. The power supply chip and the microcontroller unit are fastened to the circuit board. The power supply chip is electrically connected to the first SMA component and the second SMA component, and is configured to control a deformation status of the first SMA component and the second SMA component. The pressure sensor is configured to detect pressure applied to the earpad. The microcontroller unit is electrically connected to the pressure sensor and the power supply chip.

In some possible implementations, the earmuff further includes a temperature and humidity sensor, the temperature and humidity sensor is configured to detect temperature and humidity in the cavity, and the microcontroller unit is electrically connected to the temperature and humidity sensor.

According to a third aspect, this application further provides a headset assembly, including a headset case and the headset according to any one of the foregoing implementations. The headset can be detachably accommodated in the headset case.

According to a fourth aspect, this application further provides a manufacturing method for an earbud. The manufacturing method includes: performing injection molding and curing to form a base; performing injection molding to form a first soft colloid, where the first soft colloid is connected to the base; curing the first soft colloid to form a first part of an earbud body, where the first part of the earbud body has a mounting slot; mounting the SMA component in the mounting slot; performing injection molding to form a second soft colloid, where the second soft colloid is connected to the first soft colloid, and the second soft colloid covers the mounting slot; and curing the second soft colloid to form a second part of the earbud body, and assembling the second part of the earbud body and the first part of the earbud body to form the earbud body, where the earbud body is wrapped around the SMA component.

In this application, the earbud body and the SMA component form an integrated structure during processing of the earbud body, so that structural stability of the earbud can be higher.

In some possible implementations, the first soft colloid and the second soft colloid are made of an ultraviolet cured soft rubber material, and in the manufacturing method, the first soft colloid and the second soft colloid are cured through ultraviolet curing.

In this implementation, curing of the ultraviolet cured soft rubber material is excited by ultraviolet light, and no requirement is imposed on temperature during curing. Therefore, during curing of the second soft colloid, processing temperature can be controlled to be lower than phase transition temperature of the SMA component based on a full consideration of temperature deformation effect of the SMA component, to avoid an undesirable change of a shape of the earbud body due to deformation of the SMA component, so that molding quality and a yield of the earbud body are high.

In some possible implementations, the ultraviolet cured soft rubber material is a silicone rubber material, a polyurethane material, or a fluorine rubber material, and includes a photoinitiator.

In some possible implementations, before the performing injection molding to form a first soft colloid, the manufacturing method further includes: applying a first adhesive to the base; during curing of the first soft colloid, the manufacturing method further includes: activating the first adhesive; before the mounting the SMA component in the mounting slot, the manufacturing method further includes: applying a second adhesive to the SMA component; before the performing injection molding to form a second soft colloid, the manufacturing method further includes: applying a third adhesive to the first part of the earbud body; and during curing of the second soft colloid, the manufacturing method further includes: activating the second adhesive and the third adhesive.

In some possible implementations, the first adhesive, the second adhesive, and the third adhesive are ultraviolet cured adhesives, and in the manufacturing method, the first adhesive, the second adhesive, and the third adhesive are activated by ultraviolet light.

In this implementation, the first adhesive is an ultraviolet cured adhesive, and the first soft colloid is an ultraviolet cured soft rubber material. Therefore, the first adhesive may be cured by ultraviolet light during curing of the first soft colloid, that is, the first soft colloid and the first adhesive may be simultaneously cured by ultraviolet light. A curing process is easy to implement and is efficient. In addition, the first adhesive can strengthen a connection between the base and the first part, formed through curing of the first soft colloid, of the earbud body.

Similarly, the second soft colloid, the second adhesive, and the third adhesive may be simultaneously cured by ultraviolet light. A curing process is easy to implement and is efficient. The second adhesive can increase adhesion between the SMA component and the first part of the earbud body and between the SMA component and the second part of the earbud body. The third adhesive can increase adhesion between the second part of the earbud body and the first part of the earbud body.

In some possible implementations, the ultraviolet cured adhesive is one or more composite materials of silicone resin, propylene resin, epoxy resin, and polyurethane resin, and includes a photoinitiator.

In some possible implementations, the first soft colloid and the second soft colloid are made of a room temperature vulcanized silicone rubber material, and in the manufacturing method, the first soft colloid and the second soft colloid are cured through moisture curing, cross-linking agent activation curing, or heat curing at a temperature lower than 100° C.

For example, if the first soft colloid and the second soft colloid are made of a room temperature vulcanized silicone rubber material that is cured by moisture, a curing condition is standing for 30 minutes to 24 hours for curing soft rubber, and the adhesive may be activated through heating to activation temperature of the adhesive. If the first soft colloid and the second soft colloid are made of a two-component room temperature vulcanized silicone rubber material, mixed resin may stand at room temperature for 30 minutes to 24 hours for curing soft rubber, and the adhesive may be activated through heating to activation temperature of the adhesive. If the first soft colloid and the second soft colloid are made of a room temperature vulcanized silicone rubber material that is heated and cured at low temperature, the material may be cured through heating to curing temperature (40° C. to 100° C.) of the material, where curing time is 5 minutes to 24 hours, and the adhesive may be activated through heating to activation temperature of the adhesive.

In some possible implementations, before the performing injection molding to form a first soft colloid, the manufacturing method further includes: applying a first adhesive to the base; during curing of the first soft colloid, the manufacturing method further includes: activating the first adhesive; before the mounting the SMA component in the mounting slot, the manufacturing method further includes: applying a second adhesive to the SMA component; before the performing injection molding to form a second soft colloid, the manufacturing method further includes: applying a third adhesive to the first part of the earbud body; and during curing of the second soft colloid, the manufacturing method further includes: activating the second adhesive and the third adhesive.

In some possible implementations, the first adhesive, the second adhesive, and the third adhesive are low temperature cured adhesives, and in the manufacturing method, the first adhesive, the second adhesive, and the third adhesive are heated and activated in a low temperature environment at 40° C. to 100° C.

In some possible implementations, the low temperature cured adhesive is one or more composite materials of silicone resin, propylene resin, epoxy resin, and polyurethane resin.

In some possible implementations, before the performing injection molding to form a first soft colloid, the manufacturing method further includes: applying a first adhesive to the base; during curing of the first soft colloid, the manufacturing method further includes: activating the first adhesive; before the mounting the SMA component in the mounting slot, the manufacturing method further includes: applying a second adhesive to the SMA component; before the performing injection molding to form a second soft colloid, the manufacturing method further includes: applying a third adhesive to the first part of the earbud body; and during curing of the second soft colloid, the manufacturing method further includes: activating the second adhesive and the third adhesive.

In this implementation, the first adhesive can strengthen a connection between the base and the first part, formed through curing of the first soft colloid, of the earbud body.

The second adhesive can increase adhesion between the SMA component and the first part of the earbud body and between the SMA component and the second part of the earbud body. The third adhesive can increase adhesion between the second part of the earbud body and the first part of the earbud body.

According to a fifth aspect, this application further provides a method for controlling deformation of an earbud. The earbud is used in a headset, and the earbud includes an earbud body and an SMA component embedded in the earbud body. The method includes: detecting whether the headset is worn; if the headset is worn, detecting ambient temperature; and if the ambient temperature is lower than preset temperature, heating the SMA component, so that the SMA component drives the earbud body to expand.

In this application, the earbud is designed in a "heat expandable and cold shrinkable" structure. Phase transition temperature of the SMA component of the earbud may be designed to be higher than 36° C. For example, the phase transition temperature falls in a range of 36° C. to 40° C., and an initial form of the earbud body is a shrunk form. In a normal temperature environment or a high temperature environment, the SMA component does not reach the phase transition temperature, the SMA component is in a shrunk form along with the earbud body, and a shape of the earbud facilitates wearing by the user. The headset may determine, through wearing detection, whether the user wears the headset. If the user wears the headset, the SMA component of the earbud is powered, so that temperature of the SMA component increases to the phase transition temperature. The SMA component drives the earbud body to expand, and the earbud expands to adapt to an ear canal environment of the user, to achieve comfortable wearing effect.

According to a sixth aspect, this application further provides another method for controlling deformation of an earbud. The earbud is used in a headset, and the earbud includes an earbud body and a first SMA wire and a second SMA wire that are embedded in the earbud body.

The method for controlling deformation of an earbud includes: detecting first ambient temperature in response to an operation of starting to wear; if the first ambient temperature is higher than first preset temperature, heating the second SMA wire, so that the second SMA wire drives the earbud body to shrink; detecting whether the headset is worn; if the headset is worn, detecting second ambient temperature; and if the second ambient temperature is lower than second preset temperature, heating the first SMA wire, so that the first SMA wire drives the earbud body to expand.

In this application, when a user needs to wear the headset in a high temperature environment, the second SMA wire may be heated, so that the second SMA wire is heated to second phase transition temperature, and the second SMA wire deforms and drives the earbud body to deform to a shrunk form for fitting into an ear canal. After the user wears the headset, power may be supplied to heat the first SMA wire, so that the first SMA wire is quickly heated to first phase transition temperature. The first SMA wire obtains a driving force, resists a shrinkage force of the earbud body, and drives the earbud body to expand, so that the earbud expands until reaching a comfort cutoff point before pain is caused to the ear canal, to reach a position most comfortable for wearing by the user. After the user removes the headset from the ear canal, similarly, it is determined, through wearing detection, that the headset is in a non-worn state, and power is supplied to heat the second SMA wire, so that temperature of the second SMA wire quickly increases to the second phase transition temperature. The second SMA wire obtains a driving force, and shrinkage forces of the second SMA wire and the earbud body jointly resist residual stress of the first SMA wire, so that the earbud is restored to an original state, and then is placed into a headset case.

In some possible implementations, the headset is used in a headset assembly, the headset assembly further includes a headset case, and the operation of starting to wear includes: The headset case is open, and the headset is placed in the headset case.

In some possible implementations, the operation of starting to wear includes: A gesture of starting to wear is performed on the headset.

According to a seventh aspect, this application further provides another method for controlling deformation of an earbud. The earbud is used in a headset assembly. The headset assembly includes a headset case and a headset. The headset includes the earbud. The earbud includes an earbud body and an SMA component embedded in the earbud body.

The method for controlling deformation of an earbud includes: detecting whether the headset case is open and whether the headset is placed in the headset case; and if the headset case is open and the headset is placed in the headset case, heating the SMA component, so that the SMA component drives the earbud body to shrink.

In this application, the earbud of the headset is designed in a "heat shrinkable and cold expandable" structure. For example, phase transition temperature of the SMA component is set to approximately 40° C. When the SMA component reaches the phase transition temperature, the SMA component deforms to a shrunk form. An initial form of the earbud body is an expanded form. To be specific, when the headset is in an environment in which temperature is lower than the phase transition temperature of the SMA component, the earbud body is in the expanded form, and the SMA component is in an expanded form along with the earbud body; and when the SMA component reaches the phase transition temperature, the SMA component deforms and drives the earbud body to deform to a shrunk form.

According to an eighth aspect, this application further provides a method for controlling deformation of an earmuff. The earmuff is used in a headset, and the earmuff includes an earpad and a first SMA component and a second SMA component that are embedded in the earpad.

The method for controlling deformation of an earmuff includes: detecting whether the headset is worn; if the headset is worn, detecting pressure applied to the earpad; and if the pressure applied to the earpad is less than first preset pressure, heating the first SMA component, so that the first SMA component drives the earpad to expand; or if the pressure applied to the earpad is greater than second preset pressure, heating the second SMA component, so that the second SMA component drives the earpad to shrink.

In this application, when the pressure applied to the earpad is less than the first preset pressure, wearing tightness of the earmuff is low, and the earmuff is likely to move or drop. Therefore, the first SMA component is heated, so that the earpad expands, wearing pressure between the earpad and a user increases, the wearing tightness of the earmuff increases, the earmuff can be worn under comfortable wearing pressure, and the wearing is comfortable and stable.

When the pressure applied to the earpad is greater than the second preset pressure, wearing tightness of the earmuff is excessively high, and wearing pressure between the earpad and the user is quite high. Therefore, the second SMA component is heated, so that the earpad shrinks, the wearing pressure between the earpad and the user decreases, the wearing tightness of the earmuff decreases to an appropriate range, the earmuff can be worn under comfortable wearing pressure, and the wearing is comfortable and stable.

In some possible implementations, the method for controlling deformation of an earmuff further includes: if temperature in a cavity is higher than preset temperature or humidity in the cavity is higher than preset humidity, sequentially heating the first SMA component and the second SMA component, so that the first SMA component first drives the earpad to expand, and then the second SMA component drives the earpad to shrink, and the temperature and the humidity in the cavity decrease.

In this implementation, the first SMA component and the second SMA component are sequentially heated, so that the earpad first expands and then shrinks, a depth of the cavity changes, and air in the cavity can be exchanged with external air. In this way, humid and hot air in a region, in the cavity, that is in contact with skin of the user is discharged, humidity and temperature of air in the cavity decrease, and wearing comfort is improved.

DESCRIPTION OF EMBODIMENTS

Figure 1:
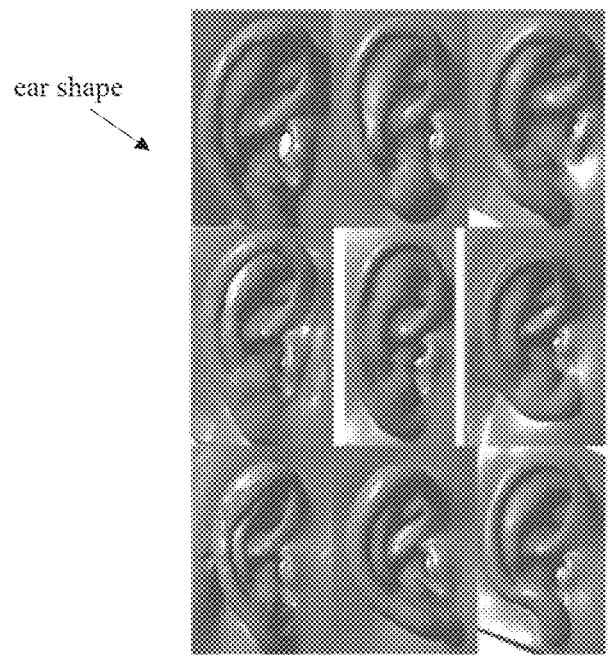
FIG. 1 is a schematic diagram of different people with different ear shapes in the conventional technology.

The following describes technical solutions in embodiments of this application with reference to accompanying drawings. In descriptions of embodiments of this application, "/" indicates "or", unless otherwise specified. For example, A/B may indicate A or B. The term "and/or" in this specification describes only an association relationship between associated objects, and indicates that three relationships may exist. For example, A and/or B may indicate the following three cases: Only A exists, both A and B exist, and only B exists. In addition, in descriptions of embodiments of this application, "a plurality of" means two or more than two.

In the following descriptions, terms such as "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

Orientation terms mentioned in embodiments of this application, for example, "on", "below", "front", "rear", "left", "right", "inside", "outside", "side", "top", and "bottom", merely indicate directions based on accompanying drawings. Therefore, the orientation terms are used to better and more clearly describe and understand embodiments of this application, but not to indicate or imply that a specified apparatus or element needs to have a specific orientation or be constructed or operated in a specific orientation. Therefore, this cannot be construed as a limitation on embodiments of this application.

In descriptions of embodiments of this application, it should be noted that terms such as "mount", "connected", "connection", and "disposed on" should be understood in a broad sense, unless otherwise specified and limited. For example, the "connection" may be a detachable connection or a non-detachable connection, or may be a direct connection or a connection through an intermediate medium.

Headsets are a rigid demand in application scenarios such as music listening and calling by users. When a user wears a headset, poor wearing comfort is likely to cause the following problems: (1) An earbud is excessively large, causing significant pressure to an ear canal. (2) An earbud is excessively small, causing poor wearing stability in exercise scenarios such as running. (3) An earbud is excessively small, causing acoustic leakage, and degrading sound quality and active noise cancellation (active noise cancellation, ANC) effect.

This application provides an earbud capable of automatically adapting to a wearing environment, a headset including the at least one earbud, and a headset assembly including the headset. The earbud is provided with a shape memory alloy (shape memory alloy, SMA) component. After a user wears the headset, the SMA component senses a change of ear temperature to deform to some extent, so as to adapt to ear canals of different sizes of different users. In this way, an adaptive earbud is formed. The adaptive earbud can improve wearing comfort of the headset, and also resolve an acoustic leakage problem caused by improper wearing, to improve sound quality and active noise cancellation effect.

An SMA component that does not need to be connected to a circuit may be used in the earbud, and the SMA component passively deforms at ambient temperature. Alternatively, an SMA component that may be connected to a power supply chip may be used in the earbud, and the SMA component may passively deform at ambient temperature, or may actively deform under the control of an electrical signal, to adapt to more diverse wearing environments. In this case, this application further provides a method for controlling deformation of an earbud.

In addition, this application further provides a manufacturing method for an earbud. In the manufacturing method, an earbud can be manufactured without affecting performance of an SMA component, and a manufacturing yield is high.

This application further provides an earmuff capable of actively adjusting a wearing status, a headset including the at least one earmuff, and a headset assembly including the headset. The earmuff is provided with a shape memory alloy (shape memory alloy, SMA) component. When a user wears the headset, the SMA component can drive, under the control of an electrical signal, the earmuff to deform, to adjust pressure, temperature, and humidity in the earmuff, so that the headset has high wearing comfort. This can also resolve an acoustic leakage problem caused by improper wearing, to improve sound quality and active noise cancellation effect. This application further provides a method for controlling deformation of an earmuff.

In this application, the earbud and the earmuff implement deformation mainly by using the shape memory alloy. It has been nearly 90 years since the shape memory alloy was found, and the shape memory alloy has two major characteristics: superelasticity and driving. Based on the superelasticity characteristic, the shape memory alloy may be used in a medical device or an intelligent wearable device. Based on the driving characteristic, the shape memory alloy may be used in a sensing device, an actuator device, or a micro motor. In this solution, an adaptive earbud is implemented through one-way memory effect of the shape memory alloy.

The shape memory alloy applies specific stress below finish temperature of martensitic transformation to transform adaptive martensite into detwinned martensite. As a result, a quantity of martensite variants decreases, and martensite with a single variant or a few variants is formed. Therefore, macro visible strain occurs. After the stress is removed, an orientation of a martensite variant does not change, and the induced strain cannot be completely canceled. In this case, after temperature is increased to be higher than finish temperature of inverse martensitic transformation, inverse martensitic transformation occurs, residual strain of the alloy material disappears, and the alloy material is restored to a shape that exists before the deformation. This effect is referred to as one-way shape memory effect. In short, in the case of deformation in a martensitic state due to a force, a high temperature phase state is restored during heating, and a low temperature phase state is not restored during cooling.

In this application, the headset may be a true wireless stereo (true wireless stereo, TWS) headset.

In this application, the headset assembly may include a headset and a headset case, and the headset can be detachably accommodated in the headset case.

The following describes a structure of a headset including at least one earbud and a related method by using examples.

Figure 2:
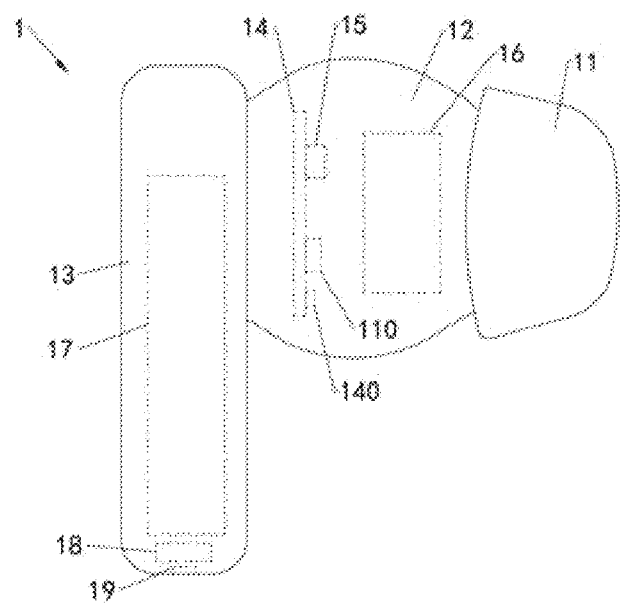
FIG. 2 is a schematic diagram of a structure of a headset according to some embodiments of this application.

FIG. 2 is a schematic diagram of a structure of a headset 1 according to some embodiments of this application.

In some embodiments, the headset 1 may be an in-ear headset, and the in-ear headset is also referred to as an ear canal headset. The headset 1 may be used in a headset assembly. The headset assembly includes a headset case, and the headset 1 can be detachably accommodated in the headset case. The headset 1 includes an earbud 11 and an ear housing 12, and the earbud 11 is fastened to the ear housing 12. The ear housing 12 is a main structure of the headset 1, and another component of the headset 1 may be mounted in the ear housing 12. The earbud 11 fits into an ear canal of a user when the user wears the headset 1.

For example, the headset 1 may further include an ear handle (also referred to as an ear rod) 13, and the ear handle 13 is fastened to the ear housing 12. For example, the ear handle 13 may be fastened to a side, of the ear housing 12, that backs the earbud 11; or when the earbud 11 is fastened to a side of the ear housing 12, the ear handle 13 may be fastened to the bottom of the ear housing 12.

For example, the headset 1 may further include a circuit board 14, a microcontroller unit (microcontroller unit, MCU) 15, a speaker 16, a power supply 17 (namely, a battery), and a microphone 18. The circuit board 14, the microcontroller unit 15, and the speaker 16 may be accommodated in the ear housing 12, and the microcontroller unit 15 is fastened to the circuit board 14. The speaker 16 is configured to convert an electrical signal into a sound signal, and the sound signal may be propagated out of the headset 1 through the earbud 11, to play sound. The power supply 17 and the microphone 18 may be accommodated in the ear handle 13. The power supply 17 is configured to supply power to the headset 1, and the microphone 18 is configured to convert a sound signal into an electrical signal, so that the headset 1 receives sound. In some embodiments, the microphone 18 may be located at the bottom of the ear handle 13, or may be located at another position on the ear handle 13 or the ear housing 12. In some embodiments, there may be one or more microphones 18. When there are a plurality of microphones 18, the plurality of microphones 18 may be arranged at different positions on the headset 1.

For example, a charging contact 19 may be further provided on the headset 1, and the charging contact 19 may be provided at the bottom of the ear handle 13. When the headset 1 is placed in the headset case of the headset assembly, the headset case may charge the headset 1 through the charging contact 19.

In some other embodiments, the headset 1 may alternatively not include the ear handle 13, and a main part of the headset 1 is accommodated in the ear housing 12, or is partially accommodated in the ear housing 12 and partially accommodated in another part of the headset 1. A specific structure and a component position arrangement of the headset 1 are not strictly limited in this embodiment of this application.

Figure 3:
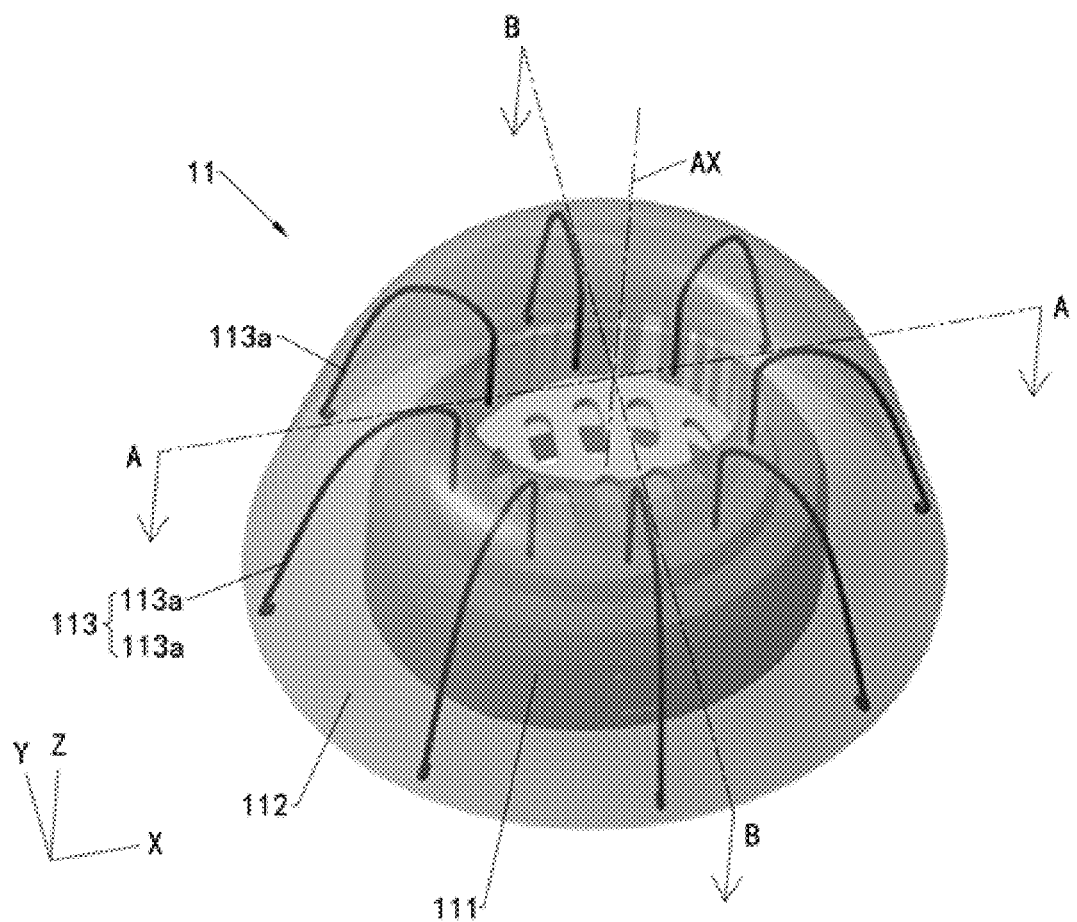
FIG. 3 is a schematic diagram of a structure of an earbud shown in FIG. 2 according to some embodiments.
Figure 4:
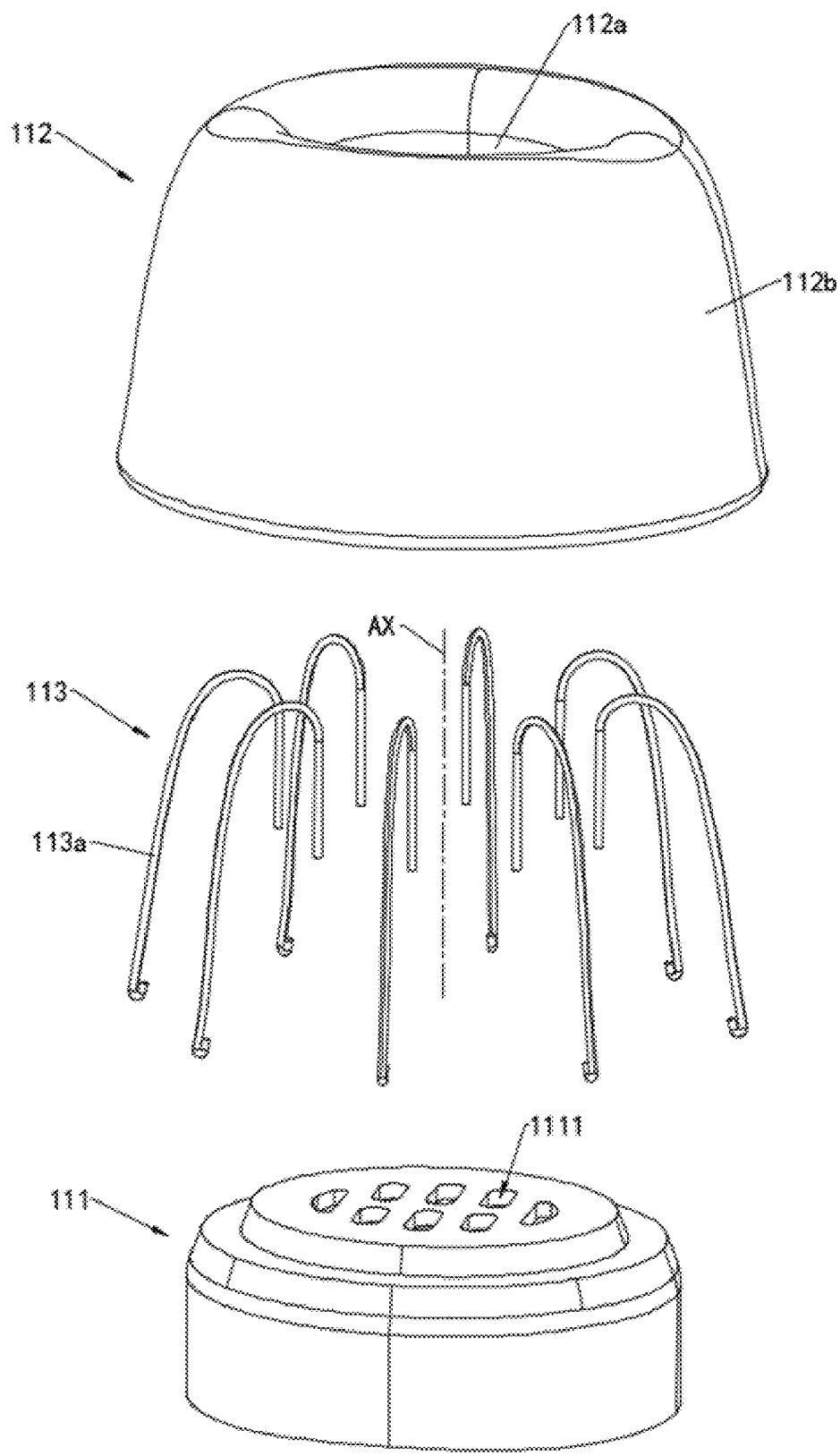
FIG. 4 is a schematic exploded view of a structure of an earbud shown in FIG. 3.
Figure 5:
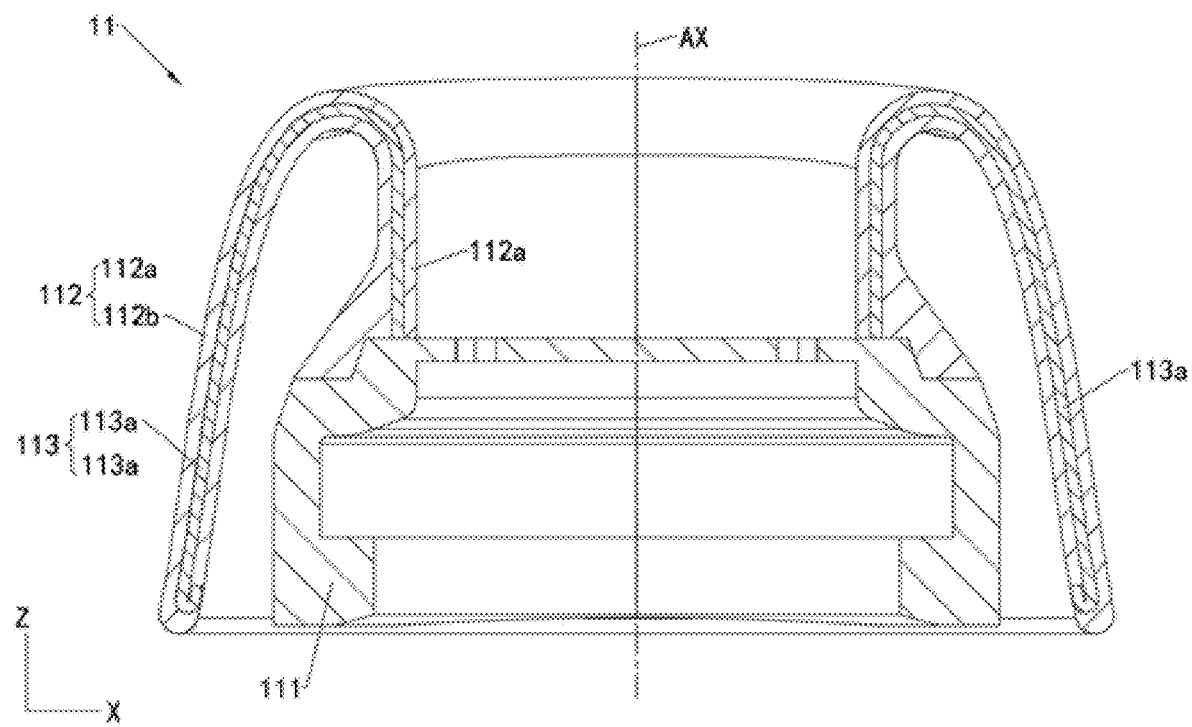
FIG. 5 is a schematic cross-sectional view of a structure of an earbud shown in FIG. 3 that is cut along A-A.
Figure 6:
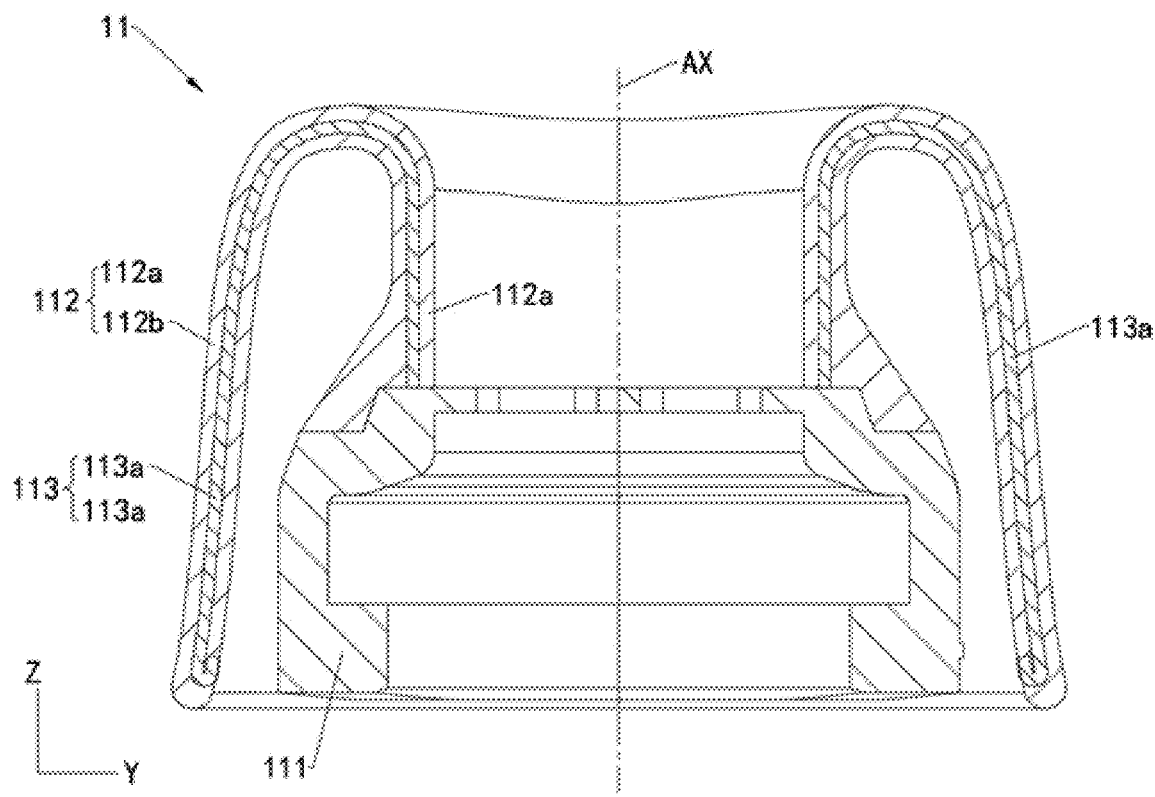
FIG. 6 is a schematic cross-sectional view of a structure of an earbud shown in FIG. 3 that is cut along B-B.

Refer to FIG. 3 to FIG. 6. FIG. 3 is a schematic diagram of a structure of the earbud 11 shown in FIG. 2 according to some embodiments. FIG. 4 is a schematic exploded view of a structure of the earbud 11 shown in FIG. 3. FIG. 5 is a schematic cross-sectional view of a structure of the earbud 11 shown in FIG. 3 that is cut along A-A. FIG. 6 is a schematic cross-sectional view of a structure of the earbud 11 shown in FIG. 3 that is cut along B-B.

In some embodiments, the earbud 11 includes a base 111, an earbud body 112, and an SMA component 113. The base 111 is fastened to the ear housing 12. The earbud 11 may be non-detachably connected to the ear housing 12. In this case, the base 111 is non-detachably fastened to the ear housing 12, for example, may be fastened through bonding. In some other embodiments, the earbud 11 may alternatively be detachably connected to the ear housing 12. In this case, the base 111 is detachably fastened to the ear housing 12, for example, may be fastened through buckling. The base 111 is provided with at least one microphone hole 1111, and a sound signal of the speaker 16 in the ear housing 12 may be propagated out of the headset 1 through the microphone hole 1111.

The earbud 11 has a length direction X, a width direction Y, and a height direction Z. The width direction Y is perpendicular to the length direction X, and the height direction Z is perpendicular to the width direction Y and the length direction X. The earbud 11 further has a center line AX. The center line AX is parallel to the height direction Z of the earbud 11, and the center line AX passes through the base 111. A sound output direction of the microphone hole 1111 of the base 111 may be roughly parallel to the height direction Z of the earbud 11.

For example, the earbud body 112 includes a stationary portion 112a and a contact portion 112b. The stationary portion 112a is disposed around the center line AX of the earbud 11. The contact portion 112b is disposed around the stationary portion 112a, the top of the contact portion 112b is connected to the top of the stationary portion 112a, and the bottom of the stationary portion 112a is fastened to the base 111. A gap is formed between the bottom of the contact portion 112b, the stationary portion 112a, and the base 111. The stationary portion 112a is further disposed around the microphone hole 1111. To be specific, the microphone hole 1111 is located in inner space enclosed by the stationary portion 112a. The contact portion 112b may be further disposed around at least a part of the base 111, so that the earbud 11 has a more compact structure and a small size. FIG. 3 shows an internal structure of the earbud 11, and the earbud body 112 is shown in the figure in a translucent manner. This does not constitute a limitation on a material of the earbud body 112.

The earbud body 112 is made of an elastic material, and the earbud body 112 can adaptively deform under the action of an external force, and can also be restored after the external force is removed. For example, the earbud body 112 may be made of an elastic polymer material, including but not limited to silicone, rubber, and the like. When the earbud body 112 adaptively deforms under the action of an external force, deformation of the earbud body 112 mainly occurs at the contact portion 112b. Relative positions of the contact portion 112b and the stationary portion 112a change, for example, a gap between the contact portion 112b and the stationary portion 112a changes, so that the entire earbud body 112 deforms.

A coefficient of thermal conductivity of the earbud body 112 may be greater than or equal to 0.1 W/(m·k), for example, may be 0.17 W/(m·k), 0.2 W/(m·k), or 0.22 W/(m·k). For example, a thickness of the earbud body 112 may fall in a range of 0.4 mm to 0.6 mm, for example, may be 0.48 mm, 0.5 mm, or 0.55 mm.

For example, the SMA component 113 is embedded in the earbud body 112 in an encircling manner. The SMA component 113 is arranged the center line AX of the earbud 11. That the SMA component 113 is disposed in an encircling manner includes a case in which a shape of the SMA component 113 is in an encircling state, and also includes a case in which a plurality of parts of the SMA component 113 are arranged in an encircling manner. The SMA component 113 has phase transition temperature. When the SMA component 113 is in an environment in which temperature is close to the phase transition temperature, the SMA component 113 starts to deform toward a memory shape. After the SMA component 113 reaches the phase transition temperature, the SMA component 113 deforms to the memory shape. In an environment in which temperature is lower than the phase transition temperature, the SMA component 113 adaptively deforms under the action of an external force.

In this application, when a user wears the headset 1, the earbud body 112 at least partially fits into an ear canal of the user, and the SMA component 113 deforms at ear temperature, to drive the contact portion 112b to abut against an ear canal wall of the user. The earbud 11 uses one-way memory effect of a shape memory alloy. After the user wears the headset 1, the SMA component 113 of the earbud 11 starts to deform at the ear temperature, and the SMA component 113 drives the earbud body 112 to elastically deform, so that the earbud 11 automatically reaches an adaptive state that adapts to a shape of the ear canal of the user. After the user removes the headset 1, temperature of the earbud 11 decreases, and an elastic force resulting from deformation of the earbud body 112 drives the earbud 11 to deform to be restored to an original shape.

In this embodiment, the earbud 11 can sense the ear temperature of the user through the SMA component 113 to adaptively deform, so that the earbud 11 can adapt to the shape of the ear canal of the user and well fit to the ear canal wall. Therefore, the headset 1 is applicable to different users and has a wide adaptability range, and there is no need to configure a plurality of types of earbuds. This reduces costs and improves convenience. In addition, because the earbud 11 adapts to the shape of the ear canal of the user, the headset 1 has high wearing comfort and high wearing stability, so that acoustic leakage caused by improper wearing by the user can also be avoided, to ensure sound quality and active noise cancellation of the headset 1.

In some embodiments, the SMA component 113 has phase transition temperature, the SMA component 113 has an expanded form in an environment in which temperature is higher than or equal to the phase transition temperature, and the SMA component 113 drives the earbud body 112 to deform to an expanded form. In this case, an initial shape of the earbud body 112 may be set to a shrunk form. When the headset 1 is used in a normal temperature environment, the earbud body 112 is in the shrunk form, and the SMA component 113 is in a shrunk form. When the headset 1 is in an environment in which temperature is higher than or equal to the phase transition temperature, the SMA component 113 deforms to the expanded form, and drives the earbud body 112 to expand, so that the earbud body 112 deforms to the expanded form.

For example, the phase transition temperature of the SMA component 113 falls in a range of 36° C. to 40° C. For example, the phase transition temperature of the SMA component 113 may be 36° C., 36.5° C., 37° C., or 37.3° C. The SMA component 113 may start to deform and produce driving strain in an environment in which temperature (for example, approximately 30° C.) is close to the phase transition temperature.

Figure 7:
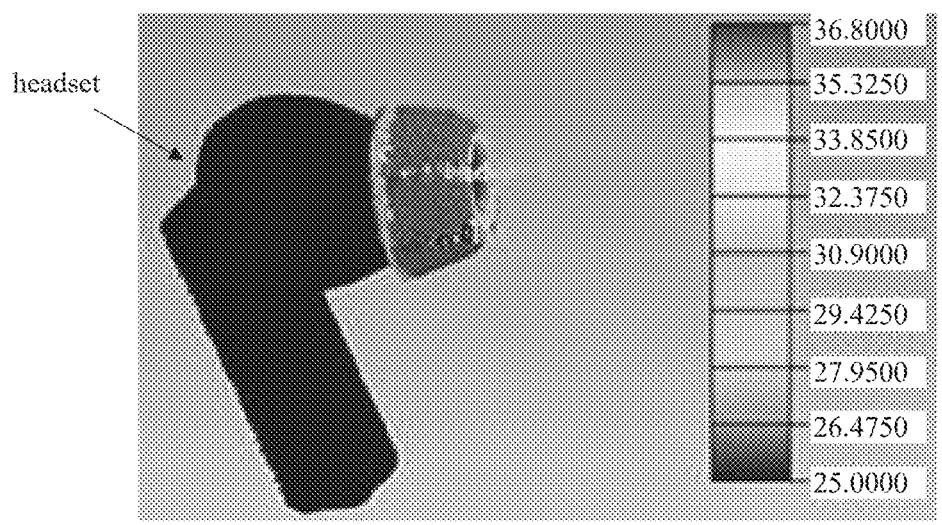
FIG. 7 is a thermal simulation cloud diagram of a headset in a worn state.

FIG. 7 is a thermal simulation cloud diagram of the headset 1 in a worn state. A label on the right of FIG. 7 indicates temperature in a unit of ° C. Ear cavity temperature is close to core body temperature of a human body and is constant (for example, is approximately 36.5° C.). For example, when the headset 1 is in the headset case, the headset 1 is in a normal temperature environment (for example, approximately at 25° C.), the earbud 11 is in an initial state, a shape of the earbud 11 is determined based on an initial shape of the earbud body 112, the earbud body 112 is in a shrunk form, and the SMA component 113 is in a shrunk form. After the user takes out the headset 1 and puts it into the ear canal, ear temperature is transferred to the SMA component 113 of the earbud 11, so that the SMA component 113 reaches the phase transition temperature, and the SMA component 113 deforms to an expanded form. Driving strain produced by the SMA component 113 is greater than a shrinkage force of the earbud body 112, so that the earbud 11 is pushed to expand, and the earbud body 112 deforms to an expanded form.

During expansion of the SMA component 113, because ear canal sizes of users are different and an expansion force of the SMA component 113 cannot cause pain to the user, the SMA component 113 stops expanding when an amount of interference between the earbud body 112 and the ear canal wall reaches a specific value. After the user removes the headset 1, temperature of the SMA component 113 decreases. In this case, a driving force produced by the SMA component 113 decreases, and a shrinkage force of the earbud body 112 is greater than the driving force, so that the earbud body 112 shrinks, and the earbud 11 is restored to an initial shape.

It can be understood that, in this application, when the headset 1 is in an environment in which temperature is higher than or equal to the phase transition temperature, and the headset 1 is not subject to another external force, the SMA component 113 can deform to a shape corresponding to an expanded form in a product design, and drive the earbud body 112 to deform to a shape corresponding to an expanded form in a product design. When the headset 1 is in an environment in which temperature is higher than or equal to the phase transition temperature, and the headset 1 is subject to a specific external force, for example, when the headset 1 is in a worn state and the earbud 11 is subject to pressure from the ear canal wall of the user during expansion, the SMA component 113 may also deform to an expanded form. However, a shape of the SMA component 113 is further affected by a shape of the ear canal of the user, and the shape of the SMA component 113 may be different from a shape corresponding to an expanded form in a product design. Similarly, the SMA component 113 may still drive the earbud body 112 to deform to an expanded form. A shape of the earbud body 112 is affected by the shape of the ear canal of the user, and the shape of the earbud body 112 may be different from a shape corresponding to an expanded form in a product design.

With reference to FIG. 2, when the user wears the headset 1, the earbud 11 of the headset 1 fits into the ear canal of the user, an extrusion force is correspondingly produced between the earbud 11 and an opening of the ear canal, an extrusion force is produced between the ear housing 12 of the headset 1 and a cavity of auricular concha, and an extrusion force is produced between the ear handle 13 of the headset 1 and an auricle. In this embodiment, the earbud 11 is "heat expandable and cold shrinkable". "Expansion" means that a driving force produced by the SMA component 113 after heating resists a shrinkage force (to be specific, an elastic force resulting from elastic deformation) of the earbud body 112 to implement expansion. "Shrinkage" means that a driving force produced by the SMA component 113 decreases after cooling, and in this case, a shrinkage force of the earbud body 112 resists the driving force of the SMA component 113 to implement shrinkage.

In this application, a size of the earbud 11 in an initial form is small, and the earbud 11 needs to be able to adapt to all ear canal models after expansion. However, after the SMA component 113 is processed and molded, a deformation force of the SMA component 113 is fixed. To be specific, switching is performed between a state A and a state B. When there is no external force or constraint, the fixed state switching cannot implement adaptation of the earbud 11. Therefore, for adaptive deformation of the SMA component 113, another force is introduced in this application: resistance of the ear canal of the user to the earbud 11. The resistance is an interference force between the earbud 11 and the ear canal. The resistance is the most critical design factor. On the basis that no pain (the resistance may be obtained based on a pain simulation model) is caused, a critical condition for stopping SMA deformation (namely, SMA strain) is designed through feedback of pressure intensity. The pressure intensity is in a fixed relationship with a diameter of the SMA component 113, and a designed diameter of the SMA component 113 may be reversely deduced based on the pressure intensity. Therefore, a condition for stopping expansion of the earbud 11 under the interference force is designed as follows: SMA strain=a shrinkage force of the earbud body 112+resistance of the ear canal to the earbud 11.

In this application, the earbud 11 drives, based on temperature rise effect of an ear temperature cavity, the SMA component 113 to deform, and a deformation cutoff amount is designed, so that the SMA component 113 achieves "heat expandable and cold shrinkable" effect, to better adapt to wearing requirements of different users, and improve wearing comfort for the user. In addition, the earbud 11 does not rely on a design of a power-on circuit or a body of the headset 1, so that the earbud 11 has low costs, does not cause additional power consumption, and is highly applicable.

In this application, a form design for the SMA component 113 is a quite important step. Whether expansion space of the SMA component 113 meets a requirement needs to be considered, and reliability of molding between the SMA component 113 and the earbud body 112 also needs to be considered.

Currently, a difference between outer circumferences of a largest earbud and a smallest earbud of three types of earbuds 11 with a large size, a medium size, and a small size on the market is 20%. However, when reliability is ensured, a maximum amount of deformation of a conventional SMA wire material usually cannot exceed 8%. If a deformation amount exceeds 8%, irreversible deformation starts to occur, causing overall deformation of the earbud 11. In solutions of this application, an innovative form of an SMA is designed, to meet a deformation requirement while ensuring reliability.

The following describes a shape change of the earbud 11 with reference to a specific structure of the SMA component 113.

Still refer to FIG. 3 to FIG. 6. In some embodiments, the SMA component 113 includes a plurality of SMA wires 113a, and the plurality of SMA wires 113a are arranged at spacings in a circumferential direction of the earbud body 112, that is, the plurality of SMA wires 113a are disposed around the center line AX of the earbud 11. The SMA wire 113a is a single-stranded wire. Each SMA wire 113a extends from the bottom of the stationary portion 112a to the bottom of the contact portion 112b through the top of the stationary portion 112a and the top of the contact portion 112b. The SMA component 113 may be molded through mold processing or the like.

For example, the SMA wire 113a may include a connection section and a movable section. The connection section is embedded in the stationary portion 112a of the earbud body 112. The movable section is embedded in the contact portion 112b of the earbud body 112. The top of the connection section is connected to the top of the movable section. The bottom of the connection section and the bottom of the movable section are bent toward a same side. A gap is formed between the connection section and the movable section.

Figure 8:
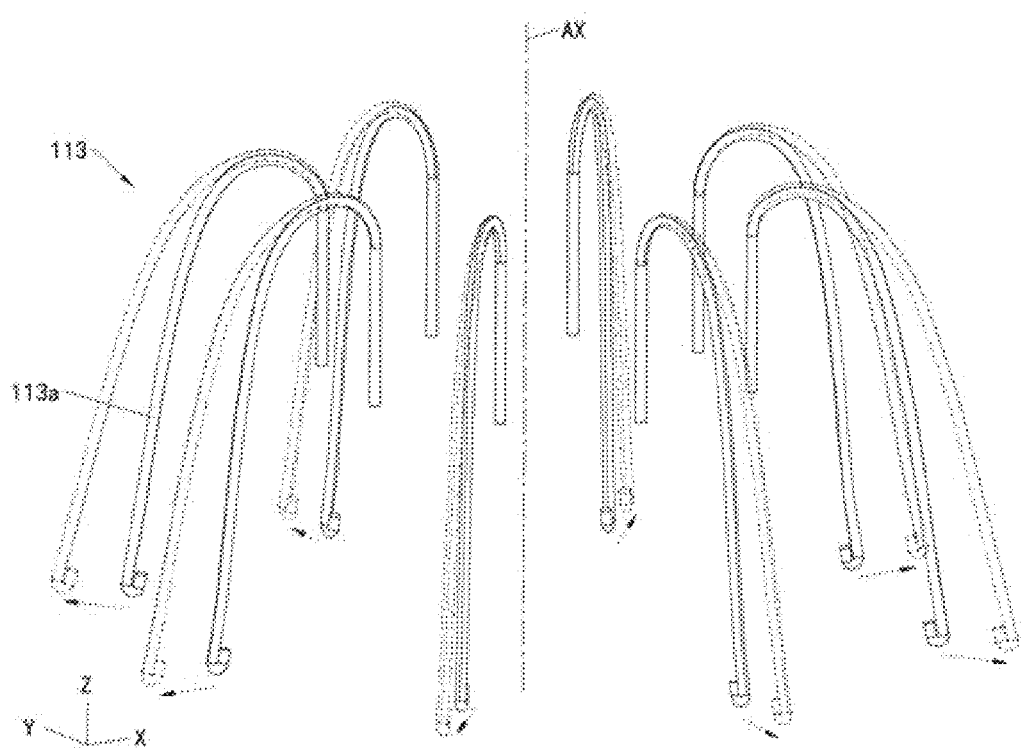
FIG. 8 is a schematic diagram of a deformation status of an SMA component of an earbud shown in FIG. 3.

FIG. 8 is a schematic diagram of a deformation status of the SMA component 113 of the earbud 11 shown in FIG. 3.

In FIG. 8, an example shape of the SMA component 113 in a shrunk state is indicated by solid lines, and an example shape of the SMA component 113 in an expanded form is indicated by dashed lines. During deformation of the SMA component 113, deformation of the SMA component 113 may mainly occur at the movable section of the SMA wire 113a, and the connection section of the SMA wire 113a may not deform or may slightly deform. When the SMA component 113 is in an environment in which temperature is higher than or equal to the phase transition temperature, the SMA component 113 switches from the shrunk state to the expanded form, and movable sections of the plurality of SMA wires 113a deform in a direction away from stationary sections, that is, the movable sections of the plurality of SMA wires 113a deform in a direction away from the center line AX of the earbud 11. A spacing between the bottom of the movable section and the bottom of the stationary section increases.

Shapes and deformation of the plurality of SMA wires 113a may be the same, or may not be completely the same. When the earbud 11 fits into the ear canal of the user and amounts of deformation of the plurality of SMA wires 113a are different, the earbud 11 can better adapt to the shape of the ear canal of the user, to improve wearing comfort.

Figure 9:
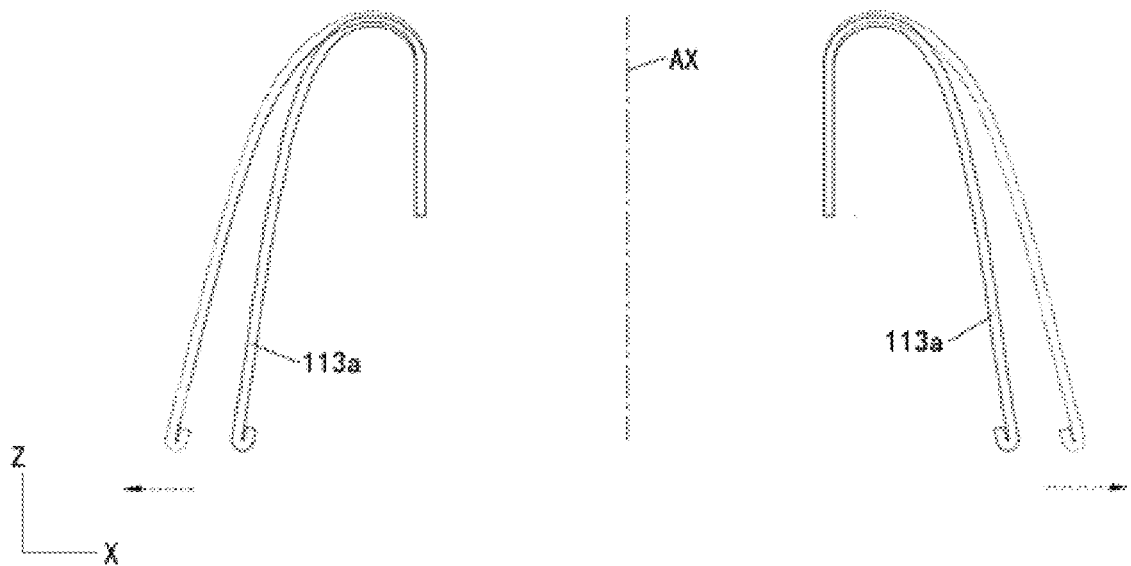
FIG. 9 is a schematic diagram of a partial structure of the SMA component shown in FIG. 8.
Figure 10:
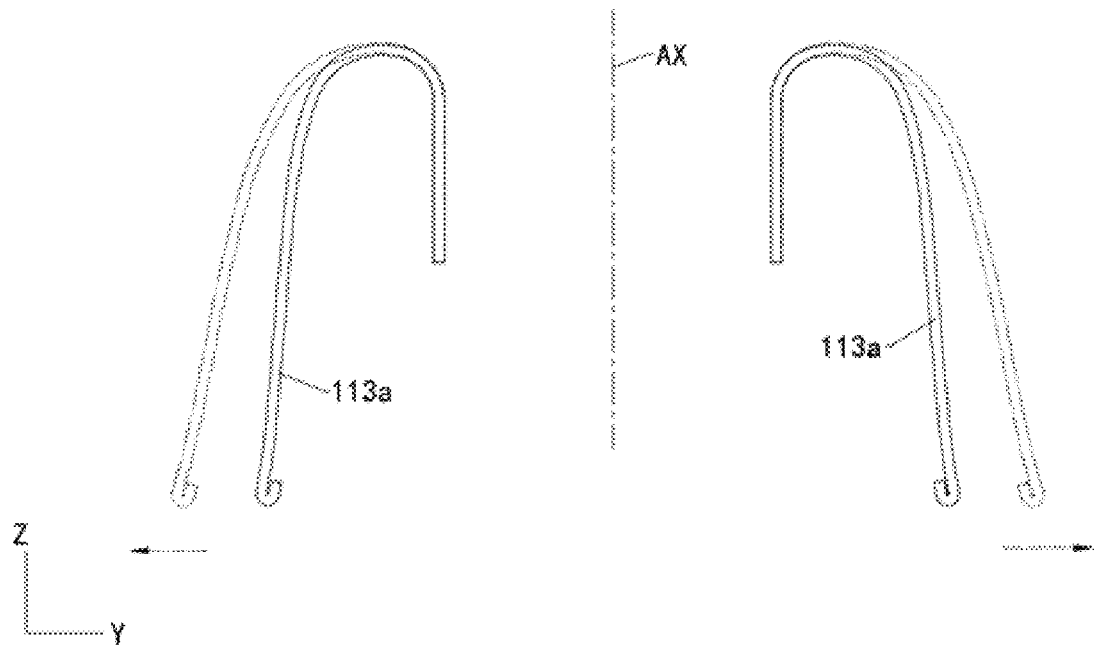
FIG. 10 is a schematic diagram of another partial structure of an SMA component shown in FIG. 8.

For example, refer to FIG. 9 and FIG. 10. FIG. 9 is a schematic diagram of a partial structure of the SMA component 113 shown in FIG. 8. FIG. 10 is a schematic diagram of another partial structure of the SMA component 113 shown in FIG. 8. FIG. 9 shows shapes and deformation of two SMA wires 113a, arranged in the length direction X of the earbud 11, of the plurality of SMA wires 113a of the SMA component 113. FIG. 10 shows shapes and deformation of two SMA wires 113a, arranged in the width direction Y of the earbud 11, of the plurality of SMA wires 113a of the SMA component 113. As shown in FIG. 9 and FIG. 10, shapes and deformation of at least two of the plurality of SMA wires 113a may be different. For example, during deformation of the SMA component 113, displacement at the bottom of a movable section of an SMA wire 113a arranged in the width direction Y of the earbud 11 may be greater than displacement at the bottom of a movable section of an SMA wire 113a arranged in the length direction X of the earbud 11.

Figure 11A:
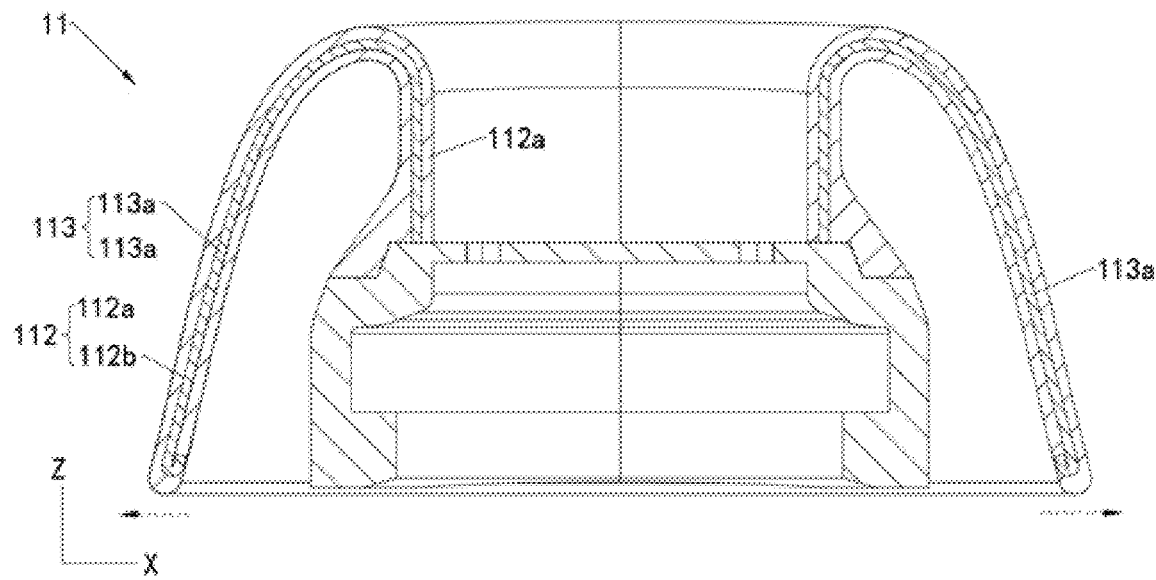
FIG. 11A is a schematic diagram of a structure of an earbud shown in FIG. 5 in another state.
Figure 11B:
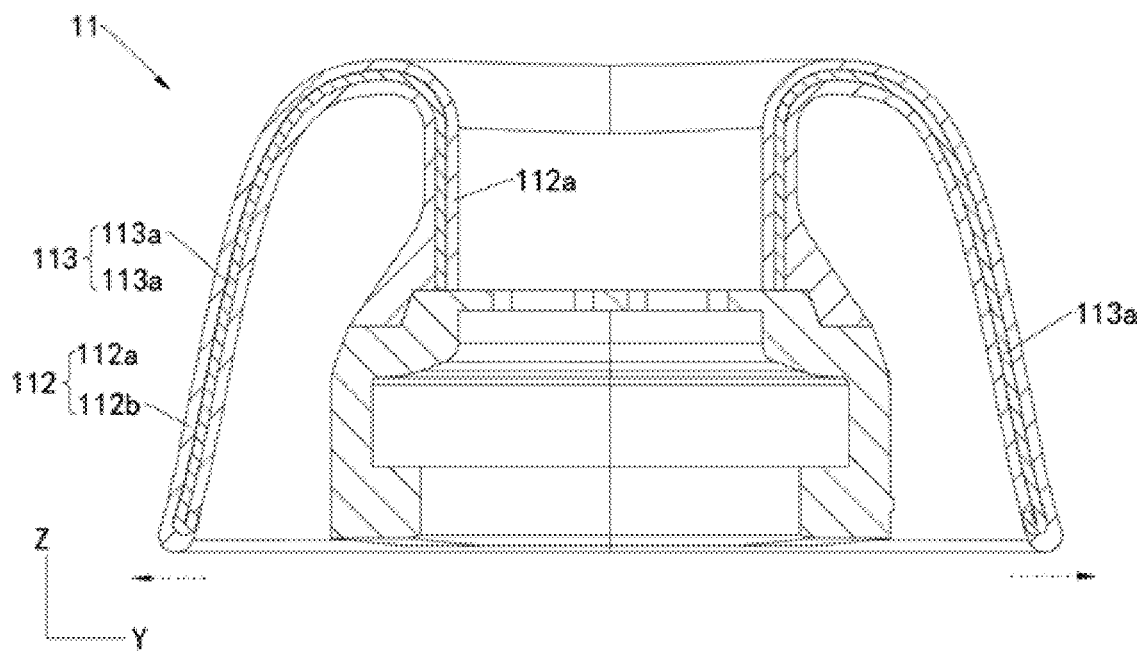
FIG. 11B is a schematic diagram of a structure of an earbud shown in FIG. 6 in another state.
Figure 11C:
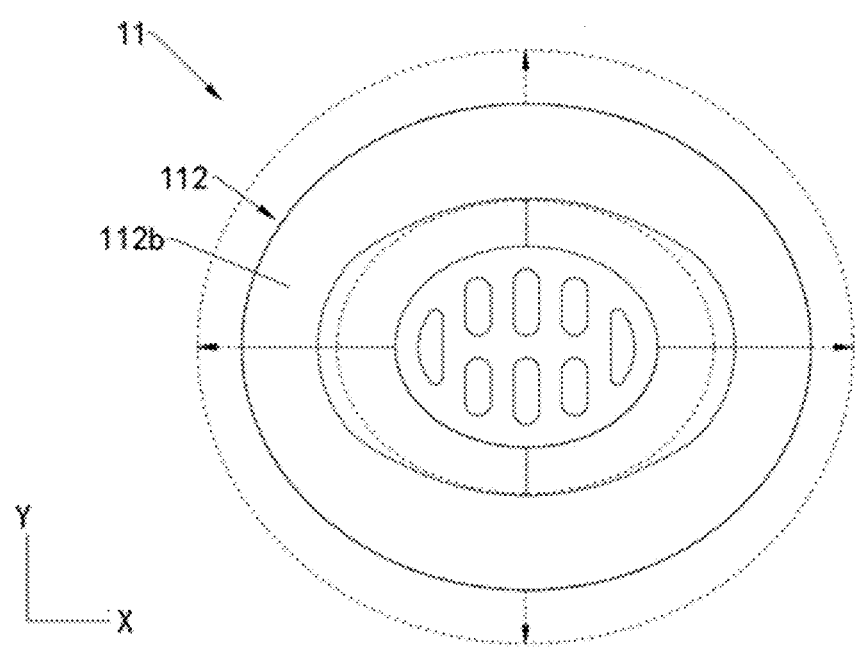
FIG. 11C is a top view of an earbud shown in FIG. 3.

Refer to FIG. 11A to FIG. 11C. FIG. 11A is a schematic diagram of a structure of the earbud 11 shown in FIG. 5 in another state. FIG. 11B is a schematic diagram of a structure of the earbud 11 shown in FIG. 6 in another state. FIG. 11C is a top view of the earbud 11 shown in FIG. 3.

In this embodiment, when the SMA component 113 is in an environment in which temperature is higher than or equal to the phase transition temperature, the SMA component 113 switches from a shrunk state to an expanded form, the SMA component 113 drives the earbud body 112 to deform to an expanded form, and the earbud 11 expands. As shown in FIG. 11A to FIG. 11C, the contact portion 112b of the earbud body 112 deforms along with the movable section of the SMA wire 113a of the SMA component 113, and the contact portion 112b of the earbud body 112 expands. Deformation of the earbud body 112 mainly occurs at the contact portion 112b, and the stationary portion 112a of the earbud body 112 may not deform or may slightly deform.

In this embodiment, when the SMA component 113 switches from an environment in which temperature is higher than or equal to the phase transition temperature to an environment in which temperature is lower than the phase transition temperature, a driving force produced by the SMA component 113 decreases or disappears, and the earbud body 112 produces an elastic force due to deformation, so that the earbud body 112 deforms to a shrunk form, and drives the SMA component 113 to deform to a shrunk form. As shown in FIG. 5, FIG. 6, and FIG. 8, the movable section of the SMA wire 113a deforms along with the contact portion 112b of the earbud body 112, and the contact portion 112b of the earbud body 112 and the movable section of the SMA wire 113a shrink.

Among the plurality of SMA wires 113a of the SMA component 113, a deformation degree of an SMA wire 113a arranged in the width direction Y of the earbud 11 is higher than a deformation degree of an SMA wire 113a arranged in the length direction X of the earbud 11, and the contact portion 112b deforms along with the plurality of SMA wires 113a. Therefore, a deformation degree of the contact portion 112b in the width direction Y of the earbud 11 may be higher than a deformation degree of the contact portion 112b in the length direction X of the earbud 11.

The bottom of connection sections of the plurality of SMA wires 113a may be fastened to the base 111, to improve connection reliability of the SMA component 113. In some examples, the SMA component 113 may include 5 to 10, for example, seven or eight, SMA wires 113a. A length of a single SMA wire 113a may fall in a range of 8 mm to 13 mm, for example, may be 10.365 mm. A wire diameter of the SMA wire 113a may fall in a range of 0.1 mm to 0.4 mm, for example, may be 0.15 mm. In this embodiment, the SMA component 113 may alternatively include another quantity of SMA wires 113a, and the SMA wire 113a may alternatively have another shape and size. This is not strictly limited in this application.

It can be understood that a shape and deformation design for the plurality of SMA wires 113a and a shape and deformation design for the earbud body 112 may be implemented in a plurality of manners. The embodiment shown in FIG. 3 is merely presented as an example, and does not constitute a strict limitation on a structure of the earbud 11.

In this application, the plurality of SMA wires 113a of the SMA component 113 are roughly arranged in an "umbrella" shape, so that the expanded form and the shrunk form of the SMA component 113 are similar to an open state and a closed state of an umbrella, and are also similar to a deformation trend of the earbud body 112. In this way, the SMA component 113 is still well bonded to the earbud body 112 after deformation, to retain good adhesion between the SMA component 113 and the earbud body 112 after a plurality of times of expansion and shrinkage. This improves reliability of the earbud 11.

Figure 12A:
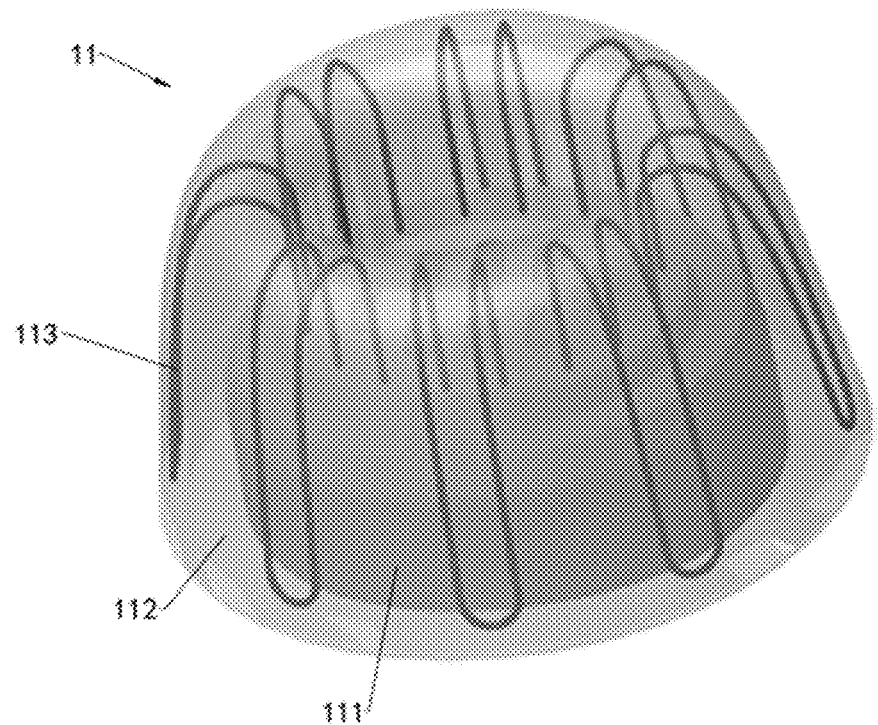
FIG. 12A is a schematic diagram of a structure of an earbud shown in FIG. 2 according to some other embodiments.
Figure 12B:
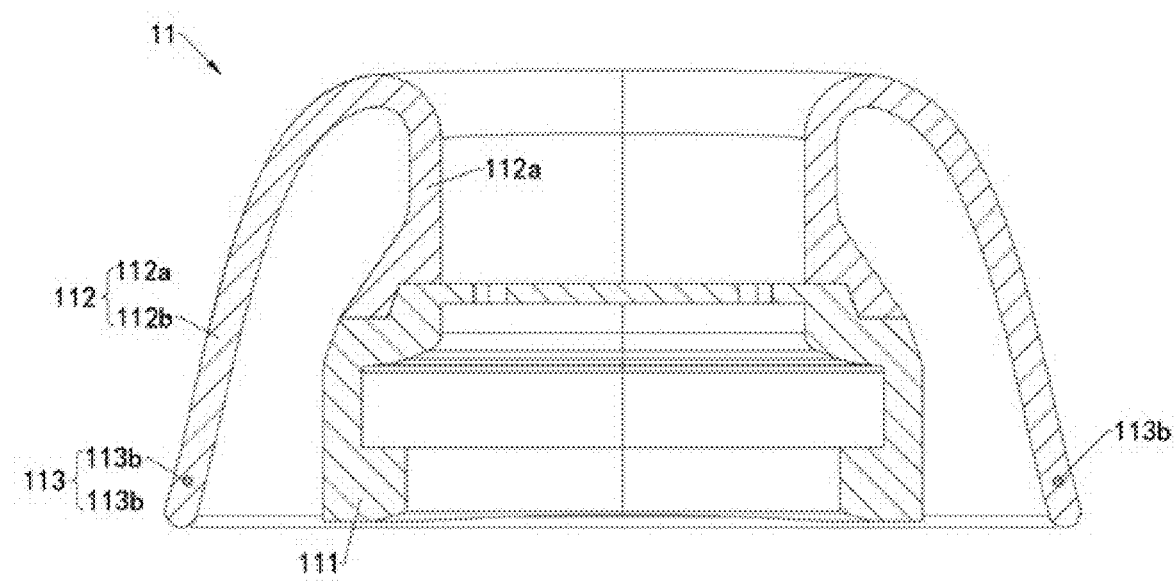
FIG. 12B is a schematic diagram of an internal structure of an earbud shown in FIG. 12A.
Figure 13A:
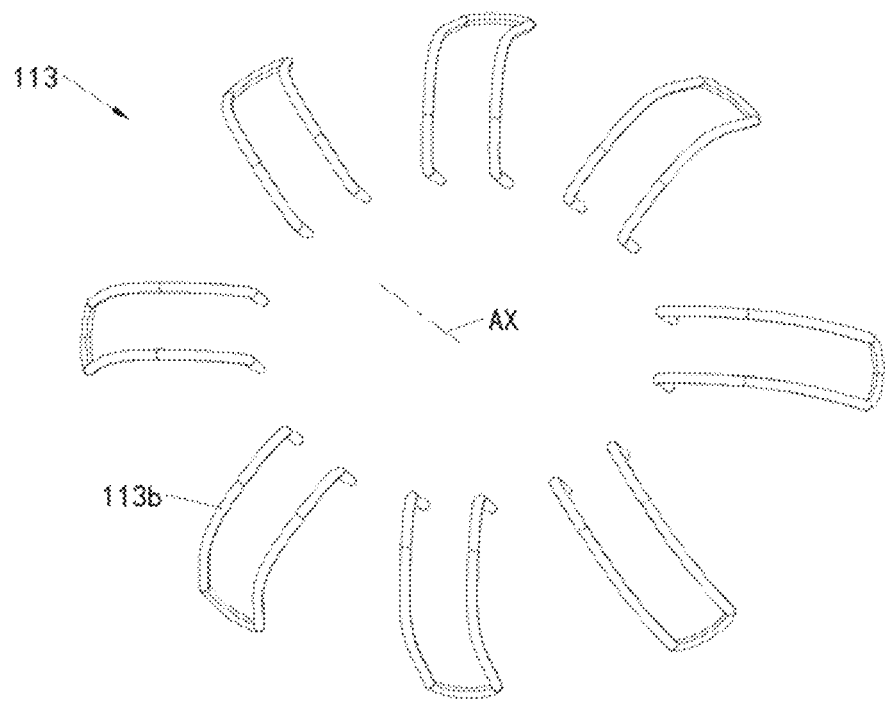
FIG. 13A is a schematic diagram of a structure of an SMA component of an earbud shown in FIG. 12A.
Figure 13B:
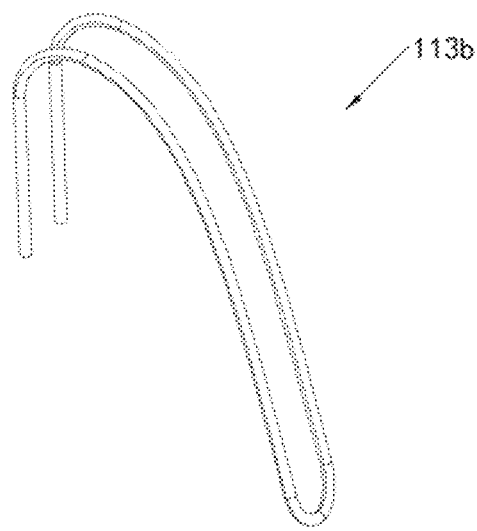
FIG. 13B is a schematic diagram of a partial structure of an SMA component shown in FIG. 13A.
Figure 14:
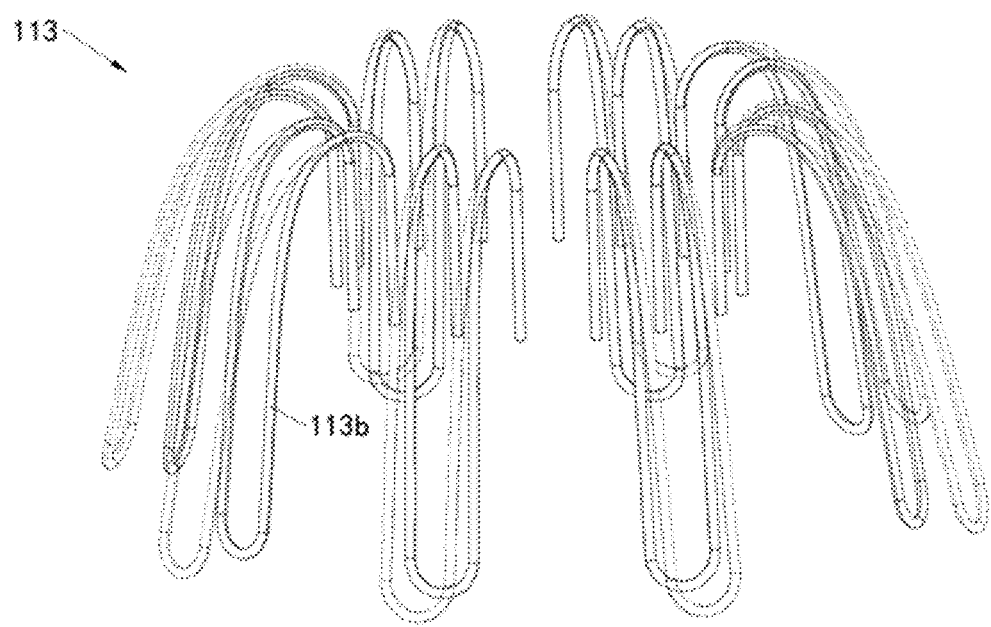
FIG. 14 is a schematic diagram of a deformation status of an SMA component of an earbud shown in FIG. 12A.

Refer to FIG. 12A to FIG. 14. FIG. 12A is a schematic diagram of a structure of the earbud 11 shown in FIG. 2 according to some other embodiments. FIG. 12B is a schematic diagram of an internal structure of the earbud 11 shown in FIG. 12A. FIG. 13A is a schematic diagram of a structure of an SMA component 113 of the earbud 11 shown in FIG. 12A. FIG. 13B is a schematic diagram of a partial structure of the SMA component 113 shown in FIG. 13A. FIG. 14 is a schematic diagram of a deformation status of the SMA component 113 of the earbud 11 shown in FIG. 12A.

In some embodiments, the earbud 11 includes a base 111, an earbud body 112, and the SMA component 113. The earbud body 112 includes a stationary portion 112a and a contact portion 112b. The contact portion 112b is disposed around the stationary portion 112a, the top of the contact portion 112b is connected to the top of the stationary portion 112a, and the bottom of the stationary portion 112a is fastened to the base 111. The earbud body 112 is made of an elastic material. The SMA component 113 is embedded in the earbud body 112 in an encircling manner. The earbud 11 in this embodiment may include most features of the earbud 11 in the foregoing embodiments. A main difference between the earbud 11 in this embodiment and the earbud 11 in the foregoing embodiments lies in that a shape design for the SMA component 113 is different. The following mainly describes a shape of the SMA component 113 in this embodiment. For other solution content of this embodiment, refer to the foregoing embodiments. Details are not described herein again.

For example, the SMA component 113 includes a plurality of SMA wires 113b, the plurality of SMA wires 113b are arranged at spacings in a circumferential direction of the earbud body 112, and each SMA wire 113b extends from the bottom of the stationary portion 112a to the bottom of the contact portion 112*b* through the top of the stationary portion 112*a* and the top of the contact portion 112*b*.

The SMA wire 113*b* may be a double-stranded wire, and the two strands are connected to each other at the bottom of the contact portion 112*b*. For example, the SMA wire 113*b* includes a first connection section, a first movable section, a transition section, a second movable section, and a second connection section that are sequentially connected. The first connection section and the second connection section are roughly parallel and are spaced apart from each other, and are embedded in the stationary portion 112*a* of the earbud body 112. The first movable section and the second movable section are roughly parallel and are spaced apart from each other, and are embedded in the contact portion 112*b* of the earbud body 112. The transition section is located in the contact portion 112*b* of the earbud body 112.

The bottom of the first connection section and the second connection section may be fastened to the base 111, and the first connection section and the second connection section extend from the bottom of the stationary portion 112*a* of the earbud body 112 to the top of the stationary portion 112*a*. The first movable section and the second movable section may extend from the top of the contact portion 112*b* of the earbud body 112 to the bottom of the contact portion 112*b*. The transition section may be located at the bottom of the contact portion 112*b* of the earbud body 112. In FIG. 14, solid lines correspond to a shrunk state of the SMA component 113, and dashed lines correspond to an expanded state of the SMA component 113. During deformation of the SMA component 113, deformation of the SMA component 113 mainly occurs at a first movable section and a second movable section of each SMA wire 113*b*, the first connection section, the transition section, and the second connection section of the SMA wire 113*b* slightly deform or do not deform, and the first movable section and the second movable section of the SMA wire 113*b* are away from or close to the first connection section and the second connection section.

In this embodiment, because the SMA wire 113*b* is in a double-stranded wire structure, structural strength of the SMA component 113 is higher. This improves pressure resistance reliability of the earbud 11, reduces a risk that the SMA wire is depressed and cannot be recovered because the user accidentally applies extra pressure at a specific angle when using the headset 1, and improves structural reliability of the earbud 11. In addition, a connection structure between the SMA component 113 and the earbud body 112 is more stable. This helps improve structural reliability of the earbud 11.

For example, the SMA component 113 may include 5 to 10 SMA wires 113*b*. A length of a single SMA wire 113*b* may approximately fall in a range of 16 mm to 26 mm. For example, the SMA component 113 may include eight SMA wires 113*b*, a length of each SMA wire 113*b* may be 21.41 mm, and a total length may be 21.41 mm×8=171.28 mm. A wire diameter of the SMA wire 113*b* may fall in a range of 0.1 mm to 0.4 mm, for example, may be 0.15 mm. In this embodiment, the SMA component 113 may alternatively include another quantity of SMA wires 113*b*, and the SMA wires 113*b* may alternatively have another shape and size. This is not strictly limited in this embodiment of this application.

Figure 15A:
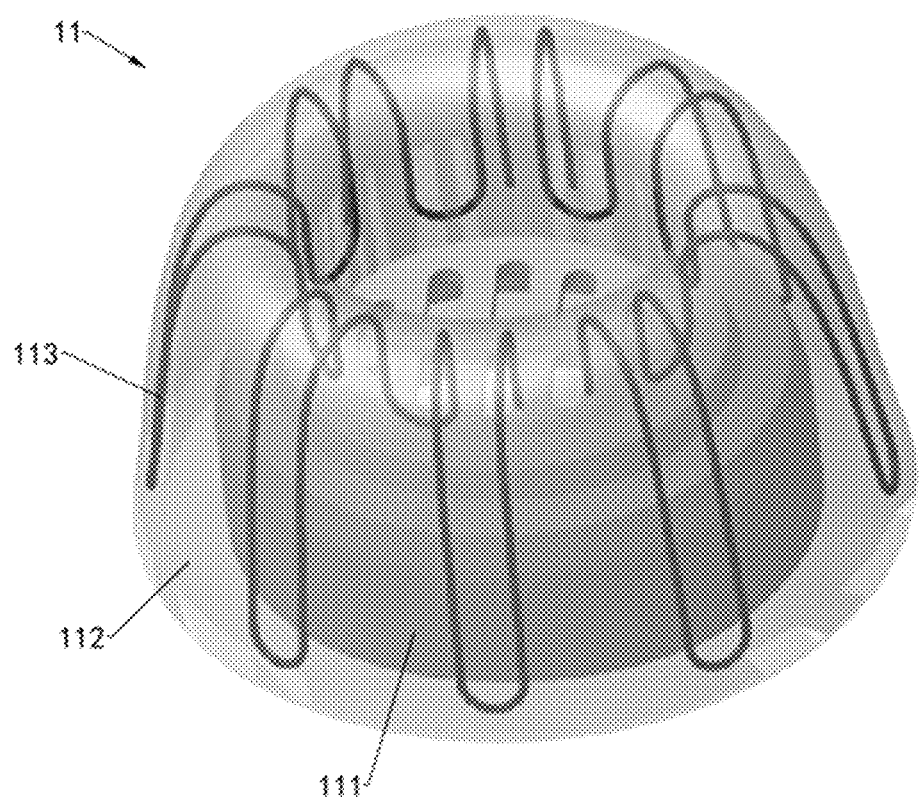
FIG. 15A is a schematic diagram of a structure of an earbud shown in FIG. 2 according to some other embodiments.
Figure 15B:
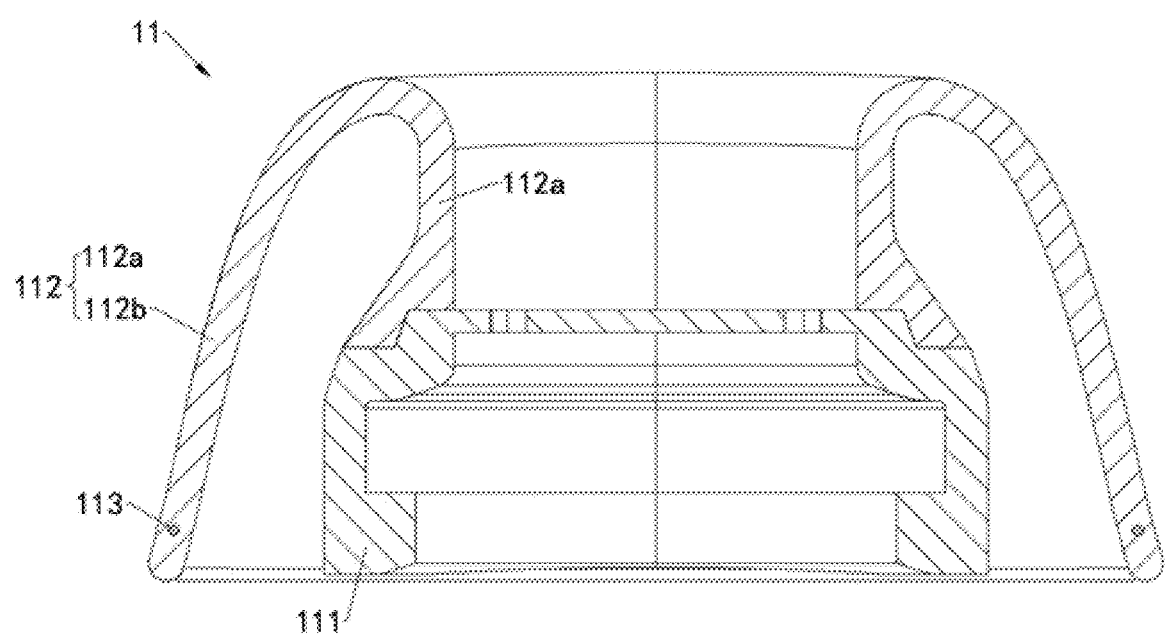
FIG. 15B is a schematic diagram of an internal structure of an earbud shown in FIG. 15A.
Figure 16:
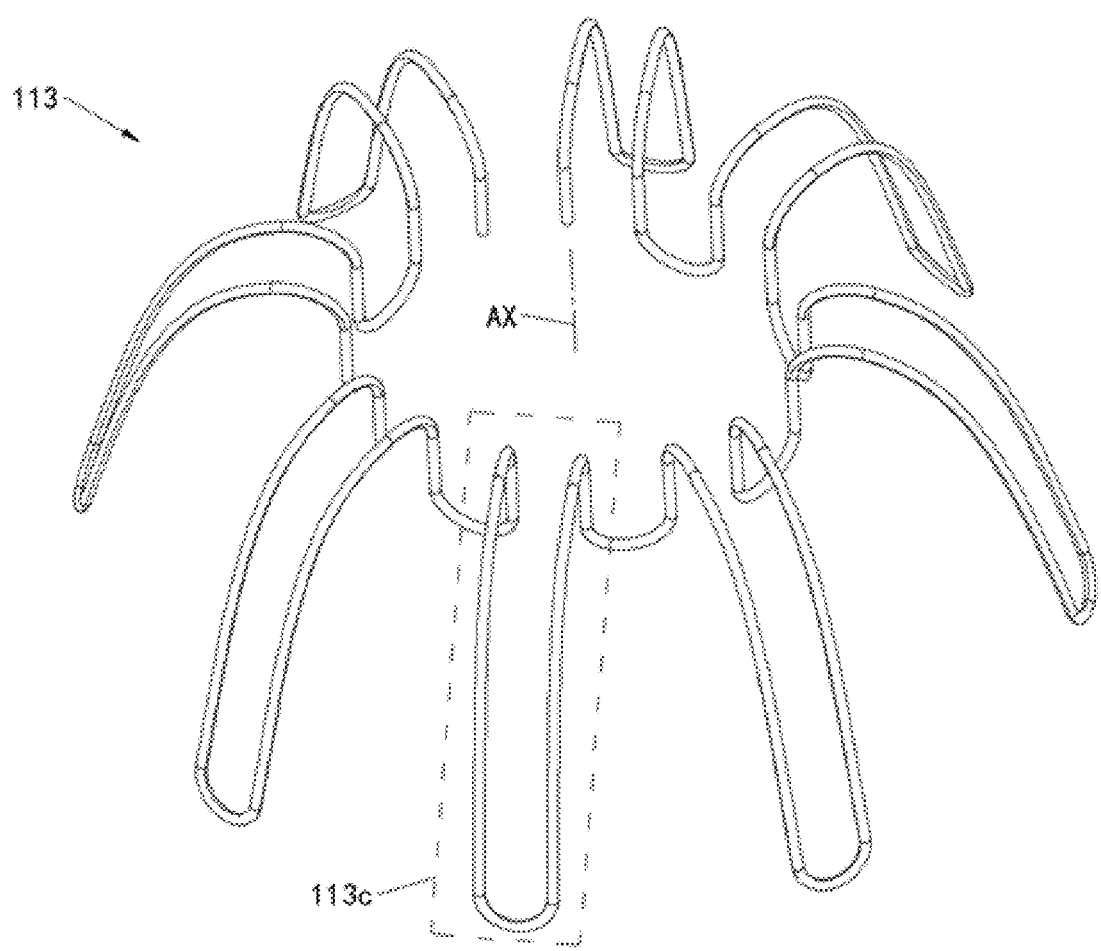
FIG. 16 is a schematic diagram of a structure of an SMA component of an earbud shown in FIG. 15A.
Figure 17:
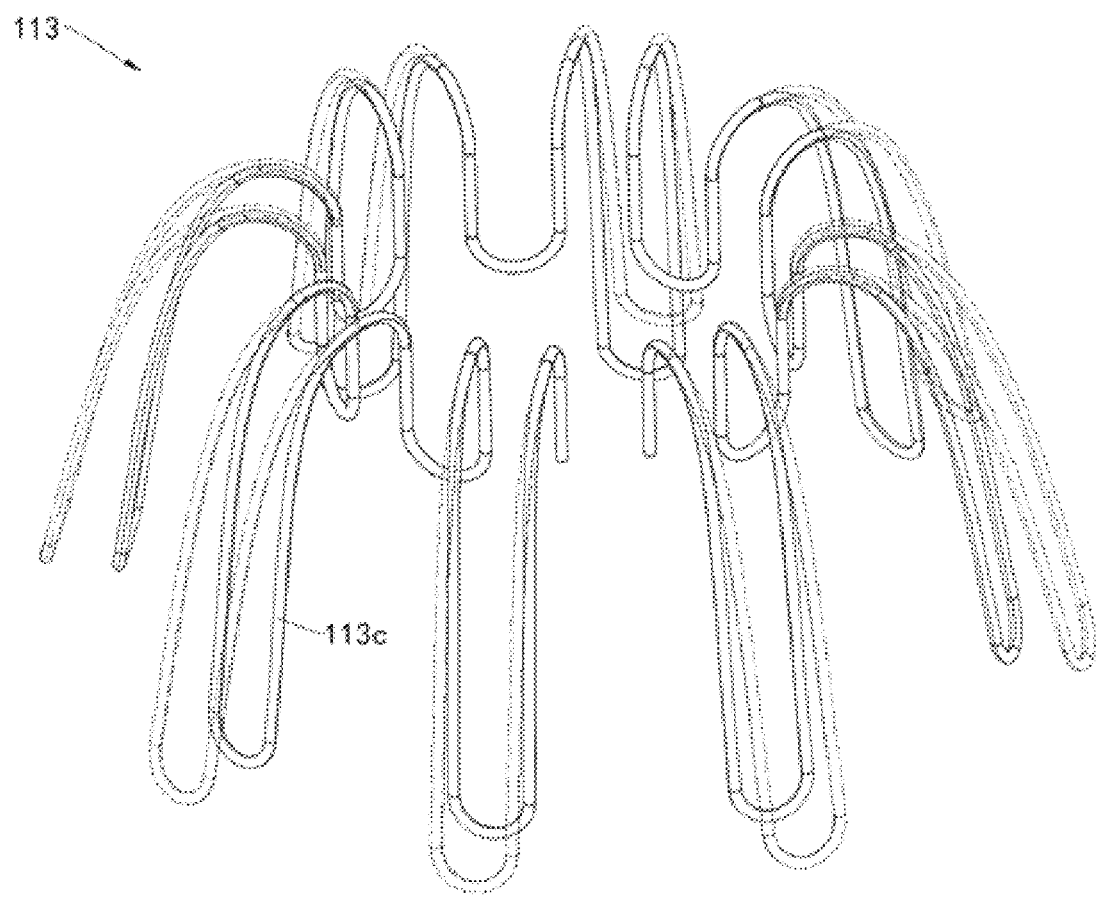
FIG. 17 is a schematic diagram of a deformation status of an SMA component of an earbud shown in FIG. 15A.

Refer to FIG. 15A to FIG. 17. FIG. 15A is a schematic diagram of a structure of the earbud 11 shown in FIG. 2 according to some other embodiments. FIG. 15B is a schematic diagram of an internal structure of the earbud 11 shown in FIG. 15A. FIG. 16 is a schematic diagram of a structure of an SMA component 113 of the earbud 11 shown in FIG. 15A. FIG. 17 is a schematic diagram of a deformation status of the SMA component 113 of the earbud 11 shown in FIG. 15A.

In some embodiments, the earbud 11 includes a base 111, an earbud body 112, and the SMA component 113. The earbud body 112 includes a stationary portion 112*a* and a contact portion 112*b*. The contact portion 112*b* is disposed around the stationary portion 112*a*, the top of the contact portion 112*b* is connected to the top of the stationary portion 112*a*, and the bottom of the stationary portion 112*a* is fastened to the base 111. The earbud body 112 is made of an elastic material. The SMA component 113 is embedded in the earbud body 112 in an encircling manner. The earbud 11 in this embodiment may include most features of the earbud 11 in the foregoing embodiments. A main difference between the earbud 11 in this embodiment and the earbud 11 in the foregoing embodiments lies in that a shape design for the SMA component 113 is different. The following mainly describes a shape of the SMA component 113 in this embodiment. For other solution content of this embodiment, refer to the foregoing embodiments. Details are not described herein again.

For example, the SMA component 113 is a continuous single SMA wire. The SMA component 113 includes a plurality of deformable parts 113*c*. The plurality of deformable parts 113*c* are arranged in a circumferential direction of the earbud body 112. Each deformable part 113*c* extends from the bottom of the stationary portion 112*a* to the bottom of the contact portion 112*b* through the top of the stationary portion 112*a* and the top of the contact portion 112*b*. The deformable part 113*c* may include a first connection section, a first movable section, a first transition section, a second movable section, a second connection section, and a second transition section that are sequentially connected. The first connection section and the second connection section are roughly parallel and are spaced apart from each other, and are embedded in the stationary portion 112*a* of the earbud body 112. The first movable section and the second movable section are roughly parallel and are spaced apart from each other, and are embedded in the contact portion 112*b* of the earbud body 112. The first transition section is located in the contact portion 112*b* of the earbud body 112. The second transition section is located in the stationary portion 112*a* of the earbud body 112. The second transition section is connected to a first connection section of an adjacent deformable part 113*c*. The first connection section and the first movable section form a double-stranded wire structure with the second connection section and the second movable section, to improve structural strength of the SMA component 113, improve pressure resistance reliability of the SMA component 113, and reduce a risk that the SMA wire is depressed and cannot be recovered because the user accidentally applies extra pressure at a specific angle when using the headset 1. Two adjacent parts of the plurality of deformable parts 113*c* of the SMA component 113 may be disconnected to form a connection port.

The first connection section and the second connection section may extend from the bottom of the stationary portion 112*a* of the earbud body 112 to the top of the stationary portion 112*a*. The first movable section and the second movable section may extend from the top of the contact portion 112*b* of the earbud body 112 to the bottom. The first transition section may be located at the bottom of the contact portion 112*b* of the earbud body 112. The second transition section may be located at the bottom of the stationary portion 112*a* of the earbud body 112. In FIG. 17, solid lines correspond to a shrunk state of the SMA component 113, and dashed lines correspond to an expanded state of the SMA component 113. During deformation of the SMA component 113, deformation of the SMA component 113 mainly occurs at a first movable section and a second movable section of each deformable part 113c of the SMA component 113, a first connection section, a first transition section, a second connection section, and a second transition section of each deformable part 113c slightly deform or do not deform, and the first movable section and the second movable section of each deformable part 113c are away from or close to the first connection section and the second connection section.

In a solution in which the SMA component 113 includes a plurality of mutually independent SMA wires (113a/113b), when the user wears the headset 1 and the earbud 11 fits into the ear canal, ear temperature in contact with different positions on the earbud body 112 varies. Consequently, SMA wires (113a/113b) at different positions on the earbud body 112 have different temperature rise statuses and different deformation speeds. In this embodiment, the SMA component 113 is disposed as an integrated continuous SMA wire. In this way, temperature variation coefficients of the plurality of deformable parts 113c of the SMA component 113 are the same, and temperature rise statuses of the plurality of deformable parts 113c of the SMA component 113 are the same or similar, so that the plurality of deformable parts 113c deform at the same time, to better match the ear canal of the user and improve wearing comfort of the headset 1.

For example, a total length of the SMA component 113 may range from 130 mm to 200 mm, for example, may be 168.797 mm. A wire diameter of the SMA component 113 may fall in a range of 0.1 mm to 0.4 mm, for example, may be 0.15 mm.

Figure 18A:
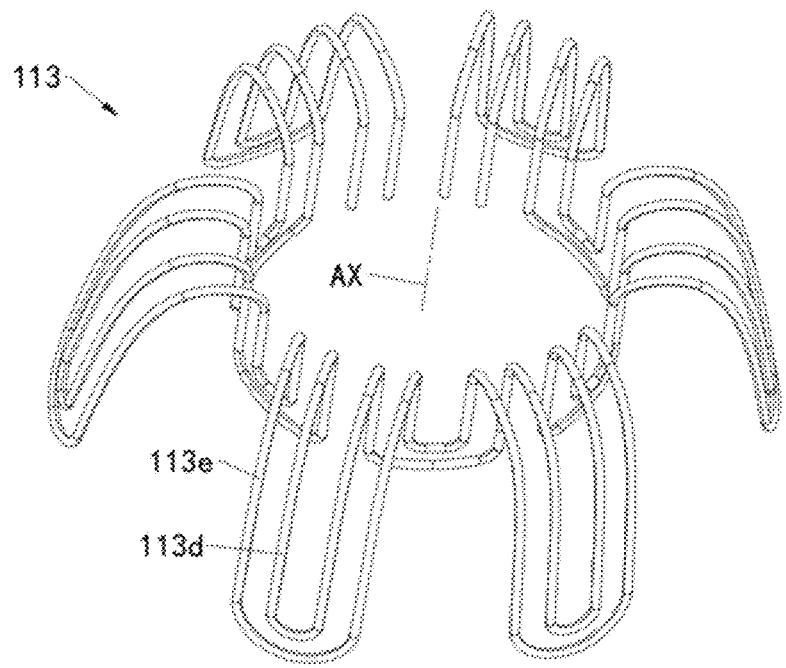
FIG. 18A is a schematic diagram of a structure of an SMA component of an earbud shown in FIG. 2 according to some other embodiments.
Figure 18B:
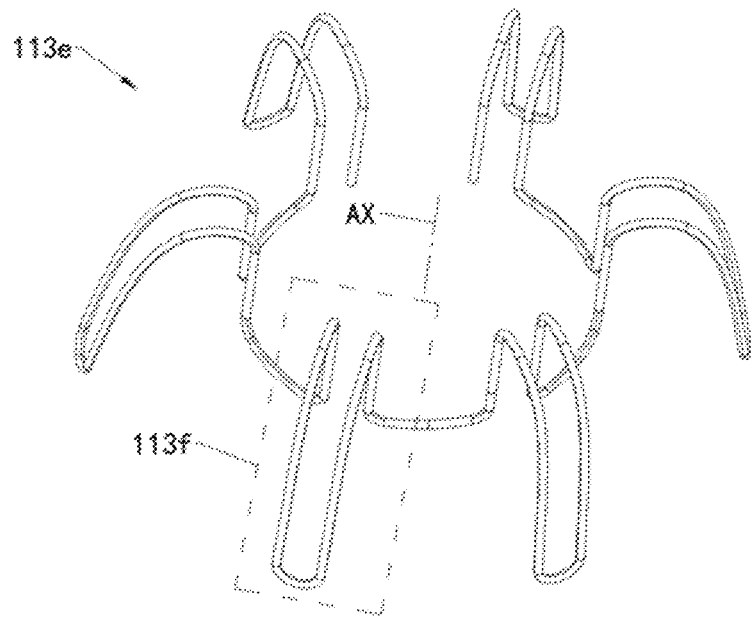
FIG. 18B is a schematic diagram of a partial structure of an SMA component shown in FIG. 18A.
Figure 18C:
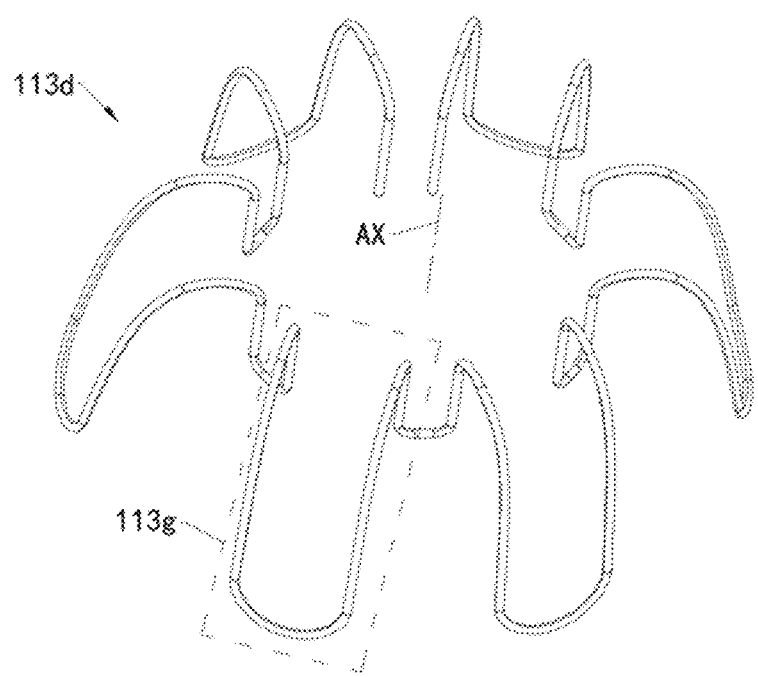
FIG. 18C is a schematic diagram of another partial structure of an SMA component shown in FIG. 18A.

Refer to FIG. 18A to FIG. 18C. FIG. 18A is a schematic diagram of a structure of the SMA component 113 of the earbud 11 shown in FIG. 2 according to some other embodiments. FIG. 18B is a schematic diagram of a partial structure of the SMA component 113 shown in FIG. 18A. FIG. 18C is a schematic diagram of another partial structure of the SMA component 113 shown in FIG. 18A.

This embodiment provides a structure of another SMA component 113. For example, the SMA component 113 includes a first SMA wire 113d and a second SMA wire 113e, both the first SMA wire 113d and the second SMA wire 113e are continuous SMA wires, and the first SMA wire 113d and the second SMA wire 113e are arranged in a nested manner and are spaced apart from each other. The first SMA wire 113d includes a plurality of first deformable parts 113f, where the plurality of first deformable parts 113f are arranged in a circumferential direction of the earbud body 112, and each first deformable part 113f extends from the bottom of the stationary portion 112a to the bottom of the contact portion 112b through the top of the stationary portion 112a and the top of the contact portion 112b. The second SMA wire 113e includes a plurality of second deformable parts 113g, where the plurality of second deformable parts 113g are arranged in the circumferential direction of the earbud body 112, and each second deformable part 113g extends from the bottom of the stationary portion 112a to the bottom of the contact portion 112b through the top of the stationary portion 112a and the top of the contact portion 112b.

For other solution content of the first SMA wire 113d, refer to the structural design of the SMA component 113 in the embodiment shown in FIG. 15A. For other solution content of the second SMA wire 113e, also refer to the structural design of the SMA component 113 in the embodiment shown in FIG. 15A. The second SMA wire 113e and the first SMA wire 113d have similar main structures, and have different sizes in shapes. Wire diameters of the second SMA wire 113e and the first SMA wire 113d may be the same or different. Phase transition temperature of the second SMA wire 113e and the first SMA wire 113d may be the same or different. In some other embodiments, the SMA component 113 may alternatively include another quantity of SMA wires, and the SMA wire may alternatively have another shape and size. This is not strictly limited in this application.

Figure 19A:
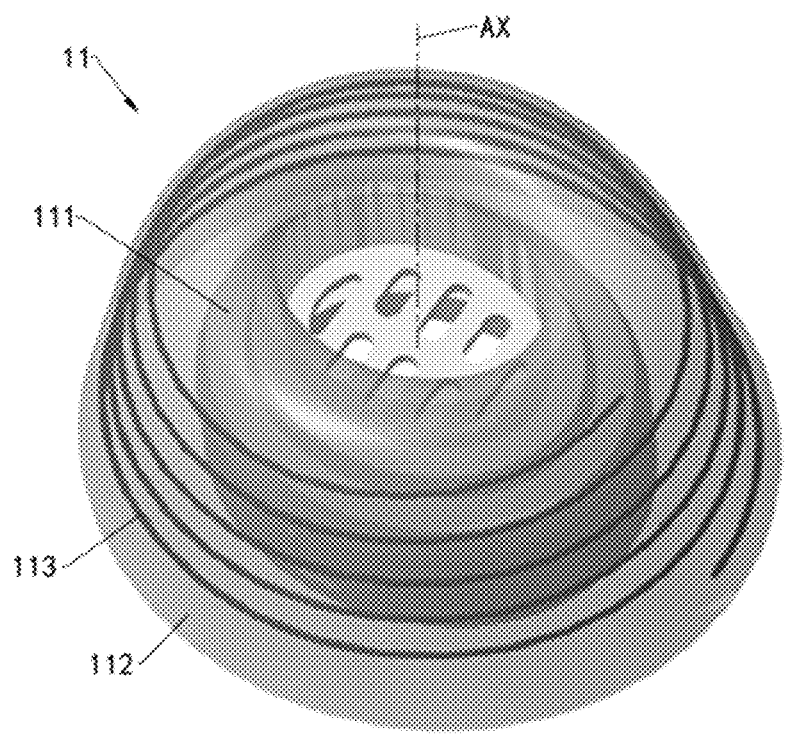
FIG. 19A is a schematic diagram of a structure of an earbud shown in FIG. 2 according to some other embodiments.
Figure 19B:
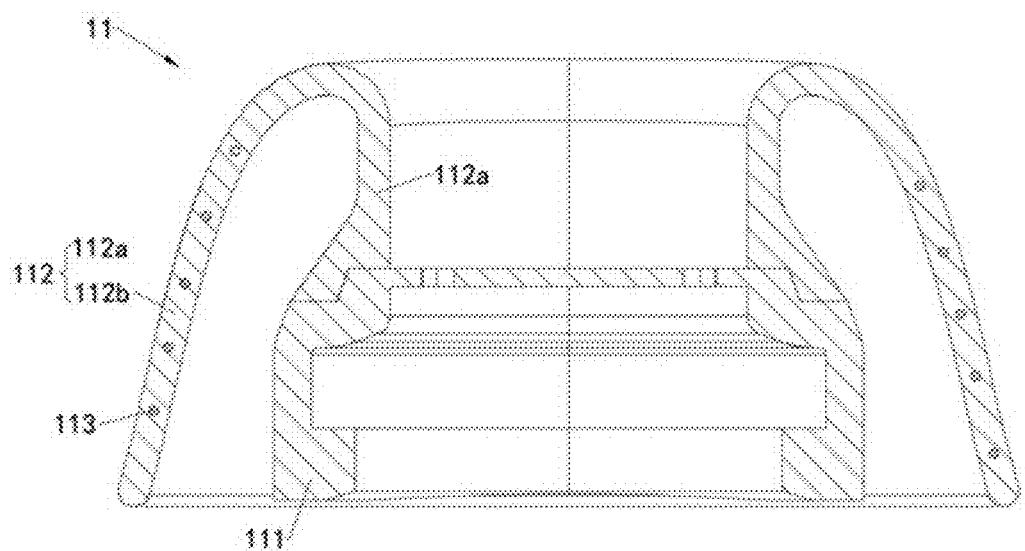
FIG. 19B is a schematic diagram of an internal structure of an earbud shown in FIG. 19A.
Figure 20:
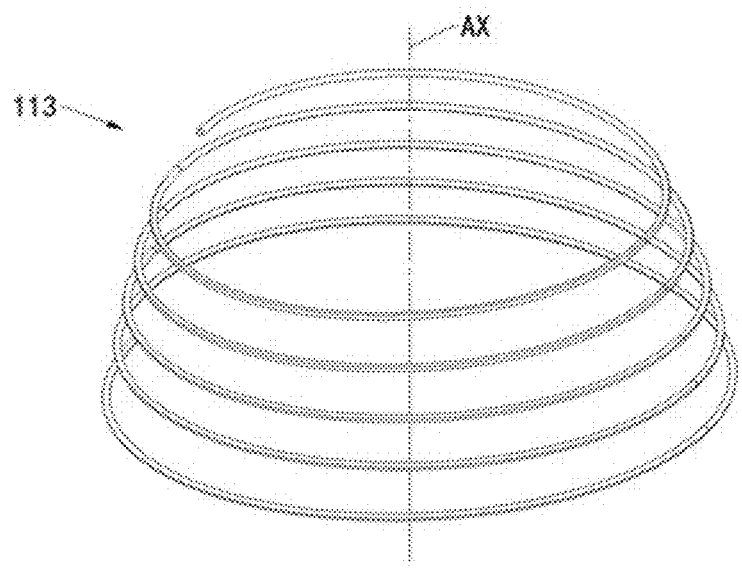
FIG. 20 is a schematic diagram of a structure of an SMA component of an earbud shown in FIG. 19A.

Refer to FIG. 19A to FIG. 20. FIG. 19A is a schematic diagram of a structure of the earbud 11 shown in FIG. 2 according to some other embodiments. FIG. 19B is a schematic diagram of an internal structure of the earbud 11 shown in FIG. 19A. FIG. 20 is a schematic diagram of a structure of an SMA component 113 of the earbud 11 shown in FIG. 19A.

In some embodiments, the earbud 11 includes a base 111, an earbud body 112, and the SMA component 113. The earbud body 112 includes a stationary portion 112a and a contact portion 112b. The contact portion 112b is disposed around the stationary portion 112a, the top of the contact portion 112b is connected to the top of the stationary portion 112a, and the bottom of the stationary portion 112a is fastened to the base 111. The earbud body 112 is made of an elastic material. The SMA component 113 is embedded in the earbud body 112 in an encircling manner. The earbud 11 in this embodiment may include most features of the earbud 11 in the foregoing embodiments. A main difference between the earbud 11 in this embodiment and the earbud 11 in the foregoing embodiments lies in that a shape design for the SMA component 113 is different. The following mainly describes a shape of the SMA component 113 in this embodiment. For other solution content of this embodiment, refer to the foregoing embodiments. Details are not described herein again.

For example, the SMA component 113 is a continuous single SMA wire, the SMA component 113 is located in the contact portion 112b, and the SMA component 113 is shaped like a spiral. An overall shape of the SMA component 113 adapts to a shape of the contact portion 112b of the earbud body 112. In an extension direction from one end of the SMA component 113 to the other end, the SMA component 113 spirally rises toward the center line AX. The SMA component 113 may be formed by molding an SMA wire that is wound into a ring shape. Based on SMA deformation effect and the elastic structure of the earbud body 112, the earbud 11 can expand to an expected size and be restored to an initial state after being used. For example, there may be a plurality of implementations for a length, a wire diameter, a spiral angle, and the like of the SMA component 113. For example, a length of the SMA component 113 may fall in a range of 150 mm to 210 mm, for example, 181.815 mm; and a wire diameter may fall in a range of 0.1 mm to 0.4 mm, for example, 0.15 mm. This is not strictly limited in this embodiment of this application.

Figure 21A:
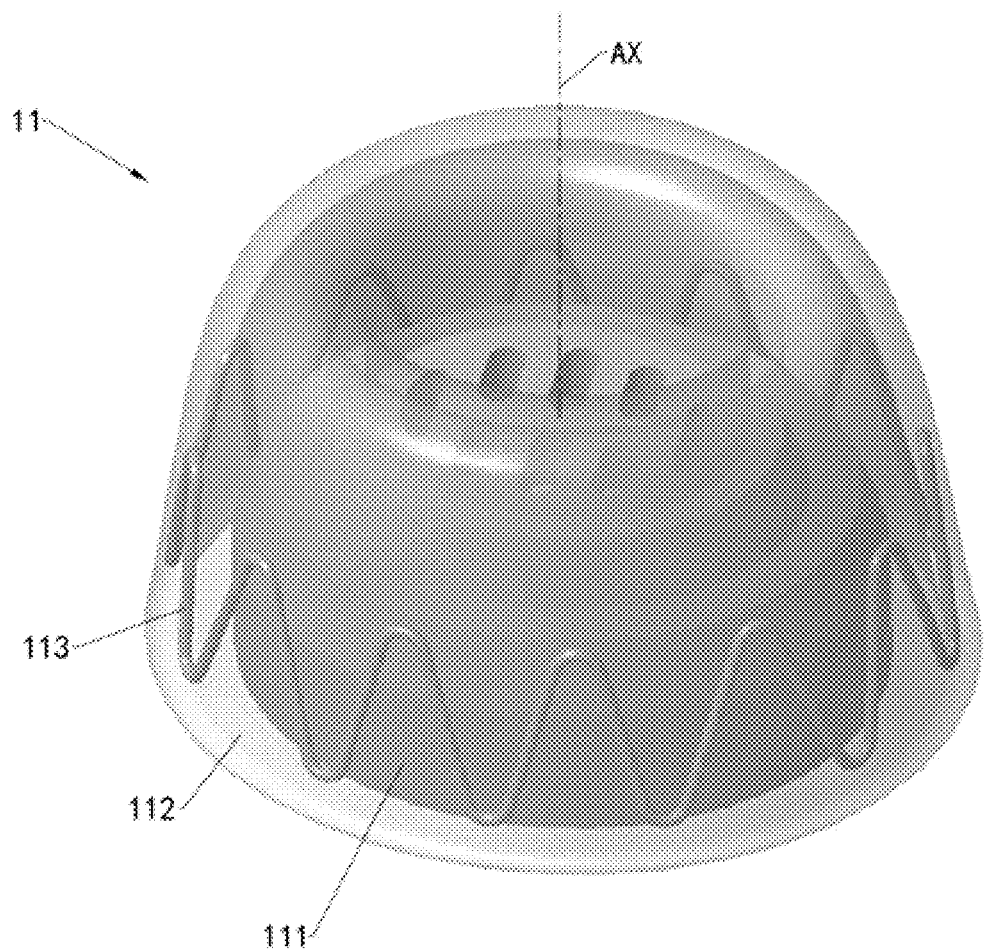
FIG. 21A is a schematic diagram of a structure of an earbud shown in FIG. 2 according to some other embodiments.
Figure 21B:
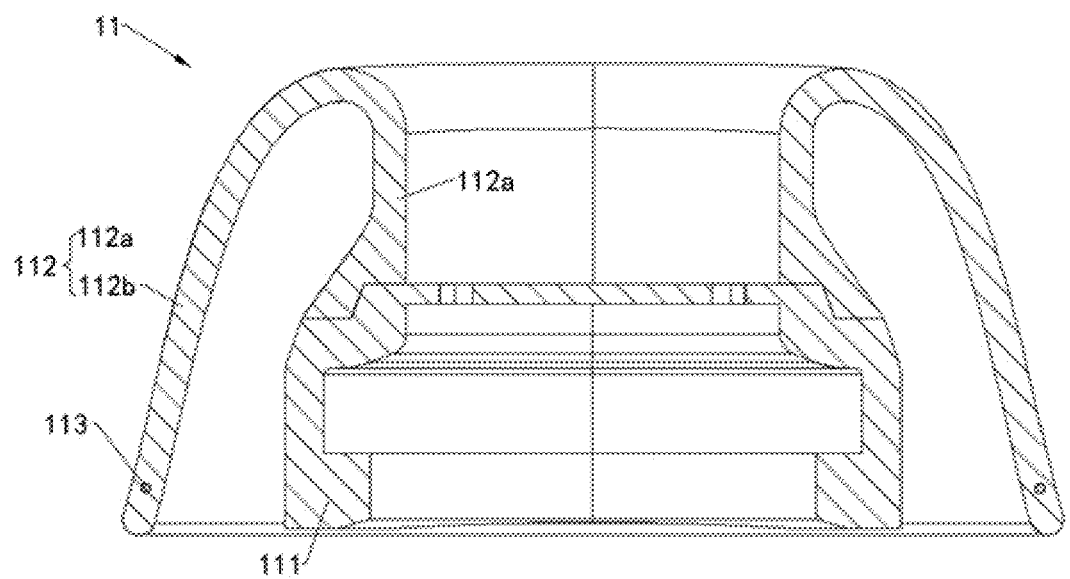
FIG. 21B is a schematic diagram of an internal structure of an earbud shown in FIG. 21A.
Figure 22:
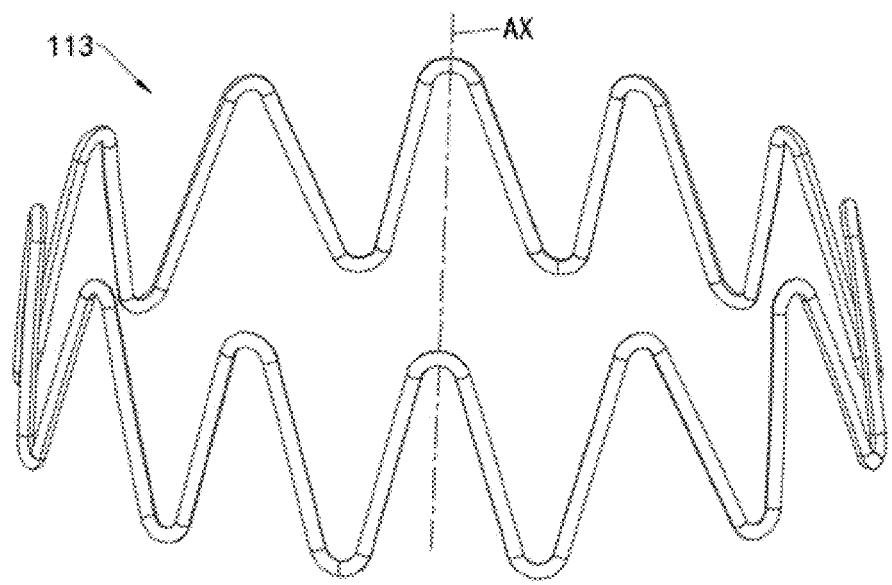
FIG. 22 is a schematic diagram of a structure of an SMA component of an earbud shown in FIG. 21A.

Refer to FIG. 21A to FIG. 22. FIG. 21A is a schematic diagram of a structure of the earbud 11 shown in FIG. 2 according to some other embodiments. FIG. 21B is a schematic diagram of an internal structure of the earbud 11 shown in FIG. 21A. FIG. 22 is a schematic diagram of a structure of an SMA component 113 of the earbud 11 shown in FIG. 21A.

In some embodiments, the earbud 11 includes a base 111, an earbud body 112, and the SMA component 113. The earbud body 112 includes a stationary portion 112a and a contact portion 112b. The contact portion 112b is disposed around the stationary portion 112a, the top of the contact portion 112b is connected to the top of the stationary portion 112a, and the bottom of the stationary portion 112a is fastened to the base 111. The earbud body 112 is made of an elastic material. The SMA component 113 is embedded in the earbud body 112 in an encircling manner. The earbud 11 in this embodiment may include most features of the earbud 11 in the foregoing embodiments. A main difference between the earbud 11 in this embodiment and the earbud 11 in the foregoing embodiments lies in that a shape design for the SMA component 113 is different. The following mainly describes a shape of the SMA component 113 in this embodiment. For other solution content of this embodiment, refer to the foregoing embodiments. Details are not described herein again.

For example, the SMA component 113 is a continuous single SMA wire, the SMA component 113 is located at the bottom of the contact portion 112b, and the SMA component 113 extends like a wave and is shaped like a ring. A wave-shaped amplitude of the SMA component 113 in an expanded form is less than a wave-shaped amplitude of the SMA component 113 in a shrunk form.

For example, there may be a plurality of implementations for a wire diameter, a wavy size, and the like of the SMA component 113. For example, the wire diameter may fall in a range of 0.1 mm to 0.4 mm, for example, 0.2 mm; a spacing between two wave peaks of the SMA component 113 may fall in a range of 1 mm to 3 mm, for example, 1.92 mm; and a wave-shaped amplitude of the SMA component 113 may fall in a range of 1.6 mm to 3 mm, for example, 2.4 mm. This is not strictly limited in this embodiment of this application.

In the earbud 11 in the foregoing embodiments, deformation of the SMA component 113 of the earbud 11 does not rely on circuit control. Although power consumption of the headset 1 can be reduced, good experience of wearing comfort cannot be achieved in some scenarios. For example, when the user is in a high temperature environment (for example, ambient temperature is close to or higher than 35° C.), when the user takes out the headset 1 from the headset case, the earbud 11 senses the external high temperature environment and starts to deform to expand to a largest expanded form. Consequently, some users cannot properly put the earbud 11 into an ear canal. Therefore, in this application, an earbud solution in which temperature and deformation of an SMA component 113 are controlled based on a circuit is further designed. In this solution, deformation of an earbud 11 does not completely rely on ear temperature, to prevent interference from ambient temperature and improve experience of wearing comfort of the earbud 11.

This application mainly provides three solutions for controlling an SMA component 113 based on a circuit. A main difference between the three solutions lies in a structure of an SMA component 113, a circuit electrically connected to the SMA component 113, and a method for controlling deformation of an earbud 11. If there is no conflict, some technical solutions of the three solutions may be combined, and mutual reference may be made.

First Embodiment

An earbud 11 is designed in a "heat expandable and cold shrinkable" structure. Phase transition temperature of an SMA component 113 of the earbud 11 is designed to be higher than 36° C. For example, the phase transition temperature falls in a range of 36° C. to 40° C., and an initial form of an earbud body 112 is a shrunk form. In a normal temperature environment (approximately at 25° C.) or a high temperature environment (approximately at 35° C.), the SMA component 113 does not reach the phase transition temperature, the SMA component 113 is in a shrunk form along with the earbud body 112, and a shape of the earbud 11 facilitates wearing by the user. A headset 1 may determine, through wearing detection, whether a user wears the headset 1. If the user wears the headset 1, the SMA component 113 of the earbud 11 is powered, so that temperature of the SMA component 113 increases to the phase transition temperature. The SMA component 113 drives the earbud body 112 to expand, and the earbud 11 expands to adapt to an ear canal environment of the user, to achieve comfortable wearing effect.

Figure 23:
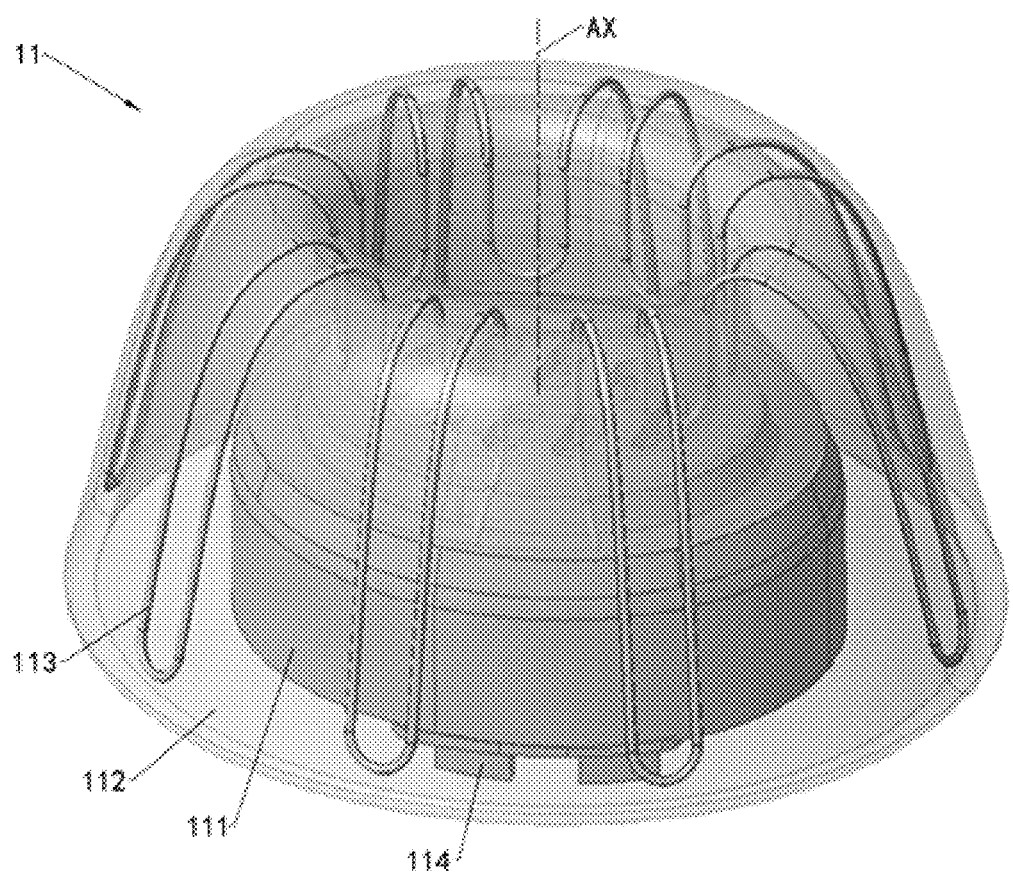
FIG. 23 is a schematic diagram of a structure of an earbud shown in FIG. 2 according to some other embodiments.
Figure 24:
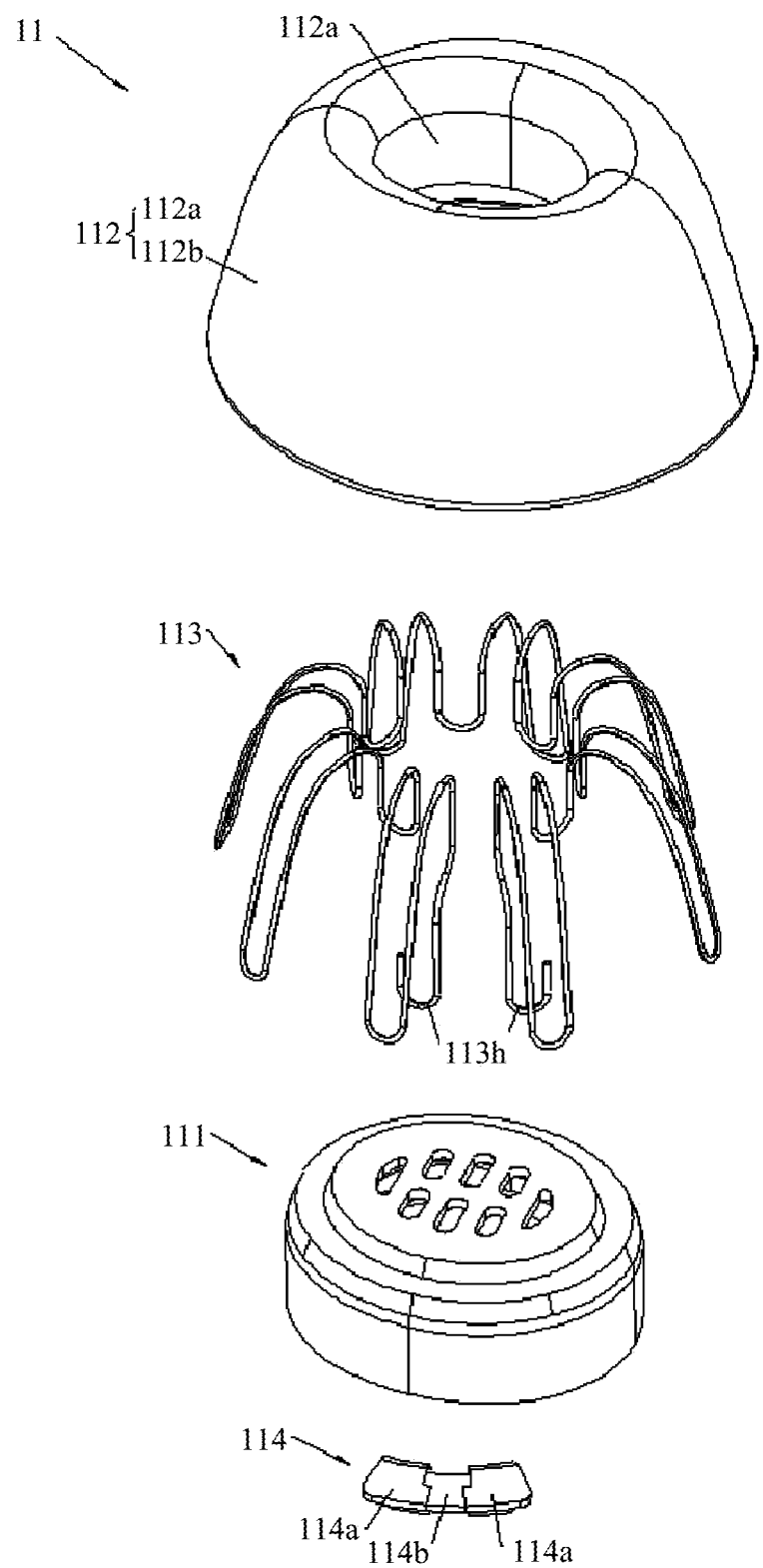
FIG. 24 is a schematic exploded view of a structure of an earbud shown in FIG. 23.

Refer to FIG. 23 and FIG. 24. FIG. 23 is a schematic diagram of a structure of the earbud 11 shown in FIG. 2 according to some other embodiments. FIG. 24 is a schematic exploded view of a structure of the earbud 11 shown in FIG. 23.

In some embodiments, the earbud 11 includes a base 111, an earbud body 112, an SMA component 113, and a conductor 114. The earbud body 112 includes a stationary portion 112a and a contact portion 112b. The contact portion 112b is disposed around the stationary portion 112a, the top of the contact portion 112b is connected to the top of the stationary portion 112a, and the bottom of the stationary portion 112a is fastened to the base 111. The earbud body 112 is made of an elastic material. The SMA component 113 is embedded in the earbud body 112 in an encircling manner. The conductor 114 is fastened to the base 111, and the SMA component 113 is electrically connected to the conductor 114. The earbud 11 in this embodiment may include most features of the earbud 11 in the foregoing embodiments. A main difference between the earbud 11 in this embodiment and the earbud 11 in the foregoing embodiments lies in that the conductor 114 is disposed, and the SMA component 113 is electrically connected to the conductor 114. The following mainly describes a structure of the conductor 114 in this embodiment and a connection structure of the SMA component 113 and the conductor 114. For other solution content of this embodiment, refer to the foregoing embodiments. Details are not described herein again.

In this embodiment, an example in which the SMA component 113 is a continuous SMA wire is used for description, and the SMA component 113 may have two connection ports 113h. In this case, the conductor 114 may include two conducting portions 114a and an insulation portion 114b fastened between the two conducting portions 114a. The conducting portion 114a may be made of a metal material, and the insulation portion 114b may be made of a polycarbonate (Polycarbonate, PC) material.

Figure 25:
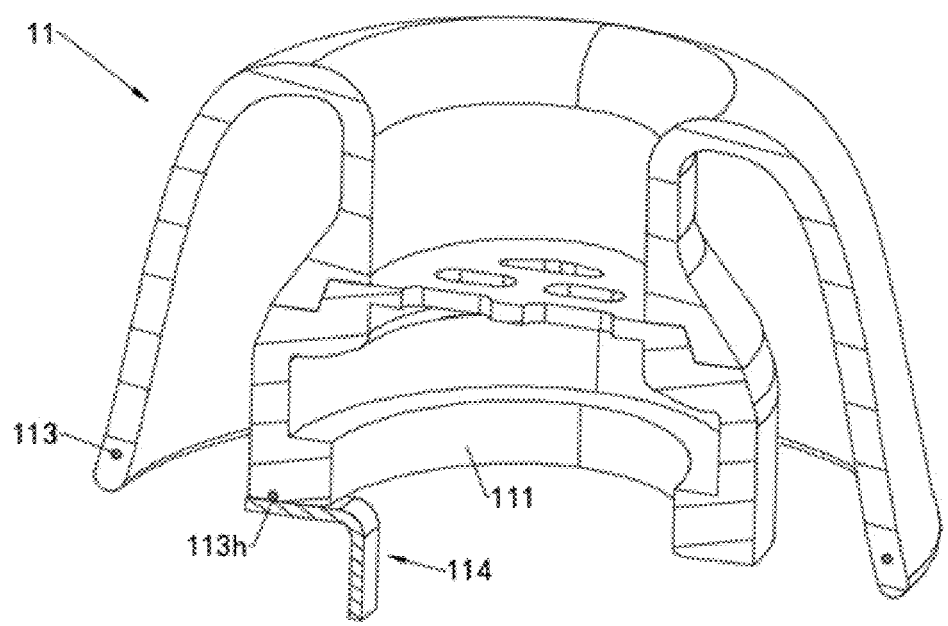
FIG. 25 is a schematic diagram of an internal structure of an earbud shown in FIG. 23.
Figure 26:
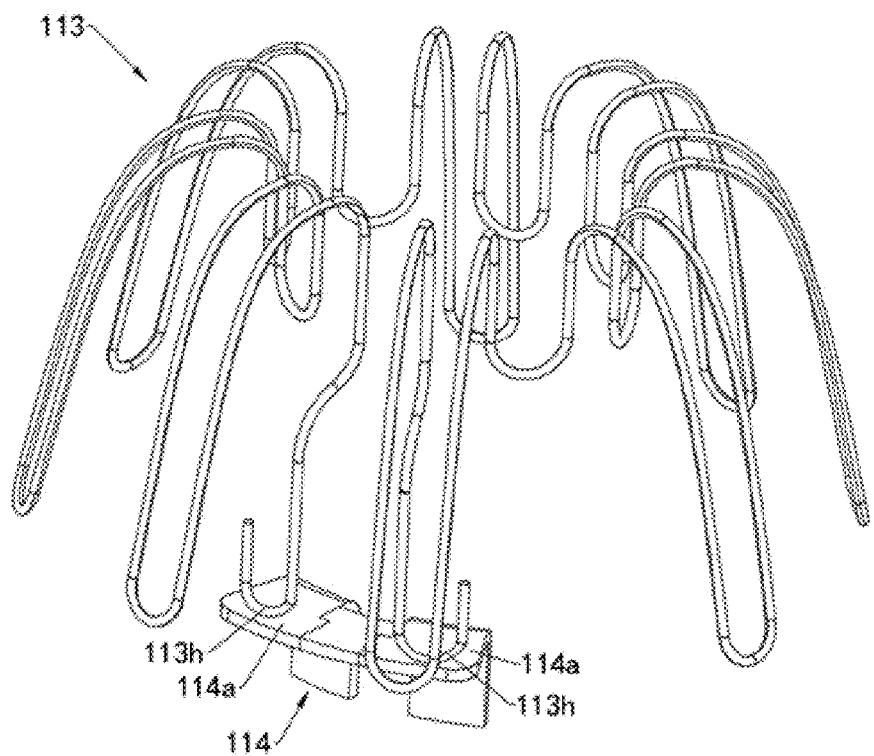
FIG. 26 is a schematic diagram of an assembly structure of an SMA component and a conductor shown in FIG. 24.

Refer to FIG. 25 and FIG. 26. FIG. 25 is a schematic diagram of an internal structure of the earbud 11 shown in FIG. 23. FIG. 26 is a schematic diagram of an assembly structure of the SMA component 113 and the conductor 114 shown in FIG. 24.

For example, the conductor 114 may be fastened to the bottom of the base 111. The two connection ports 113h of the SMA component 113 may be embedded in the base 111, and extend to the bottom of the base 111 to fasten the conductor 114. The two connection ports 113h of the SMA component 113 are respectively connected to the two conducting portions 114a of the conductor 114. In some other embodiments, the SMA component 113 may alternatively be disposed as a plurality of SMA wires, and correspondingly, a plurality of pairs of connection ports are disposed. One port of each pair of connection ports is connected to a conducting portion 114a, and the other port is connected to another conducting portion 114a.

Figure 27:
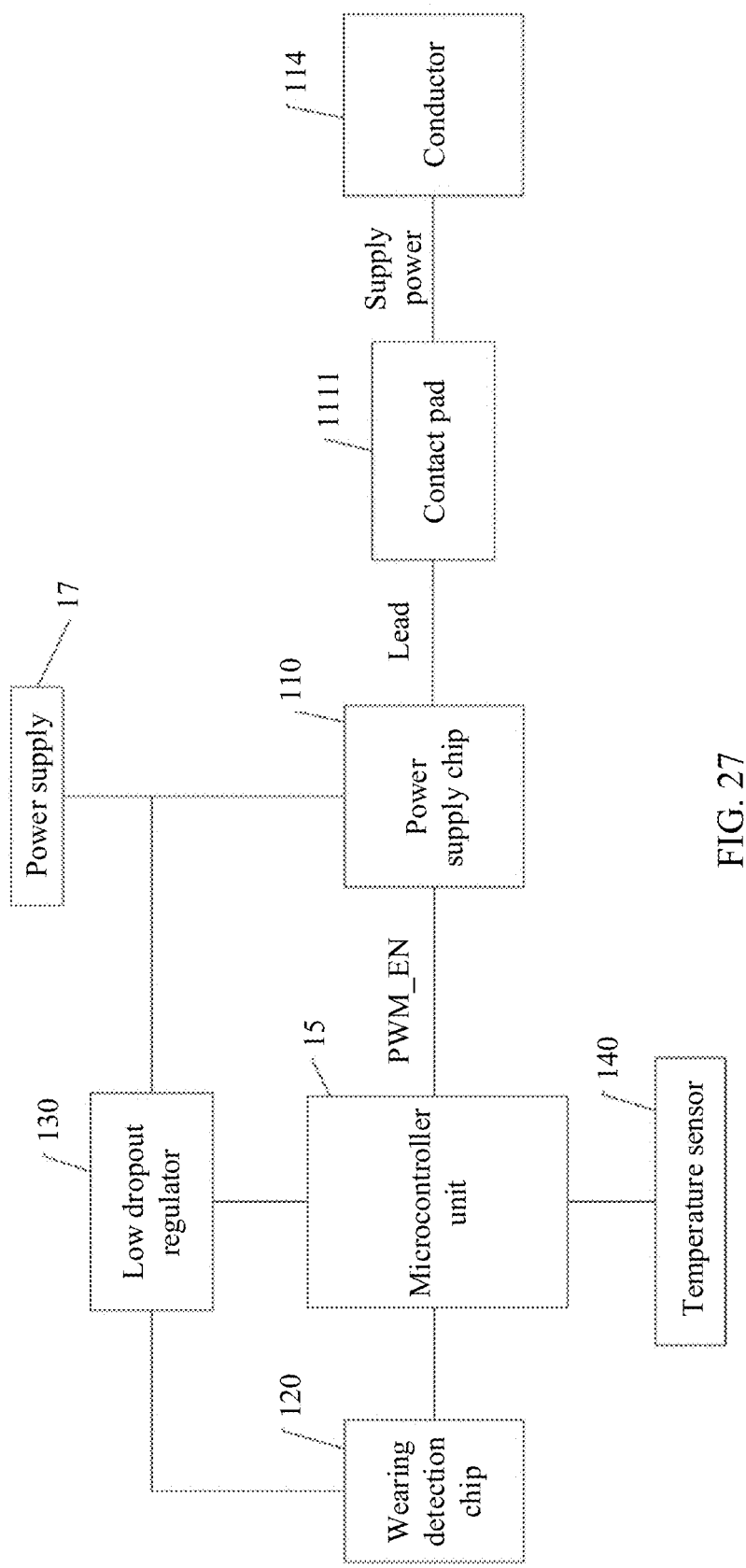
FIG. 27 is a schematic block diagram of a circuit structure of a headset shown in FIG. 2 according to some embodiments.

Refer to FIG. 2, FIG. 23, and FIG. 27. FIG. 27 is a schematic block diagram of a circuit structure of the headset 1 shown in FIG. 2 according to some embodiments. For example, the headset 1 may further include a power supply chip (power management IC, also referred to as a power management chip) 110 fastened to the circuit board 14, and the power supply chip 110 is electrically connected to the power supply 17 and the microcontroller unit 15. The microcontroller unit 15 may send a pulse width modulation (pulse width modulation, PWM) signal and an enable (enable, EN) signal to the power supply chip 110. The enable signal is used to control switching-on and switching-off of the power supply chip 110 to supply or not supply power. Pulse width modulation can adjust an amplitude of an output voltage of the power supply chip 110 through a feedback loop of the power supply chip 110.

The power supply chip 110 is further electrically connected to the conductor 114, to be electrically connected to the SMA component 113. The power supply chip 110 is configured to control a deformation status of the SMA component 113. The base 111 may further include a contact pad 1111. The contact pad 1111 is in contact with the conductor 114 to implement an electrical connection. The contact pad 1111 may be connected to the power supply chip 110 through a lead. Alternatively, the headset 1 may further include a flexible circuit board (not shown in the figure). The flexible circuit board is connected between the conductor 114 and the circuit board 14, to connect the conductor 114 to an external circuit.

For example, the headset 1 may further include a wearing detection chip 120, the wearing detection chip 120 is electrically connected to the microcontroller unit 15, and the wearing detection chip 120 is configured to detect whether the headset 1 is in a worn state.

For example, the headset 1 may further include a low dropout regulator (low dropout regulator, LDO) 130. The low dropout regulator 130 is connected to the power supply 17, the microcontroller unit 15, and the wearing detection chip 120, and is configured to supply power to the microcontroller unit 15 and the wearing detection chip 120. A value of a voltage output by the low dropout regulator 130 to the microcontroller unit 15 depends on an operating voltage of the microcontroller unit 15. A value of a voltage output by the low dropout regulator 130 to the wearing detection chip 120 depends on an operating voltage of the wearing detection chip 120.

For example, the headset 1 may further include a temperature sensor 140. The temperature sensor 140 can be configured to detect temperature in an environment in which the headset 1 is located. There may be one or more temperature sensors 140. The temperature sensor 140 may be fastened to the circuit board 14 and/or the contact portion 112b of the earbud body 112. When the user wears the headset 1, a temperature sensor 140 fastened to the contact portion 112b of the earbud body 112 may detect temperature in the ear canal, and a temperature sensor 140 fastened to the circuit board 14 may detect temperature outside the ear canal. Certainly, in some other embodiments, the temperature sensor 140 may alternatively be fastened at another position on the headset 1, and may also detect temperature in the ear canal and/or temperature outside the ear canal. The microcontroller unit 15 is electrically connected to the temperature sensor 140. The microcontroller unit 15 may control, based on detection data of the temperature sensor 140, the power supply chip 110 to perform a related operation. The microcontroller unit 15 may perform a subsequent operation based on data of the temperature in the ear canal and/or the temperature outside the ear canal; or may also perform processing such as averaging and correction on the temperature in the ear canal and/or the temperature outside the ear canal to obtain processed data, and then perform a subsequent operation based on the processed data.

It can be understood that, in some other embodiments, compared with the foregoing embodiments, the circuit of the headset 1 may include more or fewer components, or the foregoing components may be split or combined. This is not strictly limited in this embodiment of this application.

Figure 28:
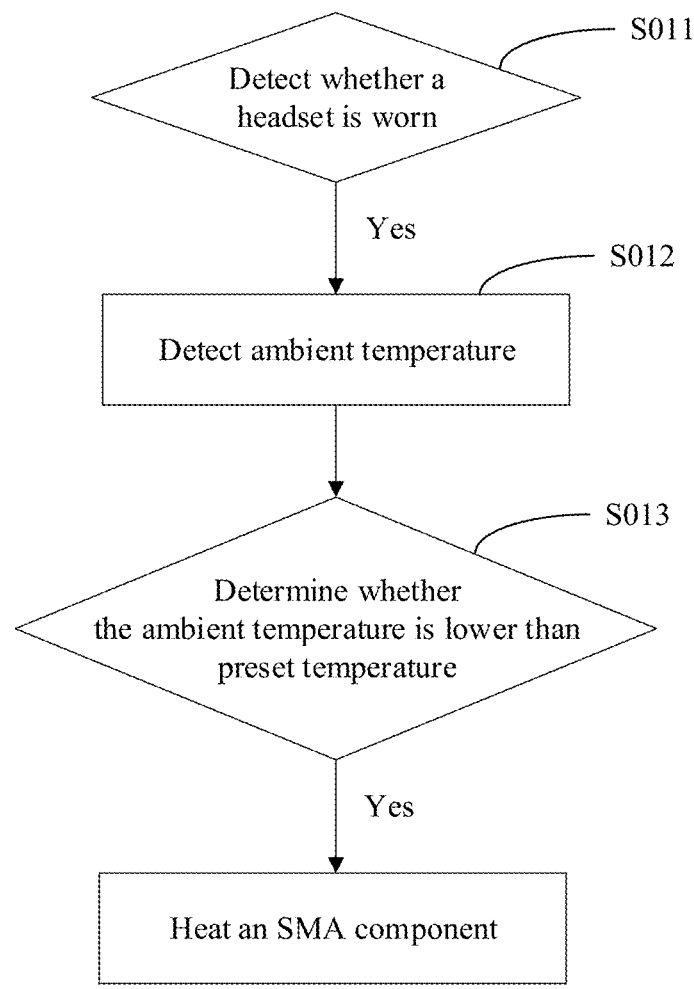
FIG. 28 is a flowchart of a method for controlling deformation of an earbud according to an embodiment of this application.

Based on the foregoing solution, this application provides a method for controlling deformation of the earbud 11. FIG. 28 is a flowchart of a method for controlling deformation of the earbud 11 according to an embodiment of this application.

The method for controlling deformation of the earbud 11 includes the following steps.

Step S011: Detect whether the headset 1 is worn.

The headset 1 may detect, through the wearing detection chip 120, whether the headset 1 is in a worn state. When it is detected that the headset 1 is not in a worn state, the process ends.

Step S012: If the headset 1 is worn, detect ambient temperature.

The headset 1 may detect the ambient temperature through the temperature sensor 140.

Step S013: If the ambient temperature is lower than preset temperature, heat the SMA component 113, so that the SMA component 113 drives the earbud body 112 to expand.

The power supply chip 110 may supply power to heat the SMA component 113. The power supply chip 110 does not need to continuously supply power to the SMA component 113, and may stop supplying power after the SMA component 113 expands to a comfort cutoff point. The headset 1 may periodically perform, at a specific time interval, the foregoing method for controlling deformation of the earbud 11.

In this embodiment, because the phase transition temperature of the SMA component 113 is higher than most ambient temperature, the headset 1 in a small shape can smoothly fit into the ear canal of the user, and can also quickly expand to a comfortable shape through power-on after being worn, so that the headset 1 has high wearing comfort.

Second Embodiment

An earbud 11 of a headset 1 is designed in a "heat shrinkable and cold expandable" structure. For example, phase transition temperature of an SMA component 113 is set to approximately 40° C. When the SMA component 113 reaches the phase transition temperature, the SMA component 113 deforms to a shrunk form. An initial form of an earbud body 112 is an expanded form. To be specific, when the headset 1 is in an environment in which temperature is lower than the phase transition temperature of the SMA component 113, the earbud body 112 is in the expanded form, and the SMA component 113 is in an expanded form along with the earbud body 112; and when the SMA component 113 reaches the phase transition temperature, the SMA component 113 deforms and drives the earbud body 112 to deform to a shrunk form.

Figure 29:
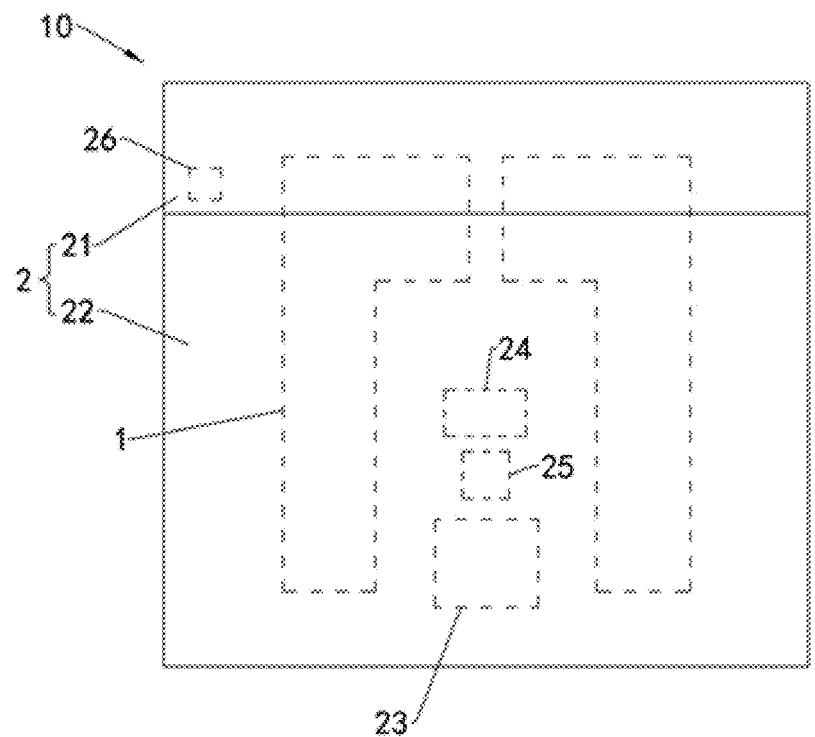
FIG. 29 is a schematic diagram of a structure of a headset assembly according to an embodiment of this application.
Figure 30:
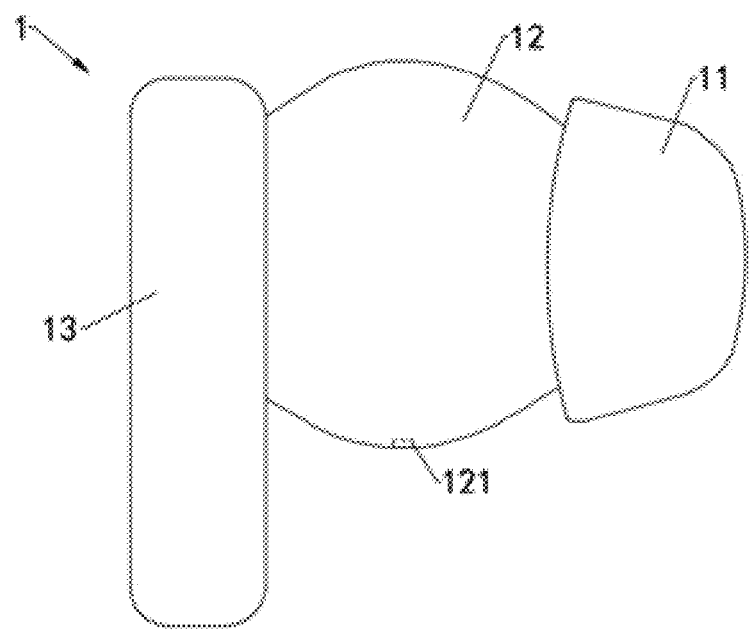
FIG. 30 is a schematic diagram of a structure of a headset of a headset assembly shown in FIG. 29.

Refer to FIG. 29 and FIG. 30. FIG. 29 is a schematic diagram of a structure of a headset assembly according to an embodiment of this application. FIG. 30 is a schematic diagram of a structure of a headset 1 of the headset assembly shown in FIG. 29.

For example, the headset assembly 10 includes a headset case 2 and the headset 1, and the headset 1 can be detachably accommodated in the headset case 2. The headset case 2 may charge the headset 1, and may also be referred to as a charging case.

The headset case 2 includes a case body 21 and a cover 22, and the cover 22 may be rotatably connected to the case body 21. The headset case 2 may include a power supply 23 (namely, a battery), a microcontroller unit (microcontroller unit, MCU) 24, and a power supply chip 25. The power supply 23 is configured to supply power to the headset case 2. The microcontroller unit 24 is electrically connected to the power supply 23 and the power supply chip 25, and the microcontroller unit 24 is configured to control an action of the power supply chip 25. The power supply chip 25 is electrically connected to the headset 1 placed in the headset case 2, to control a deformation status of an SMA component 113 of the headset 1. The power supply chip 25 may be further configured to charge the headset 1 placed in the headset case 2. The power supply chip 25 is further configured to connect to an external circuit to charge the power supply 23. The headset 1 may be further provided with a detection module 26, where the detection module 26 is configured to detect whether the cover 22 is open. The headset case 2 may further include a detection module 26, where the detection module 26 is configured to detect whether the headset case 2 is open, and the detection module 26 is electrically connected to the microcontroller unit 24.

In this embodiment, the headset 1 may include an earbud 11, an ear housing 12, and an ear handle 13. Both the earbud 11 and the ear handle 13 are fastened to the ear housing 12. The earbud 11 may be in the structure in the embodiment shown in FIG. 23. Certainly, in some other embodiments, the earbud 11 may alternatively be in another structure in which the SMA component 113 can be connected to an external circuit. This is not strictly limited in this embodiment of this application.

For example, the headset 1 may be further provided with a contact pin (pin) 121, and the contact pin 121 may be disposed on the ear housing 12, for example, may be disposed at the bottom of the ear housing 12. The contact pin 121 is electrically connected to a conductor 114 of the earbud 11 (refer to FIG. 23), to be electrically connected to the SMA component 113. When the headset 1 is accommodated in the headset case 2, the contact pin 121 may be electrically connected to the power supply chip 25 of the headset case 2, so that the power supply chip 25 is electrically connected to the SMA component 113, to control a deformation status of the SMA component 113. For example, the power supply chip 25 may supply power to heat the SMA component 113, so that the SMA component 113 reaches phase transition temperature and deforms. For another technical solution of the headset 1, refer to related descriptions in the foregoing embodiments. Details are not described herein again.

For example, when the headset 1 is in the headset case 2, the headset 1 is in a low temperature state (ambient temperature is lower than the phase transition temperature of the SMA component 113). In this case, the SMA component 113 is in an expanded form along with the earbud body 112. After a user opens the cover 22 of the headset case 2, power may be quickly supplied to the SMA component 113 through a drive circuit of the headset case 2, so that temperature of the SMA component 113 reaches the phase transition temperature, a form of the SMA component 113 changes to a shrunk form, and the SMA component 113 drives the earbud body 112 to deform to a shrunk form. After the user takes out the headset 1 from the headset case 2, ambient temperature is lower than the phase transition temperature of the SMA component 113, and the earbud body 112 drives the SMA component 113 to expand. After the earbud 11 fits into an ear canal, ear canal temperature is lower than the phase transition temperature of the SMA component 113, the earbud body 112 drives the SMA component 113 to continue to expand, and the earbud body 112 stops expanding after reaching a largest shape that adapts to the ear canal of the user. In this case, a comfortable state is reached.

Figure 31:
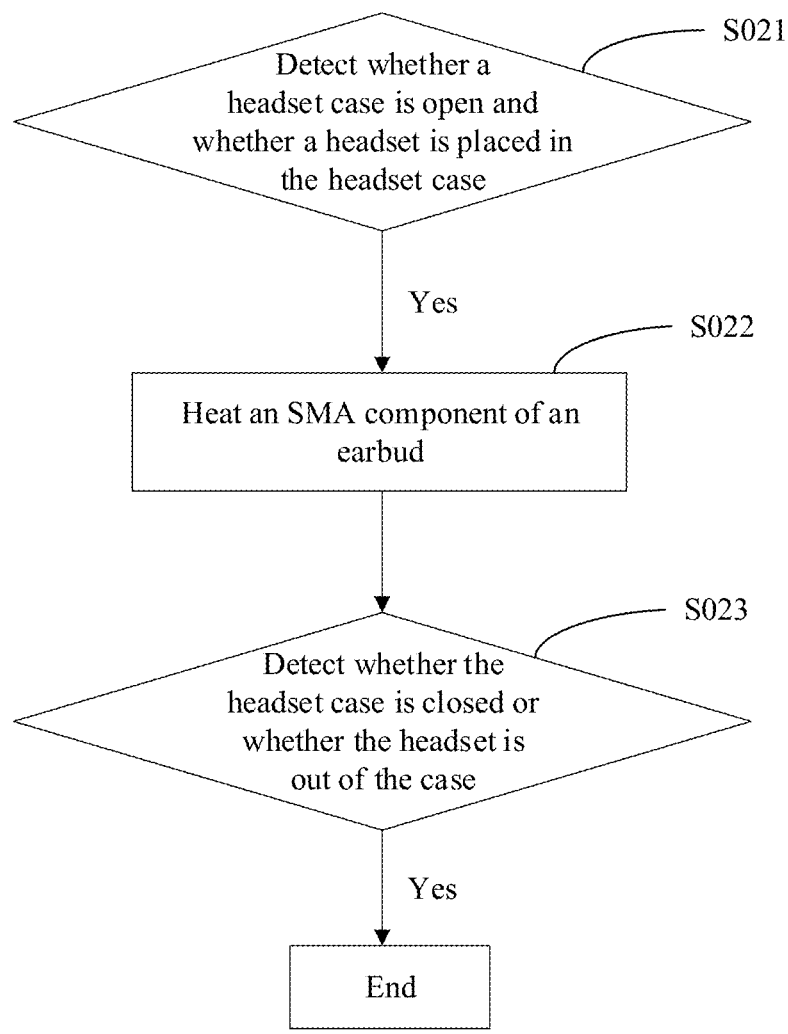
FIG. 31 is a flowchart of a method for controlling deformation of an earbud according to an embodiment of this application.

Based on the foregoing solution, this application provides a method for controlling deformation of the earbud 11. FIG. 31 is a flowchart of a method for controlling deformation of the earbud 11 according to an embodiment of this application.

The method for controlling deformation of the earbud 11 includes the following steps.

Step S021: Detect whether the headset case 2 is open and whether the headset 1 is placed in the headset case 2.

Whether the user opens the headset case 2 may be determined through open-case detection, and the open-case detection may be implemented by the detection module 26 of the headset case 2. For example, the detection module 26 may include a Hall effect sensor, to implement open-case detection based on the Hall effect sensor. For example, the Hall effect sensor may be disposed at the cover 22 of the headset case 2.

Whether the headset 1 is placed in the headset case 2 may be determined in a plurality of manners. For example, whether the headset 1 is placed in the case is determined based on whether the charging contact 19 or the contact pin 121 of the headset 1 is electrically connected to the headset case 2, or is determined by using a pressure sensor, a proximity sensor, or the like of the headset case 2. This is not strictly limited in this embodiment of this application.

If it is detected that the headset case 2 is not open or the headset 1 is not placed in the headset case 2, the process ends.

Step S022: If the headset case 2 is open and the headset 1 is placed in the headset case 2, heat the SMA component 113 of the earbud 11, so that the SMA component 113 drives the earbud body 112 to shrink.

The power supply chip 25 of the headset case 2 may supply power to heat the SMA component 113 of the earbud 11. After it is detected that the user opens the case, the power supply chip 25 may be immediately switched on to heat the SMA component 113, so that temperature of the SMA component 113 reaches the phase transition temperature within short time (for example, less than 1 s).

For example, the method for controlling deformation of the earbud 11 may further include the following step.

Step S023: Detect whether the headset case 2 is closed or whether the headset 1 is out of the case. If the headset case 2 is closed or the headset 1 is out of the case, the process ends. To be specific, the power supply chip 25 of the headset case 2 is switched off.

For a method for detecting whether the headset case 2 is closed, refer to the method for detecting whether the headset case 2 is open. For a method for detecting whether the headset 1 is out of the case, refer to the method for detecting whether the headset 1 is placed in the headset case 2. In some other embodiments, the power supply chip 25 of the headset case 2 may alternatively be switched off after the SMA component 113 is heated for a specific period of time, or switched off after the SMA component 113 is heated to the phase transition temperature.

For example, the power supply chip 25 may include a buck circuit or a boost (boost) circuit.

The boost (boost) circuit is used as an example. A boost voltage solution may be reversely deduced through theoretical calculation based on a quantity of wires of the SMA component 113 and required heating time (as shown in the following formulas).

For example, the SMA component 113 has a specific heat capacity C, density ρ, a wire radius r, a total wire length L, and a temperature rise ΔT, deformation time of the SMA component 113 is t, and an output voltage of the power supply chip 25 is U.

Resistance R of the SMA component 113 is as follows:

$$R = \frac{\rho L}{r^2}.$$

Mass m of the SMA component 113 is as follows:

m=ρπr²L.

Heat Q1 required for the temperature rise ΔT of the SMA component 113 is as follows:

Q1=CΔTm=CΔTρπr²L.

Output power P of the power supply chip 25 is as follows:

$$P = \frac{U^2}{R}.$$

Assuming that the output power of the power supply chip 25 is all converted into heat within the deformation time, heat Q2 generated by the power supply chip 25 through conversion is as follows:

$$Q2 = Pt = \frac{U^2}{R}t = \frac{U^2 r^2}{\rho l}t.$$

If other influence factors such as thermal radiation are not considered, Q1 is equal to Q2. Therefore, the following is obtained:

$$C\Delta T \rho \pi r^2 L = \frac{U^2 r^2}{\rho L}t.$$

Therefore, the following is obtained:

$$U = \rho L \sqrt{\frac{C\pi \Delta T}{t}}.$$

Third Embodiment

To more accurately control deformation effect of an SMA component 113, resolve problems in a high temperature environment and a low temperature environment, and provide a user with better experience of wearing comfort, this application further provides a structure of an SMA component 113 based on double SMA wires. One SMA wire is "heat expandable" at phase transition temperature, and may be referred to as a "heat expandable" wire. The other SMA wire is "heat shrinkable" at the phase transition temperature, and may be referred to as a "heat shrinkable" wire. In this way, the SMA component 113 can implement, through temperature control, bidirectional deformation: expansion and shrinkage.

For example, in a high temperature environment, after a user opens a headset case 2, power may be supplied to heat the "heat shrinkable" wire, so that an earbud body 112 is in a shrunk form, and an earbud 11 can comfortably fit into an ear canal. After the user puts the earbud 11 into the ear canal, heating for the "heat shrinkable" wire is stopped based on wearing detection, and the "heat expandable" wire is heated, so that the earbud body 112 quickly expands to a position comfortable for the user. After heating is performed for a short period of time (for example, several seconds), internal temperature of the ear canal can also quickly reach 35° C. or above. In this case, heating for the "heat expandable" wire may be stopped to cope with a power consumption issue. For example, for the high temperature environment, when ambient temperature is higher than 35° C. at high temperature in summer, it may be determined that this environment is a high temperature environment.

For example, in a low temperature environment, after the user opens the headset case 2, the environment is at low temperature, and the earbud body 112 is in a shrunk form, and the user can comfortably put the earbud 11 into the ear canal. After the user puts the earbud 11 into the ear canal, the "heat expandable" wire is heated based on wearing detection, so that the earbud body 112 quickly expands to a position comfortable for the user. After heating is performed for a short period of time (for example, several seconds), internal temperature of the ear canal can also quickly reach 35° C. or above. In this case, heating for the "heat expandable" wire may be stopped to cope with a power consumption issue. For example, for the low temperature environment, when ambient temperature is lower than 0° C. at low temperature in winter, it may be determined that this environment is a low temperature environment.

Figure 32A:
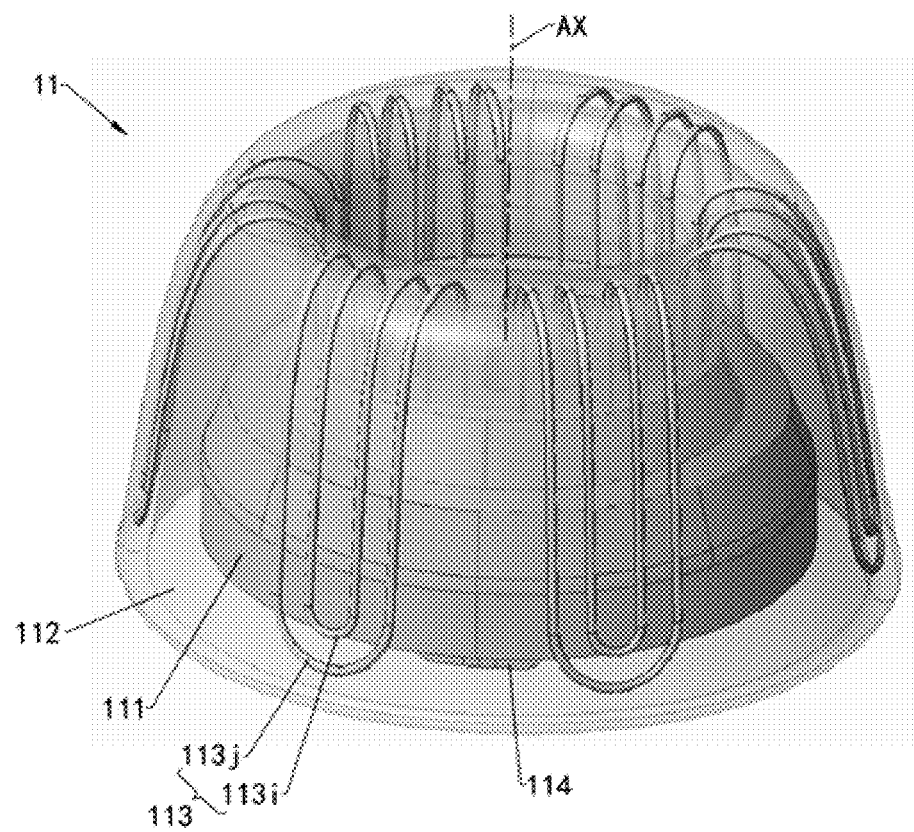
FIG. 32A is a schematic diagram of a structure of an earbud shown in FIG. 2 according to some other embodiments.
Figure 32B:
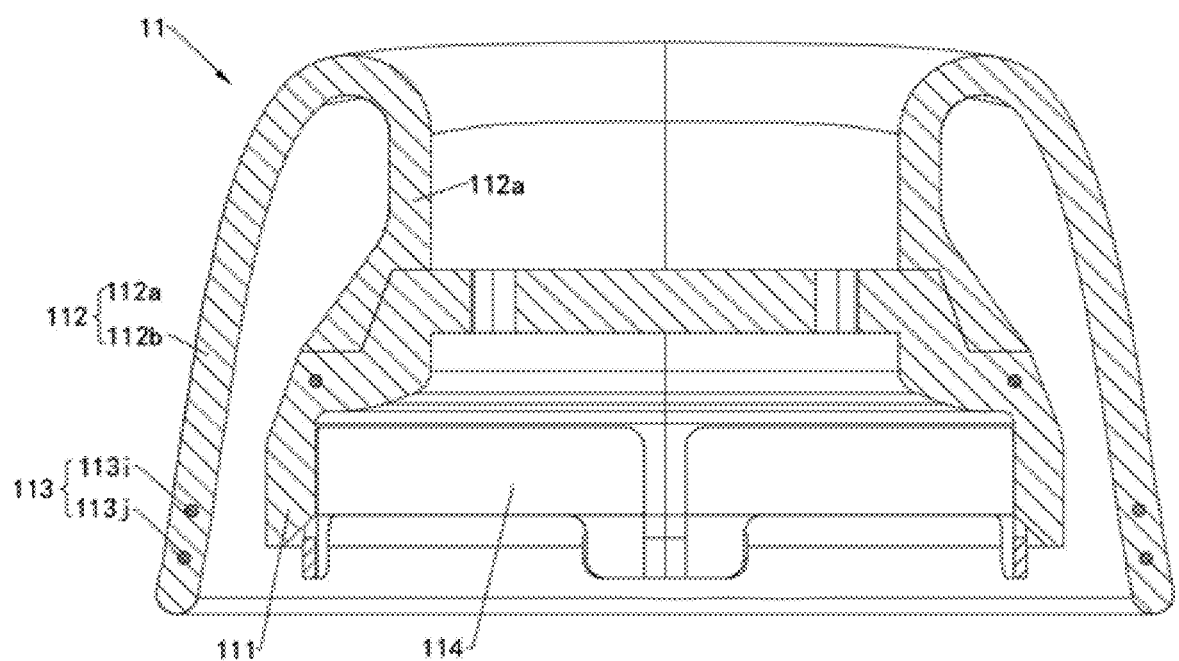
FIG. 32B is a schematic diagram of an internal structure of an earbud shown in FIG. 32A.
Figure 33:
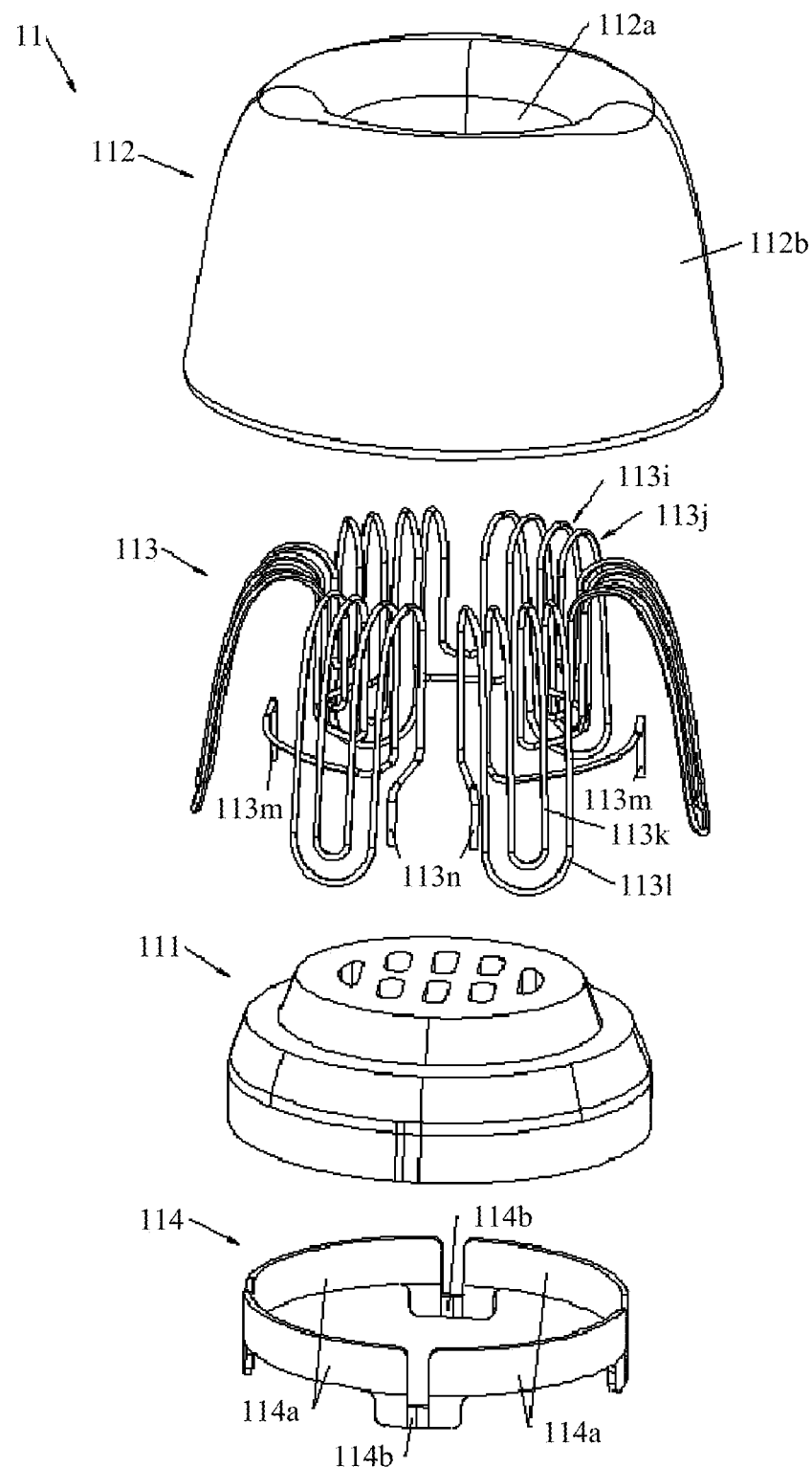
FIG. 33 is a schematic exploded view of a structure of an earbud shown in FIG. 32A.

Refer to FIG. 32A to FIG. 33. FIG. 32A is a schematic diagram of a structure of the earbud 11 shown in FIG. 2 according to some other embodiments. FIG. 32B is a schematic diagram of an internal structure of the earbud 11 shown in FIG. 32A. FIG. 33 is a schematic exploded view of a structure of the earbud 11 shown in FIG. 32A.

In some embodiments, the earbud 11 includes a base 111, an earbud body 112, an SMA component 113, and a conductor 114. The earbud body 112 includes a stationary portion 112a and a contact portion 112b. The contact portion 112b is disposed around the stationary portion 112a, the top of the contact portion 112b is connected to the top of the stationary portion 112a, and the bottom of the stationary portion 112a is fastened to the base 111. The earbud body 112 is made of an elastic material. The SMA component 113 is embedded in the earbud body 112 in an encircling manner. The conductor 114 is fastened to the base 111, and the SMA component 113 is electrically connected to the conductor 114.

For example, the SMA component 113 includes a first SMA wire 113i and a second SMA wire 113j. The first SMA wire 113i has first phase transition temperature. The first SMA wire 113i has an expanded form in an environment in which temperature is higher than or equal to the first phase transition temperature, and the first SMA wire 113i drives the earbud body 112 to deform to an expanded form. The second SMA wire 113j has second phase transition temperature. The second phase transition temperature is higher than the first phase transition temperature. The second SMA wire 113j has a shrunk form in an environment in which temperature is higher than or equal to the second phase transition temperature, and the second SMA wire 113j drives the earbud body 112 to deform to a shrunk form.

In this embodiment, the first SMA wire 113i is a "heat expandable" wire, and the second SMA wire 113j is a "heat shrinkable" wire. An initial form of the earbud body 112 is the shrunk form, and the shrunk form of the second SMA wire 113j adapts to the shrunk form of the earbud body 112.

The first phase transition temperature may be higher than 36° C., for example, may fall in a range of 36° C. to 40° C. The second phase transition temperature is higher than ear cavity temperature, for example, higher than 38° C., for example, may fall in a range of 38° C. to 42° C.

For example, the first SMA wire 113i and the second SMA wire 113j have similar forms, and may be in an internal nested structure. The first SMA wire 113i may be disposed on an inner side or an outer side of the second SMA wire 113j. For a related solution of the SMA component 113, refer to the SMA component 113 in the embodiment shown in FIG. 18A to FIG. 18C. For example, both the first SMA wire 113i and the second SMA wire 113j are continuous SMA wires, and the first SMA wire 113i and the second SMA wire 113j are arranged in a nested manner and are spaced apart from each other. The first SMA wire 113i includes a plurality of first deformable parts 113k, where the plurality of first deformable parts 113k are arranged in a circumferential direction of the earbud body 112, and each first deformable part 113k extends from the bottom of the stationary portion 112a to the bottom of the contact portion 112b through the top of the stationary portion 112a and the top of the contact portion 112b. The second SMA wire 113j includes a plurality of second deformable parts 113l, where the plurality of second deformable parts 113l are arranged in the circumferential direction of the earbud body 112, and each second deformable part 113l extends from the bottom of the stationary portion 112a to the bottom of the contact portion 112b through the top of the stationary portion 112a and the top of the contact portion 112b. Wire diameters of the first SMA wire 113i and the second SMA wire 113j may also be similar. In this embodiment, the first SMA wire 113i further includes two first connection ports 113m, and the second SMA wire 113j further includes two second connection ports 113n.

For example, the first SMA wire 113i may shrink based on six curved surfaces, a total length falls in a range of 130 mm to 170 mm, for example, 153.35 mm, and a wire diameter falls in a range of 0.1 mm to 0.4 mm, for example, 0.15 mm. Certainly, a quantity of shrinkage curved surfaces of the first SMA wire 113i may alternatively be greater than 6, for example, may be 7, 8, or 9. Therefore, the total length may also change correspondingly. A distance between two adjacent wires on a same shrinkage curved surface may fall in a range of 0.6 mm to 1 mm, for example, 0.8 mm. The second SMA wire 113j may be heat expandable based on six curved surfaces, a total length falls in a range of 120 mm to 160 mm, for example, 141.58 mm, and a wire diameter falls in a range of 0.1 mm to 0.4 mm, for example, 0.15 mm. Certainly, a quantity of hot expansion curved surfaces may alternatively be greater than 6, for example, may be 7, 8, or 9. Therefore, the total length may also change correspondingly. A distance between a first SMA wire 113i and a second SMA wire 113j that are adjacent may fall in a range of 0.4 mm to 0.8 mm, for example, 0.6 mm. It can be understood that quantities of curved surfaces, lengths, wire diameters, spacings, and the like of the first SMA wire 113i and the second SMA wire 113j may be set in another manner. This is not strictly limited in this embodiment of this application.

For example, the conductor 114 may include four conducting portions 114a disposed at spacings, and an insulation portion 114b connected between two adjacent conducting portions 114a. A plurality of conducting portions 114a and a plurality of insulation portions 114b may be disposed on an inner side of the base 111 in an encircling manner. The conducting portion 114a may be made of a metal material, and the insulation portion 114b may be made of a polycarbonate (Polycarbonate, PC) material.

Figure 34A:
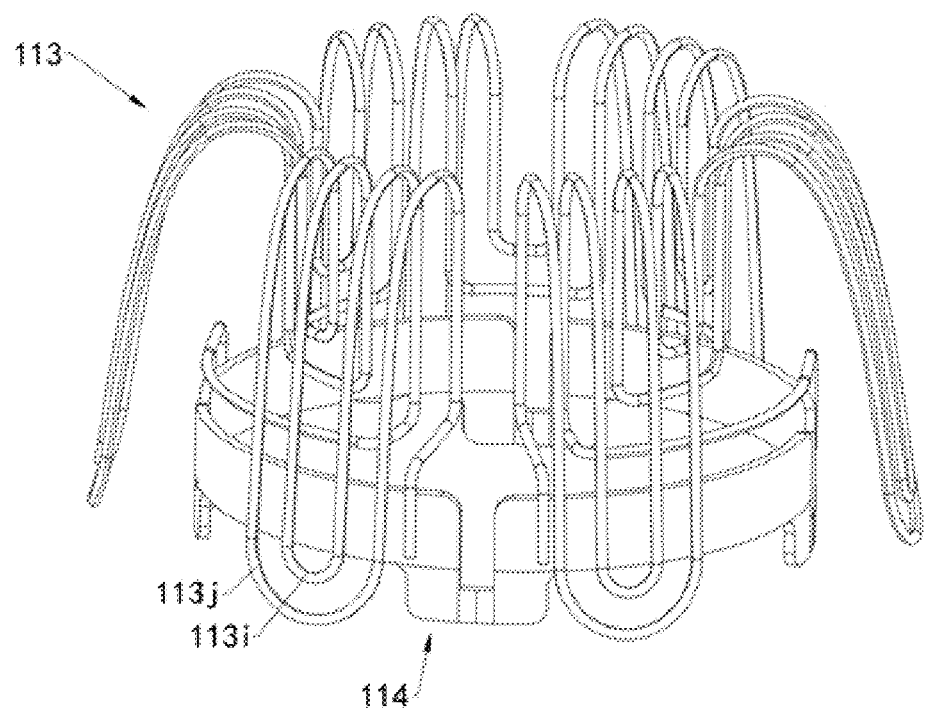
FIG. 34A shows a connection structure of an SMA component and a conductor of an earbud shown in FIG. 32A.
Figure 34B:
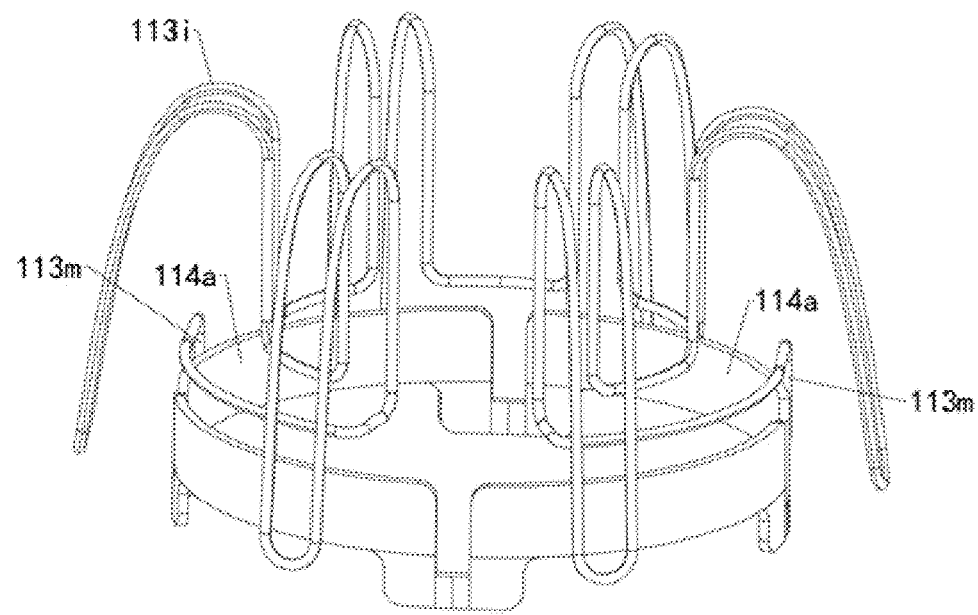
FIG. 34B shows a connection structure of a first SMA wire of an SMA component and a conductor shown in FIG. 34A.
Figure 34C:
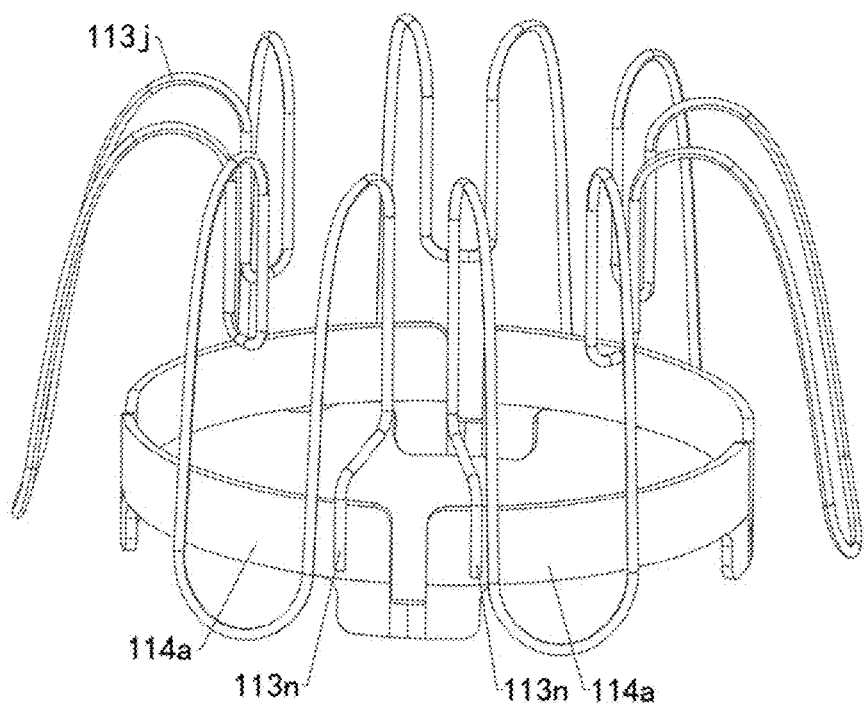
FIG. 34C shows a connection structure of a second SMA wire of an SMA component and a conductor shown in FIG. 34A.

Refer to FIG. 34A to FIG. 34C. FIG. 34A shows a connection structure of the SMA component 113 and the conductor 114 of the earbud 11 shown in FIG. 32A. FIG. 34B shows a connection structure of the first SMA wire 113i of the SMA component 113 and the conductor 114 shown in FIG. 34A. FIG. 34C shows a connection structure of the second SMA wire 113j of the SMA component 113 and the conductor 114 shown in FIG. 34A.

For example, the two first connection ports 113m of the first SMA wire 113i may be embedded in the base 111, to separately fasten two conducting portions 114a of the conductor 114; and the two second connection ports 113n of the second SMA wire 113j may be embedded in the base 111, to separately fasten the other two conducting portions 114a of the conductor 114.

For other solution content of the earbud 11 in this embodiment, refer to related descriptions of the earbud 11 in the foregoing other embodiments. Details are not described herein again.

In this embodiment, when a user needs to wear a headset 1 in a high temperature environment, the second SMA wire 113j may be heated, so that the second SMA wire 113j is heated to the second phase transition temperature, and the second SMA wire 113j deforms and drives the earbud body 112 to deform to a shrunk form for fitting into an ear canal. After the user wears the headset 1, power may be supplied to heat the first SMA wire 113i, so that the first SMA wire 113i is quickly heated to the first phase transition temperature. The first SMA wire 113i obtains a driving force, resists a shrinkage force of the earbud body 112, and drives the earbud body 112 to expand, so that the earbud 11 expands until reaching a comfort cutoff point before pain is caused to the ear canal, to reach a position most comfortable for wearing by the user. After the user removes the headset 1 from the ear canal, similarly, it is determined, through wearing detection, that the headset 1 is in a non-worn state, and power is supplied to heat the second SMA wire 113j, so that temperature of the second SMA wire 113j quickly increases to the second phase transition temperature. The second SMA wire 113j obtains a driving force, and shrinkage forces of the second SMA wire 113j and the earbud body 112 jointly resist residual stress of the first SMA wire 113i, so that the earbud 11 is restored to an original state, and then is placed into a headset case 2.

Figure 35:
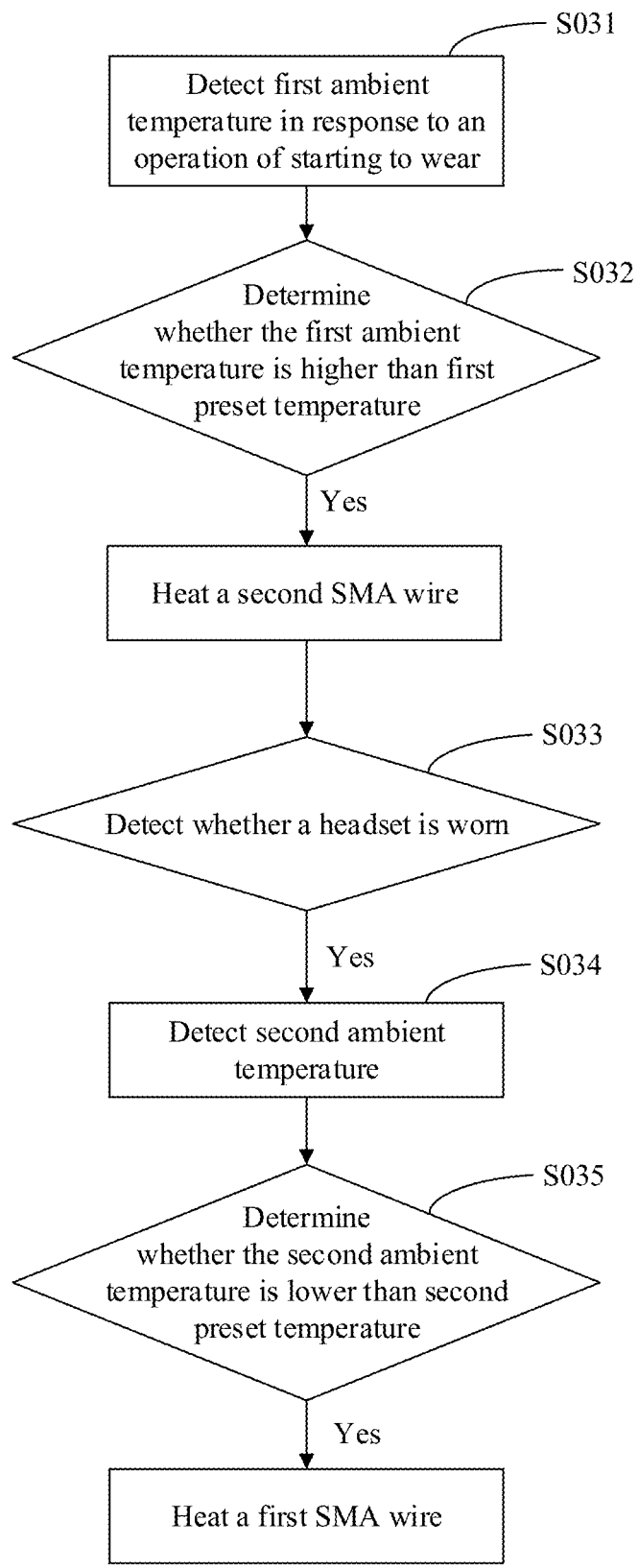
FIG. 35 is a flowchart of another method for controlling deformation of an earbud according to an embodiment of this application.

Based on the foregoing solution, this application provides a method for controlling deformation of the earbud 11. FIG. 35 is a flowchart of another method for controlling deformation of the earbud 11 according to an embodiment of this application.

The method for controlling deformation of the earbud 11 includes the following steps.

Step S031: Detect first ambient temperature in response to an operation of starting to wear.

For example, the operation of starting to wear may include: The headset case 2 is open, and the headset 1 is placed in the headset case 2; or a gesture of starting to wear is performed on the headset 1. For a method for detecting whether the headset case 2 is open and whether the headset 1 is placed in the headset case 2, refer to the foregoing embodiments. Details are not described herein again. The gesture of starting to wear that is performed on the headset 1 may be tapping the headset 1 once or more, touching the headset 1 for specific duration, sliding on the headset 1, shaking the headset 1 with a specific gesture, or the like. This is not strictly limited in this embodiment of this application.

For example, the first ambient temperature may be detected by a temperature sensor 140 of the headset 1. When the headset 1 is placed in the headset case 2, the first ambient temperature may alternatively be detected by a temperature sensor 140 of the headset case 2.

Step S032: If the first ambient temperature is higher than first preset temperature, heat the second SMA wire 113*j*, so that the second SMA wire 113*j* drives the earbud body 112 to shrink.

In this case, the second SMA wire 113*j* drives the earbud body 112 to deform to a shrunk form, so that the earbud 11 can comfortably fit into the ear canal. When the headset 1 is placed in the headset case 2, a power supply chip 110 of the headset case 2 may supply power to heat the second SMA wire 113*j*, or a power supply chip 110 of the headset 1 may supply power to heat the second SMA wire 113*j*. When the headset 1 is not placed in the headset case 2, the power supply chip 110 of the headset 1 supplies power to heat the second SMA wire 113*j*.

Step S033: Detect whether the headset 1 is worn.

The headset 1 may detect, through a wearing detection chip 120, whether the headset 1 is in a worn state.

Step S034: If the headset 1 is worn, detect second ambient temperature.

The second ambient temperature may be detected by the temperature sensor 140 of the headset 1.

Step S035: If the second ambient temperature is lower than second preset temperature, heat the first SMA wire 113*i*, so that the first SMA wire 113*i* drives the earbud body 112 to expand.

In this case, the first SMA wire 113*i* drives the earbud body 112 to deform to an expanded form, so that a shape of the earbud body 112 adapts to a shape of the ear canal of the user, and the earbud 11 has high wearing comfort.

Figure 36A:
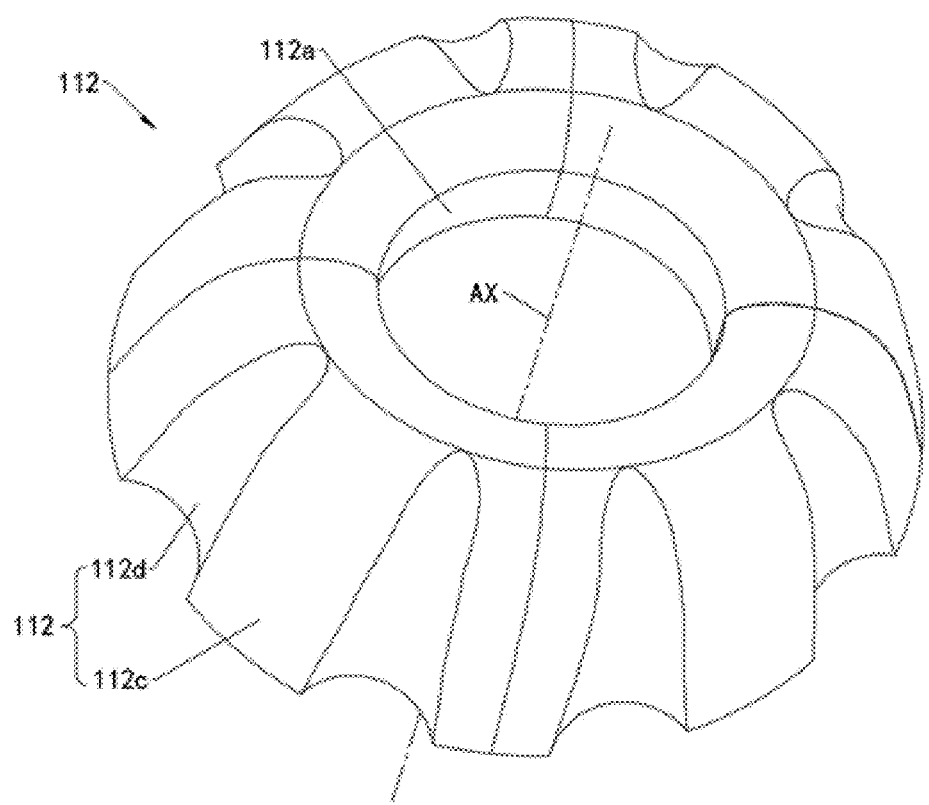
FIG. 36A is a schematic diagram of a structure of an earbud body of an earbud shown in FIG. 2 according to some other embodiments.
Figure 36B:
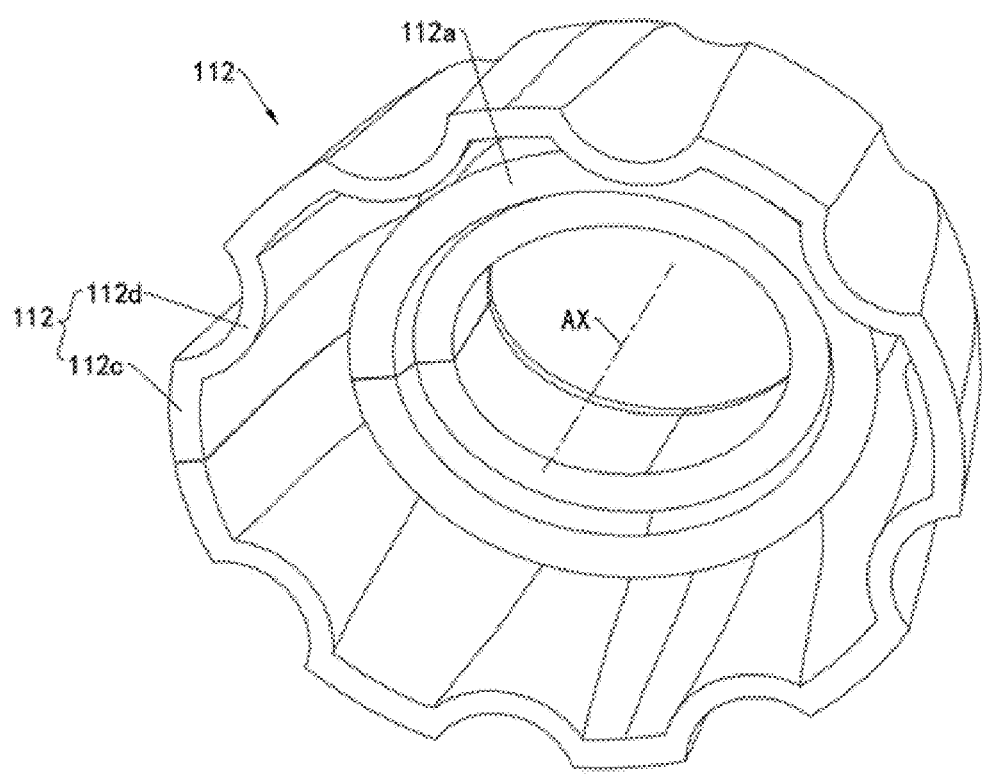
FIG. 36B is a schematic diagram of a structure of an earbud body shown in FIG. 36A from another angle.

Refer to FIG. 36A and FIG. 36B. FIG. 36A is a schematic diagram of a structure of the earbud body 112 of the earbud 11 shown in FIG. 2 according to some other embodiments. FIG. 36B is a schematic diagram of a structure of the earbud body 112 shown in FIG. 36A from another angle.

A shape of the earbud body 112 in this embodiment is different from that of the earbud body 112 in the foregoing embodiments. The contact portion 112*b* of the earbud body 112 in the foregoing embodiments is smooth, and the contact portion 112*b* of the earbud body 112 in this embodiment is in a fold structure. For example, as shown in FIG. 36A and FIG. 36B, the contact portion 112*b* includes a plurality of contact regions 112*c* and a plurality of recessed regions 112*d*. The contact regions 112*c* and the recessed regions 112*d* are alternately arranged around the stationary portion 112*a*, that is, alternately arranged around a center line AX. The recessed regions 112*d* are closer to the stationary portion 112*a* relative to the contact regions 112*c*. To be specific, the recessed regions 112*d* are recessed relative to the contact regions 112*c*.

In this embodiment, when the earbud body 112 deforms, deformation of the contact portion 112*b* of the earbud body 112 may be mainly implemented through deformation of the recessed region 112*d*, and two adjacent contact regions 112*c* may be close to or away from each other, so that the earbud body 112 deforms more easily, and a deformation shape is controllable. This helps improve reliability of the earbud body 112.

For example, a recess depth of the recessed region 112*d* increases in a direction from the top of the contact portion 112*b* to the bottom. During deformation of the earbud body 112, an amount of deformation at the bottom of the contact portion 112*b* is greater than that at the top of the contact portion 112*b*. The recess depth of the recessed region 112*d* increases in the direction from the top of the contact portion 112*b* to the bottom, so that deformation of the entire contact portion 112*b* is easier to implement, and structural reliability of the earbud body 112 is higher.

When a recess depth of the recessed region 112*d* at the top of the contact portion 112*b* is greater than a recess depth of the recessed region 112*d* at the bottom of the contact portion 112*b*, it is considered that the recess depth of the recessed region 112*d* increases in the direction from the top of the contact portion 112*b* to the bottom. For example, in the direction from the top of the contact portion 112*b* to the bottom, the recess depth of the recessed region 112*d* may gradually increase, or may first gradually increase and then slightly decrease. A specific shape and a specific size, such as a depth, of the recessed region 112*d* are not strictly limited in this embodiment of this application.

For example, a thickness of the contact region 112*c* of the contact portion 112*b* may be the same as or close to a thickness of the recessed region 112*d*. In some other embodiments, a thickness of the contact region 112*c* of the contact portion 112*b* may alternatively be greater than a thickness of the recessed region 112*d*. Specific thicknesses of the contact region 112*c* and the recessed region 112*d* of the contact portion 112*b* and a thickness relationship thereof are not strictly limited in this embodiment of this application.

In some embodiments, when the SMA component 113 of the earbud 11 is in the structure shown in FIG. 4 or FIG. 13A, a part, embedded in the contact portion 112*b*, of the SMA wire 113*a*/113*b* of the SMA component 113 may be located in the contact region 112*c*. When the SMA component 113 of the earbud 11 is in the structure shown in FIG. 16, FIG. 18A, FIG. 24, and FIG. 33, a part, embedded in the contact portion 112*b*, of the SMA component 113, may be located in the contact region 112*c*.

For example, a spacing between two adjacent recessed regions 112*d* at the top of the contact portion 112*b* may fall in a range of 2 mm to 3.5 mm, for example, 2.75 mm; a spacing between two adjacent recessed regions 112*d* at the top of the contact portion 112*b* may fall in a range of 1.6 mm to 3.0 mm, for example, 2.28 mm; and a spacing between two adjacent contact regions 112*c* at the bottom of the contact portion 112*b* may fall in a range of 1.8 mm to 3.2 mm, for example, 2.42 mm.

The foregoing embodiments merely describe schematic structures of the earbud body 112 in some embodiments. A structure of the earbud body 112 may alternatively be implemented in another manner. For example, a shape of the earbud body 112 may be the same as, similar to, or different from a shape of a conventional earbud body 112. This is not strictly limited in this embodiment of this application.

In this application, the earbud body 112 is made of an ultraviolet cured soft rubber material or a room temperature vulcanized silicone rubber material, so that molding can be performed at low temperature, without affecting phase change effect or deformation of the SMA component 113 during molding. Therefore, molding quality and a yield of the earbud 11 are high.

This application further provides a manufacturing method for an earbud 11, and the method may be used to prepare the earbud 11 in the foregoing embodiments.

Figure 37:
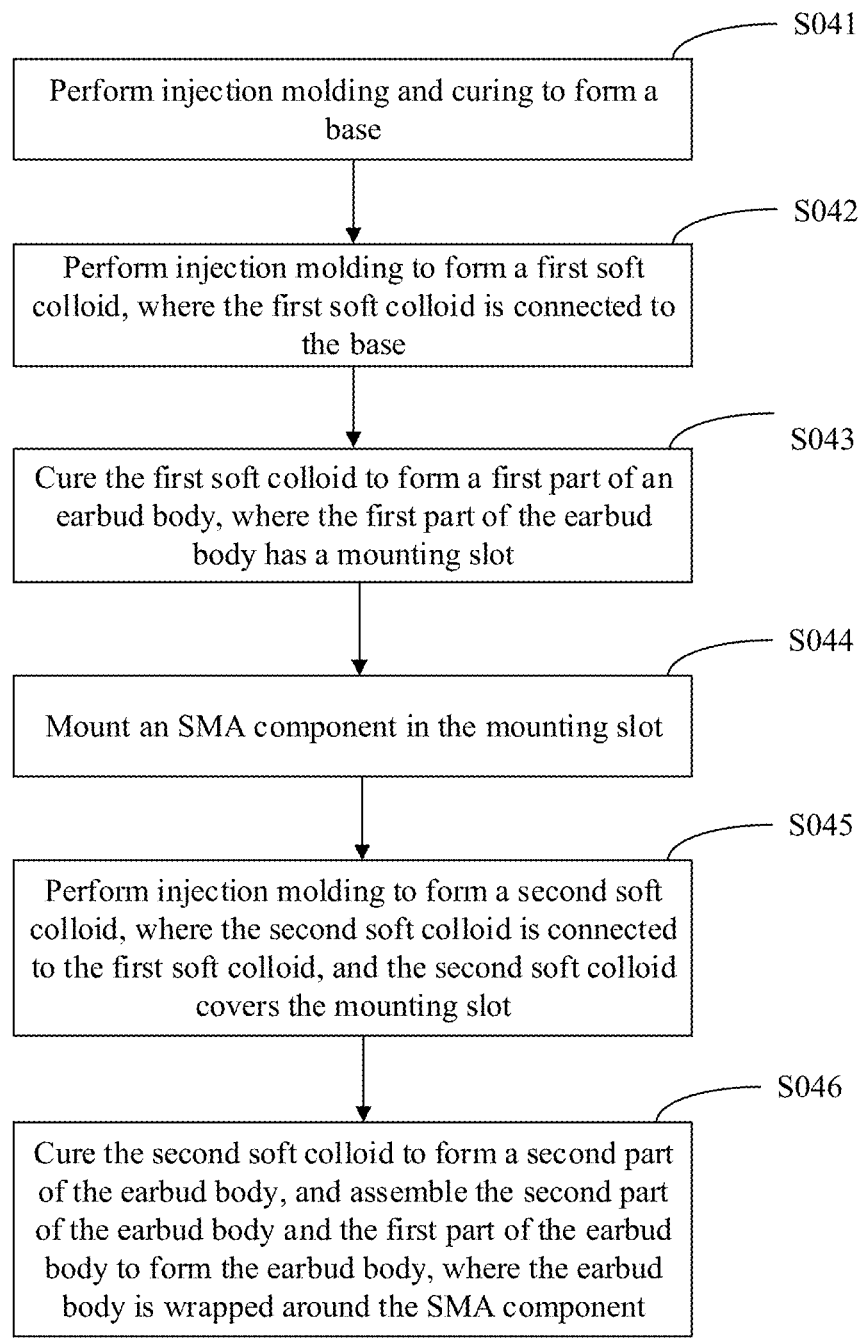
FIG. 37 is a schematic block diagram of a process of a manufacturing method for an earbud according to an embodiment of this application.
Figure 38:
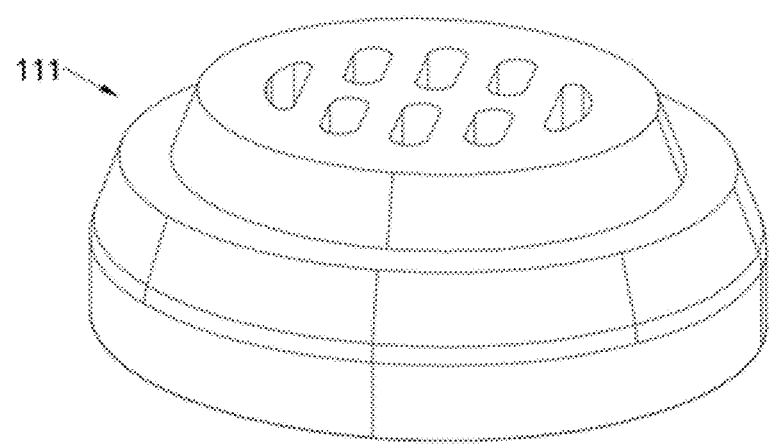
FIG. 38 is a first schematic diagram of a structure of a manufacturing process of a manufacturing method for an earbud shown in FIG. 37.
Figure 39A:
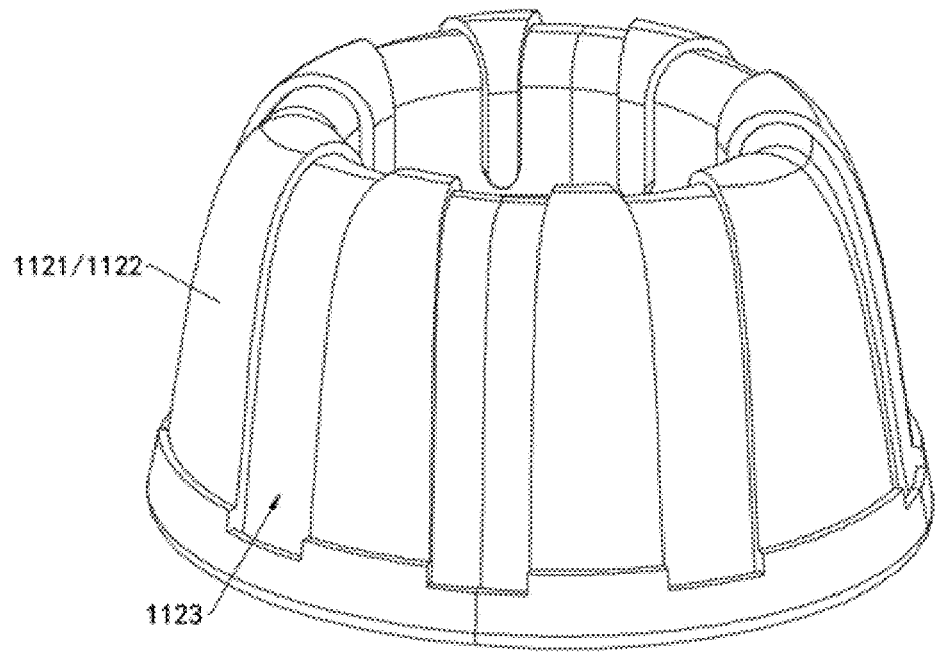
FIG. 39A is a second schematic diagram of a structure of a manufacturing process of a manufacturing method for an earbud shown in FIG. 37.
Figure 39B:
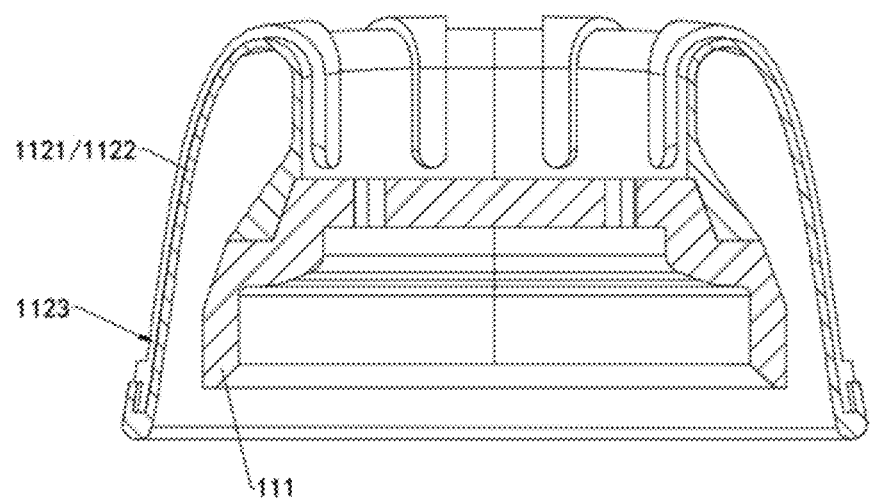
FIG. 39B is a schematic diagram of an internal structure of a structure shown in FIG. 39A.
Figure 40A:
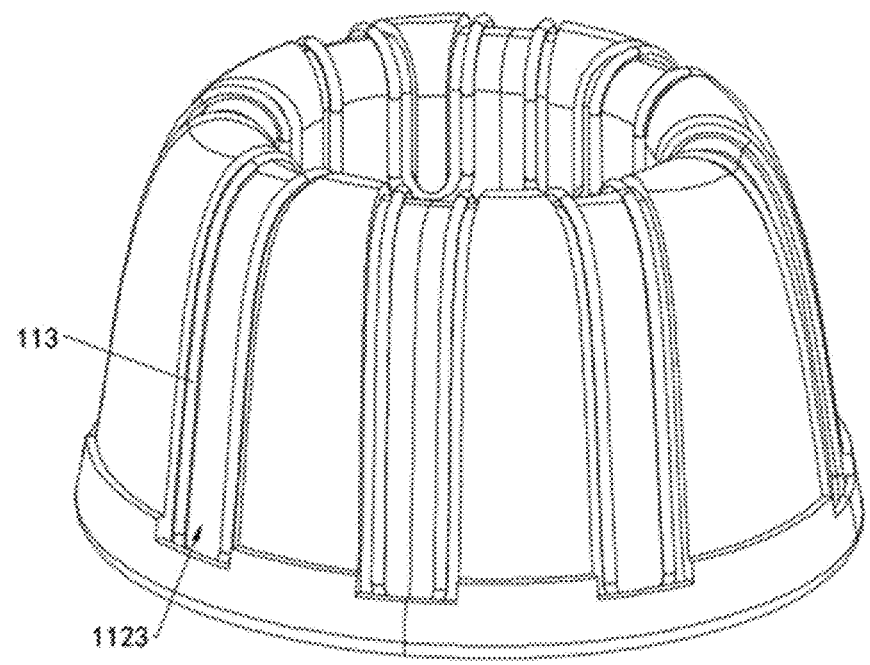
FIG. 40A is a third schematic diagram of a structure of a manufacturing process of a manufacturing method for an earbud shown in FIG. 37.
Figure 40B:
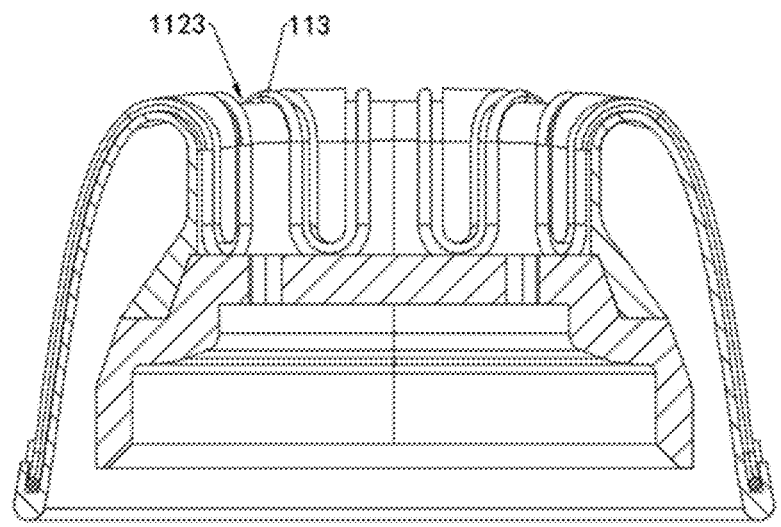
FIG. 40B is a schematic diagram of an internal structure of a structure shown in FIG. 40A.
Figure 41A:
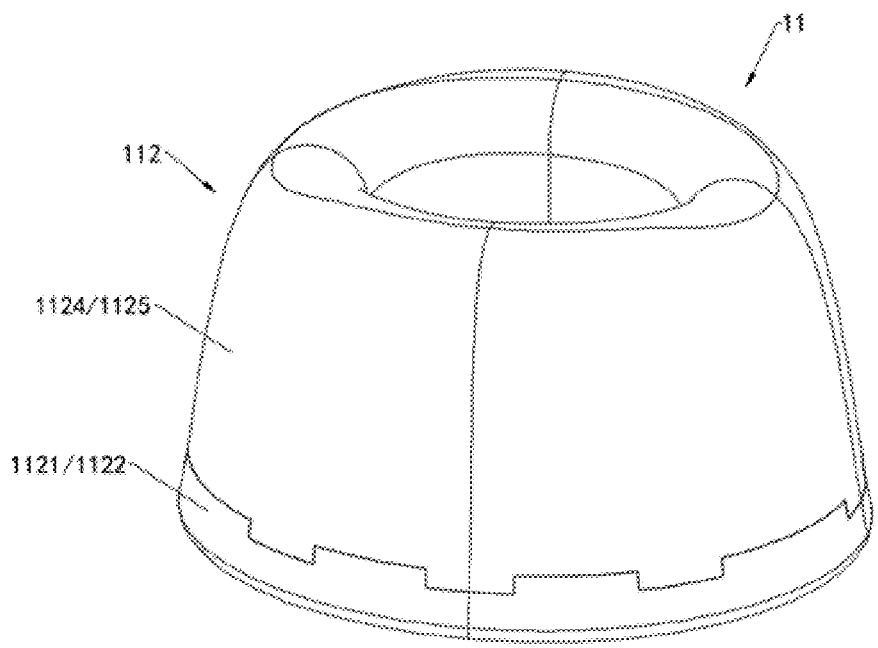
FIG. 41A is a fourth schematic diagram of a structure of a manufacturing process of a manufacturing method for an earbud shown in FIG. 37.
Figure 41B:
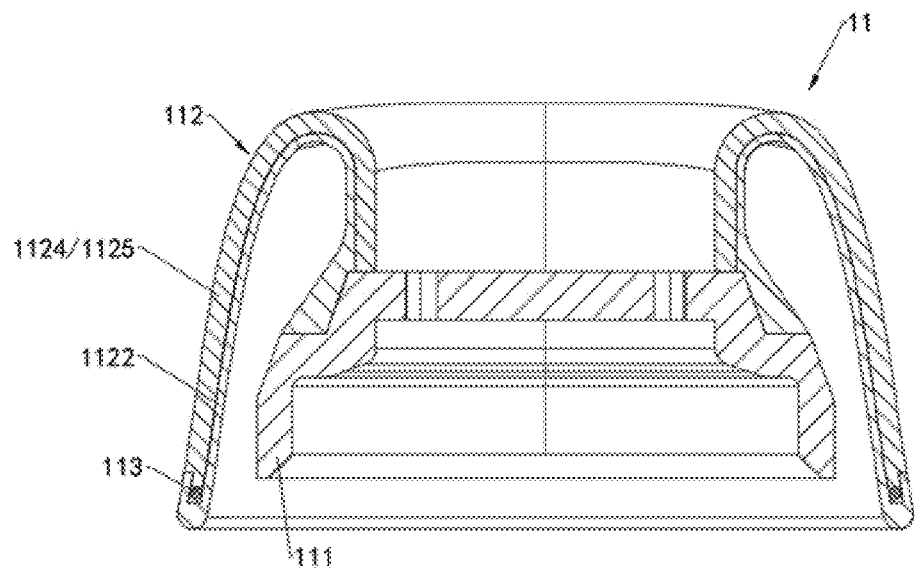
FIG. 41B is a schematic diagram of an internal structure of a structure shown in FIG. 41A.

The following describes the manufacturing method for an earbud 11 with reference to FIG. 37 to FIG. 41B. FIG. 37 is a schematic block diagram of a process of a manufacturing method for an earbud 11 according to an embodiment of this application. FIG. 38 is a first schematic diagram of a structure of a manufacturing process of the manufacturing method for an earbud 11 shown in FIG. 37. FIG. 39A is a second schematic diagram of a structure of a manufacturing process of the manufacturing method for an earbud 11 shown in FIG. 37. FIG. 39B is a schematic diagram of an internal structure of the structure shown in FIG. 39A. FIG. 40A is a third schematic diagram of a structure of a manufacturing process of the manufacturing method for an earbud 11 shown in FIG. 37. FIG. 40B is a schematic diagram of an internal structure of the structure shown in FIG. 40A. FIG. 41A is a fourth schematic diagram of a structure of a manufacturing process of the manufacturing method for an earbud 11 shown in FIG. 37. FIG. 41B is a schematic diagram of an internal structure of the structure shown in FIG. 41A. FIG. 38 to FIG. 41B are illustrated by using the structure of the earbud 11 shown in FIG. 15A as an example. In some other embodiments, the structure in FIG. 38 to FIG. 41B may alternatively change with a shape of the earbud 11.

In some embodiments, the manufacturing method for an earbud 11 includes the following steps.

Step S041: Perform injection molding and curing to form a base 111, as shown in FIG. 38.

The base 111 may be made of thermoplastic, including but not limited to polycarbonate, nylon, acrylonitrile-butadiene-styrene plastic (Acrylonitrile-Butadiene-Styrene plastic, ABS), polypropylene, and polyethylene; or may be made of a high-hardness rubber material, including but not limited to silicone rubber, fluorine rubber, and other thermoplastic elastomers.

Step S042: Perform injection molding to form a first soft colloid 1121, where the first soft colloid 1121 is connected to the base 111, as shown in FIG. 39A and FIG. 39B.

Step S043: Cure the first soft colloid 1121 to form a first part 1122 of an earbud body 112, where the first part 1122 of the earbud body 112 has a mounting slot 1123, as shown in FIG. 39A and FIG. 39B.

The first part 1122 of the earbud body 112 includes an inner part and an outer part. The bottom of the inner part of the first part 1122 is fastened to the base 111, and the outer part of the first part 1122 surrounds a periphery of the inner part. The top of the outer part is connected to the top of the inner part. The bottom of the outer part surrounds the base 111, and is suspended relative to the base 111. A position, a shape, and the like of the mounting slot 1123 may be set based on an SMA component 113 to be subsequently mounted.

Step S044: Mount the SMA component 113 in the mounting slot 1123, as shown in FIG. 40A and FIG. 40B.

Step S045: Perform injection molding to form a second soft colloid 1124, where the second soft colloid 1124 is connected to the first soft colloid 1121, and the second soft colloid 1124 covers the mounting slot 1123, as shown in FIG. 41A and FIG. 41B.

Step S046: Cure the second soft colloid 1124 to form a second part 1125 of the earbud body 112, and assemble the second part 1125 of the earbud body 112 and the first part 1122 of the earbud body 112 to form the earbud body 112, where the earbud body 112 is wrapped around the SMA component 113, as shown in FIG. 41A and FIG. 41B.

The second part 1125 of the earbud body 112 and the first part 1122 of the earbud body 112 may be stacked. The second part 1125 of the earbud body 112 is also provided with an inner part and an outer part. The bottom of the inner part of the second part 1125 is fastened to the base 111, and the outer part of the second part 1125 surrounds a periphery of the inner part. The top of the outer part is connected to the top of the inner part. The bottom of the outer part surrounds the base 111, and is suspended relative to the base 111. The inner part of the second part 1125 of the earbud body 112 is located on an inner side of the inner part of the first part 1122 of the earbud body 112. The outer part of the second part 1125 of the earbud body 112 is located on an outer side of the outer part of the first part 1122 of the earbud body 112. An appearance side of the earbud body 112 is mainly formed at the second part 1125 of the earbud body 112.

The second part 1125 of the earbud body 112 may be embedded in the mounting slot 1123, so that the earbud body 112 can be better wrapped around and better fasten the SMA component 113.

For example, before injection molding is performed to form the first soft colloid 1121 (that is, step S042), the manufacturing method for an earbud 11 further includes: applying a first adhesive (not shown in the figure) to the base 111.

During curing of the first soft colloid 1121 (that is, step S043), the manufacturing method for an earbud 11 further includes: activating the first adhesive.

Before the SMA component 113 is mounted in the mounting slot 1123 (that is, step S044), the manufacturing method for an earbud 11 further includes: applying a second adhesive (not shown in the figure) to the SMA component 113.

Before injection molding is performed to form the second soft colloid 1124 (that is, step S045), the manufacturing method for an earbud 11 further includes: applying a third adhesive (not shown in the figure) to the first part 1122 of the earbud body 112.

During curing of the second soft colloid 1124 (that is, step S046), the manufacturing method for an earbud 11 further includes: activating the second adhesive and the third adhesive.

In this embodiment, the first adhesive can strengthen a connection between the base 111 and the first part 1122, formed through curing of the first soft colloid 1121, of the earbud body 112. The second adhesive can increase adhesion between the SMA component 113 and the first part 1122 of the earbud body 112 and between the SMA component 113 and the second part 1125 of the earbud body 112. The third adhesive can increase adhesion between the second part 1125 of the earbud body 112 and the first part 1122 of the earbud body 112. If adhesion between the first part 1122 of the earbud body 112 and the base 111 is strong, the steps of applying the first adhesive and activating the first adhesive may alternatively be omitted in the manufacturing method for an earbud 11. If adhesion between the SMA component 113 and the earbud body 112 is strong, the steps of applying the second adhesive and activating the second adhesive may alternatively be omitted in the manufacturing method for an earbud 11. If adhesion between the second part 1125 of the earbud body 112 and the first part 1122 of the earbud body 112 is strong, the steps of applying the third adhesive and activating the third adhesive may alternatively be omitted in the manufacturing method for an earbud 11. This is not strictly limited in this embodiment of this application.

In some embodiments, the first soft colloid 1121 and the second soft colloid 1124 may be made of an ultraviolet (Ultraviolet, UV) cured soft rubber material. In the manufacturing method for an earbud 11, the first soft colloid 1121 and the second soft colloid 1124 are cured through ultraviolet curing, to form the first part 1122 and the second part 1125 of the earbud body 112. In this embodiment, curing of the ultraviolet cured soft rubber material is excited by ultraviolet light, and no requirement is imposed on temperature during curing. Therefore, during curing of the second soft colloid 1124, processing temperature can be controlled to be lower than phase transition temperature of the SMA component 113 based on a full consideration of temperature deformation effect of the SMA component 113, to avoid an undesirable change of a shape of the earbud body 112 due to deformation of the SMA component 113, so that molding quality and a yield of the earbud body 112 are high.

For example, the ultraviolet cured soft rubber material may be a silicone rubber material, a polyurethane material, or a fluorine rubber material, and includes a photoinitiator.

For example, before injection molding is performed to form the first soft colloid 1121 (that is, step S042), the manufacturing method for an earbud 11 further includes: applying a first adhesive to the base 111. During curing of the first soft colloid 1121 (that is, step S043), the manufacturing method for an earbud 11 further includes: activating the first adhesive. Before the SMA component 113 is mounted in the mounting slot 1123 (that is, step S044), the manufacturing method for an earbud 11 further includes: applying a second adhesive to the SMA component 113. Before injection molding is performed to form the second soft colloid 1124 (that is, step S045), the manufacturing method for an earbud 11 further includes: applying a third adhesive to the first part 1122 of the earbud body 112. During curing of the second soft colloid 1124 (that is, step S046), the manufacturing method for an earbud 11 further includes: activating the second adhesive and the third adhesive.

The first adhesive, the second adhesive, and the third adhesive are ultraviolet cured adhesives. In the manufacturing method for an earbud 11, the first adhesive, the second adhesive, and the third adhesive are activated by ultraviolet light. The ultraviolet cured adhesive may be one or more composite materials of silicone resin, propylene resin, epoxy resin, and polyurethane resin, and includes a photoinitiator.

In this embodiment, the first adhesive is an ultraviolet cured adhesive, and the first soft colloid 1121 is an ultraviolet cured soft rubber material. Therefore, the first adhesive may be cured by ultraviolet light during curing of the first soft colloid 1121 (that is, step S043), that is, the first soft colloid 1121 and the first adhesive may be simultaneously cured by ultraviolet light. A curing process is easy to implement and is efficient. In addition, the first adhesive can strengthen a connection between the base 111 and the first part 1122, formed through curing of the first soft colloid 1121, of the earbud body 112. If adhesion between the first part 1122 of the earbud body 112 and the base 111 is strong, the steps of applying the first adhesive and activating the first adhesive may alternatively be omitted in the manufacturing method for an earbud 11. This is not strictly limited in this embodiment of this application.

Similarly, the second soft colloid 1124, the second adhesive, and the third adhesive may be simultaneously cured by ultraviolet light. A curing process is easy to implement and is efficient. The second adhesive can increase adhesion between the SMA component 113 and the first part 1122 of the earbud body 112 and between the SMA component 113 and the second part 1125 of the earbud body 112. The third adhesive can increase adhesion between the second part 1125 of the earbud body 112 and the first part 1122 of the earbud body 112. If adhesion between the SMA component 113 and the earbud body 112 is strong, the steps of applying the second adhesive and activating the second adhesive may alternatively be omitted in the manufacturing method for an earbud 11. If adhesion between the second part 1125 of the earbud body 112 and the first part 1122 of the earbud body 112 is strong, the steps of applying the third adhesive and activating the third adhesive may alternatively be omitted in the manufacturing method for an earbud 11. This is not strictly limited in this embodiment of this application.

Figure 42:
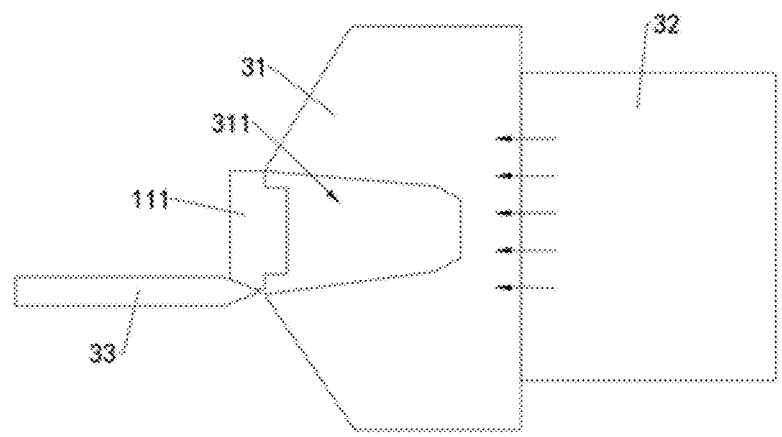
FIG. 42 is a fifth schematic diagram of a structure of a manufacturing process of a manufacturing method for an earbud shown in FIG. 37.

Refer to FIG. 39A, FIG. 39B, and FIG. 42. FIG. 42 is a fifth schematic diagram of a structure of a manufacturing process of the manufacturing method for an earbud 11 shown in FIG. 37.

For example, a manufacturing device for an earbud 11 may include a mold 31, an ultraviolet lamp 32, and a silicone injection molding opening 33. The mold 31 is made of a material that allows ultraviolet light to pass through, for example, a transparent material. The mold 31 may have injection molding space 311. Before step S042, the base 111 may be fastened to the mold 31, and the top of the base 111 faces the injection molding space 311 of the mold 31. In step S042, an ultraviolet cured soft rubber material is injected into the injection molding space 311 through the silicone injection molding opening 33, to form the first soft colloid 1121 that is fastened to the base 111. In step S043, ultraviolet light emitted by the ultraviolet lamp 32 passes through the mold 31 and is irradiated onto the first soft colloid 1121, to cure the first soft colloid 1121 and form the first part 1122 of the earbud body 112.

The ultraviolet lamp 32 may be a light source with a light wavelength of 314 mm to 400 nm, and includes but is not limited to a mercury lamp, a light-emitting diode (light-emitting diode, LED) lamp, a metal halogen lamp, and the like. Light intensity of the ultraviolet lamp may fall in a range of 200 mW/cm$^2$ to 10000 mW/cm$^2$. Duration of curing under ultraviolet light varies based on different thicknesses of to-be-cured structures, and usually ranges from 5 seconds to 300 seconds.

For an injection molding process and a curing process of the second soft colloid 1124, refer to the first soft colloid 1121. Details are not described herein again.

In some other embodiments, the first soft colloid 1121 and the second soft colloid 1124 may alternatively be made of a room temperature vulcanized silicone rubber (room temperature vulcanized silicone rubber, RTV) material. In the manufacturing method for an earbud 11, the first soft colloid 1121 and the second soft colloid 1124 may be cured through moisture curing, cross-linking agent activation curing, or heat curing at a temperature lower than 100° C., to implement high molecular weight cross-linking and form the earbud body 112.

For example, before injection molding is performed to form the first soft colloid 1121 (that is, step S042), the manufacturing method for an earbud 11 further includes: applying a first adhesive to the base 111. During curing of the first soft colloid 1121 (that is, step S043), the manufacturing method for an earbud 11 further includes: activating the first adhesive. Before the SMA component 113 is mounted in the mounting slot 1123 (that is, step S044), the manufacturing method for an earbud 11 further includes:

applying a second adhesive to the SMA component 113. Before injection molding is performed to form the second soft colloid 1124 (that is, step S045), the manufacturing method for an earbud 11 further includes: applying a third adhesive to the first part 1122 of the earbud body 112. During curing of the second soft colloid 1124 (that is, step S046), the manufacturing method for an earbud 11 further includes: activating the second adhesive and the third adhesive.

The first adhesive, the second adhesive, and the third adhesive are low temperature cured adhesives. For example, the low temperature cured adhesive may be one or more composite materials of silicone resin, propylene resin, epoxy resin, and polyurethane resin. In the manufacturing method for an earbud 11, the first adhesive, the second adhesive, and the third adhesive are heated and activated in a low temperature environment at 40° C. to 100° C.

For example, if the first soft colloid 1121 and the second soft colloid 1124 are made of a room temperature vulcanized silicone rubber material that is cured by moisture, a curing condition is standing for 30 minutes to 24 hours for curing soft rubber, and the adhesive may be activated through heating to activation temperature of the adhesive. If the first soft colloid 1121 and the second soft colloid 1124 are made of a two-component room temperature vulcanized silicone rubber material, mixed resin may stand at room temperature for 30 minutes to 24 hours for curing soft rubber, and the adhesive may be activated through heating to activation temperature of the adhesive. If the first soft colloid 1121 and the second soft colloid 1124 are made of a room temperature vulcanized silicone rubber material that is heated and cured at low temperature, the material may be cured through heating to curing temperature (40° C. to 100° C.) of the material, where curing time is 5 minutes to 24 hours, and the adhesive may be activated through heating to activation temperature of the adhesive.

In the foregoing embodiments, the SMA component 113 is in a contact connection to the earbud body 112, and the SMA component 113 does not shake in the earbud body 112 relative to the earbud body 112 due to a reserved gap. In some other embodiments, space that adapts to a shape of the SMA component 113 may alternatively be reserved in the earbud body 112, and the SMA component 113 is mounted in the space. The SMA component 113 may expand or shrink in the space, and expand or shrink synchronously or approximately synchronously with the earbud body 112, to reduce problems such as detachment or structural interference between the SMA component 113 and the earbud body 112 after the earbud 11 is used many times. In this way, the earbud 11 is less likely to be damaged, and has high reliability. Certainly, in the earbud 11, reliability of a fitting relationship between the SMA component 113 and the earbud body 112 may alternatively be ensured in another manner. This is not strictly limited in this application.

In some other embodiments, the SMA component 113 and the earbud body 112 may be first processed and molded, and then a formed component is nested with the base 111 to form the earbud 11. This is not strictly limited in this embodiment of this application.

The following describes a structure of a headset 3 including earmuffs and a related method by using examples.

Figure 43:
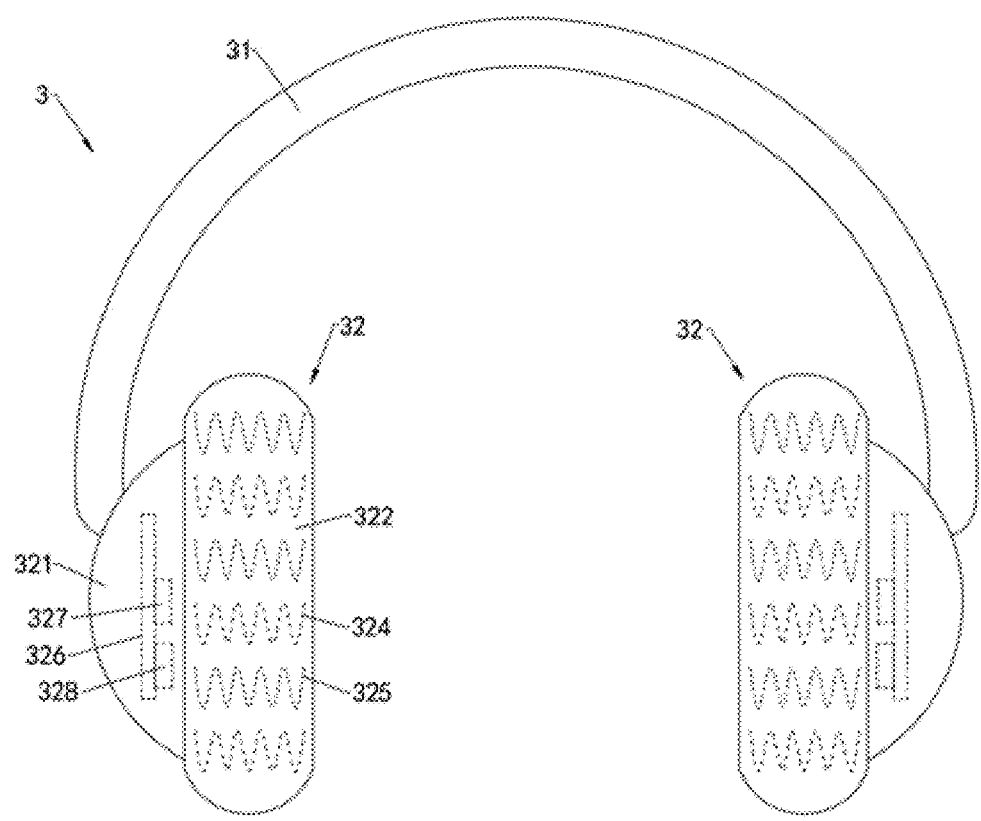
FIG. 43 is a schematic diagram of a structure of another headset according to an embodiment of this application.

FIG. 43 is a schematic diagram of a structure of another headset 3 according to an embodiment of this application.

In some embodiments, the headset 3 includes a headband 31 and two earmuffs 32, and the two earmuffs 32 are respectively connected to two ends of the headband 31. The headset 3 in this embodiment is a head-mounted headset. The headset 3 may be used in a headset assembly. The headset assembly includes a headset case, and the headset 3 can be detachably accommodated in the headset case.

The headband 31 may be in an adjustable structure. For example, relative positions of the two ends of the headband 31 may change. When a user wears the headset 3, the headband 31 may be pulled up to perform matching between the earmuffs 32 and ears, to put the earmuffs 32 on the ears. However, head widths of users differ greatly. Therefore, after users with different head widths wear the headset 3, pressure applied to surfaces of ears varies. For example, a user with a large head width feels strong pressure after wearing the headset 3, and cannot wear the headset 3 for a long time due to discomfort; and a user with a small head width feels very loose after wearing the headset 3, and gentle movement may cause problems such as instability of wearing. In addition, after the user wears the headset for a period of time, due to poor airflow in the earmuffs 32, humidity and temperature increase, causing a stuffy feeling. This also leads to poor comfort during long-time wearing.

The earmuff 32 includes an ear housing 321 and an earpad 322. The ear housing 321 is connected to the headband 31, and the ear housing 321 may be configured to accommodate a device of the headset 3. The earpad 322 is fastened to the ear housing 321, and the earpad 322 is made of a flexible material or an elastic material. In some embodiments, the earpad 322 may include an outer faux leather or real leather layer and an inner sponge layer, to alleviate, to some extent, wearing discomfort caused by pressure applied to the earpad 322 and a stuffy feeling. This application further provides a solution in which a size of the earpad 322 can be automatically adjusted, to improve wearing comfort of the head-mounted headset 3.

Figure 44:
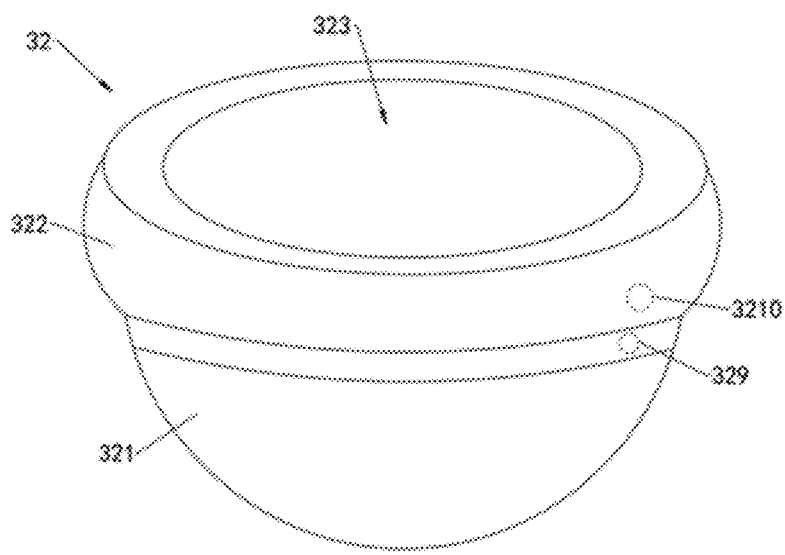
FIG. 44 is a schematic diagram of a structure of an earmuff of a headset shown in FIG. 43.
Figure 45:
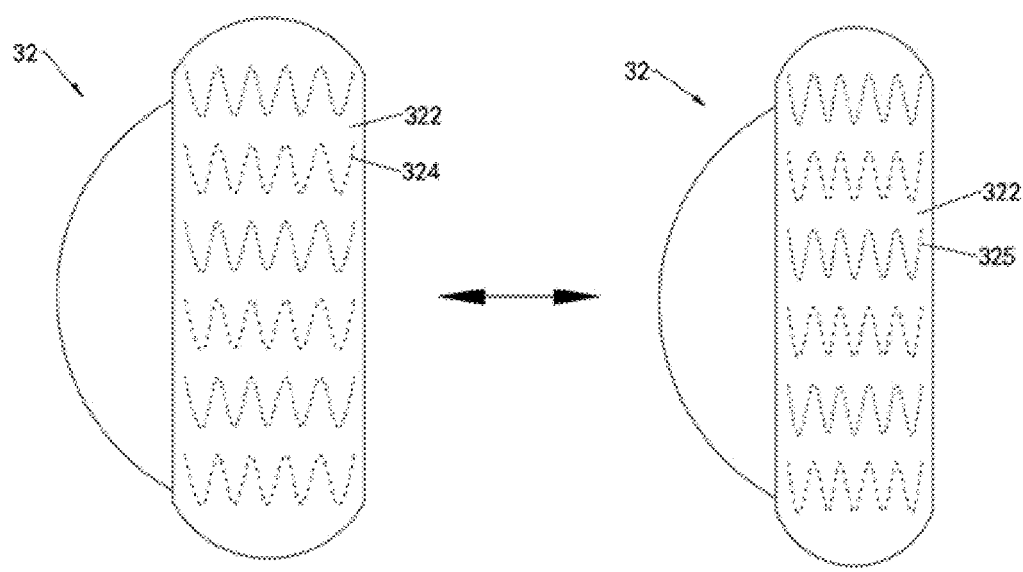
FIG. 45 is a schematic diagram of a deformed structure of an earmuff of a headset shown in FIG. 43.

Refer to FIG. 43 to FIG. 45. FIG. 44 is a schematic diagram of a structure of the earmuff 32 of the headset 3 shown in FIG. 43. FIG. 45 is a schematic diagram of a deformed structure of the earmuff 32 of the headset 3 shown in FIG. 43.

In some embodiments, the earpad 322 is in a ring shape, and the earpad 322 and the ear housing 321 constitute a cavity 323. The cavity 323 is located on an inner side of the earpad 322. When a user wears the headset 3, an ear enters the cavity 323. The earpad 322 may be made of one or more of a polymer silicone material or sponge. The earmuff 32 further includes a first SMA component 324 and a second SMA component 325. The first SMA component 324 is embedded in the earpad 322. When the first SMA component 324 reaches phase transition temperature, the earpad 322 is driven to deform to an expanded form. The second SMA component 325 is embedded in the earpad 322. The second SMA component 325 and the first SMA component 324 are independent of each other. When the second SMA component 325 reaches phase transition temperature, the earpad 322 is driven to deform to a shrunk form.

As shown in a diagram on the left of FIG. 45, the earpad 322 is in the expanded form, and the cavity 323 has a first depth when the earpad 322 is in the expanded form. As shown in FIG. 45, the earpad 322 is in the shrunk form, and the cavity 323 has a second depth when the earpad 322 is in the shrunk form. The second depth is less than the first depth. In other words, when the first SMA component 324 reaches the phase transition temperature, the earpad 322 expands, and the cavity 323 becomes deeper; and when the second SMA component 325 reaches the phase transition temperature, the earpad 322 shrinks, and the cavity 323 becomes shallower.

In this embodiment, the earmuff 32 may control deformation statuses of the first SMA component 324 and the second SMA component 325, so that a height of the earpad 322 changes, and a depth of the cavity 323 changes, to adjust pressure between the earpad 322 and a surface of the ear of the user to a comfortable state. In this way, the headset 3 has high wearing comfort. In addition, through repeated deformation of the first SMA component 324 and the second SMA component 325, air in the cavity 323 of the earmuff 32 may also be exchanged with air in external space, to produce airflow. In this way, humid and hot air in the cavity 323 of the earmuff 32 is discharged, to reduce temperature and humidity in the cavity 323, alleviate a stuffy feeling during long-time wearing, and improve comfort.

Figure 46:
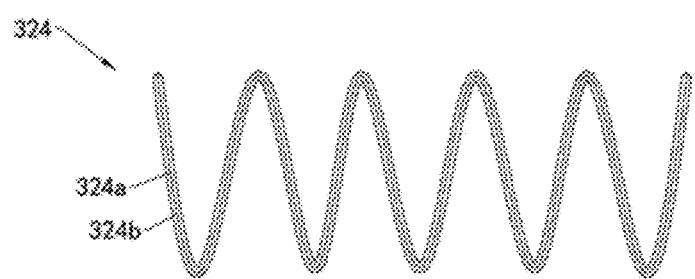
FIG. 46 is a schematic diagram of a structure of a first SMA component of a headset shown in FIG. 43.

FIG. 46 is a schematic diagram of a structure of the first SMA component 324 of the headset 3 shown in FIG. 43.

In some embodiments, the first SMA component 324 may include an SMA wire 324a and a composite material 324b wrapped around an outer side of the SMA wire 324a. The composite material 324b may include but is not limited to polymer silicone and the like. The first SMA component 324 may be shaped like a spring, a curved line or plate, a mosquito coil, or a spiral. For a design of the second SMA component 325, refer to the first SMA component 324. Details are not described herein again. If there is no conflict, for other solution content of the first SMA component 324 and the second SMA component 325, refer to the foregoing related descriptions of the SMA component 113 used in the earbud 11. Details are not described herein again.

Still refer to FIG. 43 and FIG. 44. In some embodiments, the earmuff 32 further includes a circuit board 326, a power supply chip (power management IC, also referred to as a power management chip) 327, a microcontroller unit (microcontroller unit, MCU) 328, and a pressure sensor (pressure sensor) 329. The circuit board 326 is mounted in the ear housing 321, and the power supply chip 327 and the microcontroller unit 328 are fastened to the circuit board 326. The power supply chip 327 is electrically connected to the first SMA component 324 and the second SMA component 325, and is configured to control deformation statuses of the first SMA component 324 and the second SMA component 325. The pressure sensor 329 is configured to detect pressure applied to the earpad 332. The microcontroller unit 328 is electrically connected to the pressure sensor 329 and the power supply chip 327. The pressure sensor 329 may be disposed at a junction between the earpad 332 and the ear housing 321, to detect the pressure applied to the earpad 332. For example, the earmuff 32 further includes a temperature and humidity sensor (temperature and humidity sensor) 3210, the temperature and humidity sensor 3210 is configured to detect temperature and humidity in the cavity 323, and the microcontroller unit 328 is electrically connected to the temperature and humidity sensor 3210. The temperature and humidity sensor 3210 may be disposed in the ear housing 321 or the earpad 332 at a position close to the cavity 323. In some embodiments, the temperature and humidity sensor 3210 may alternatively be a combination of a temperature sensor and a humidity sensor.

Figure 47:
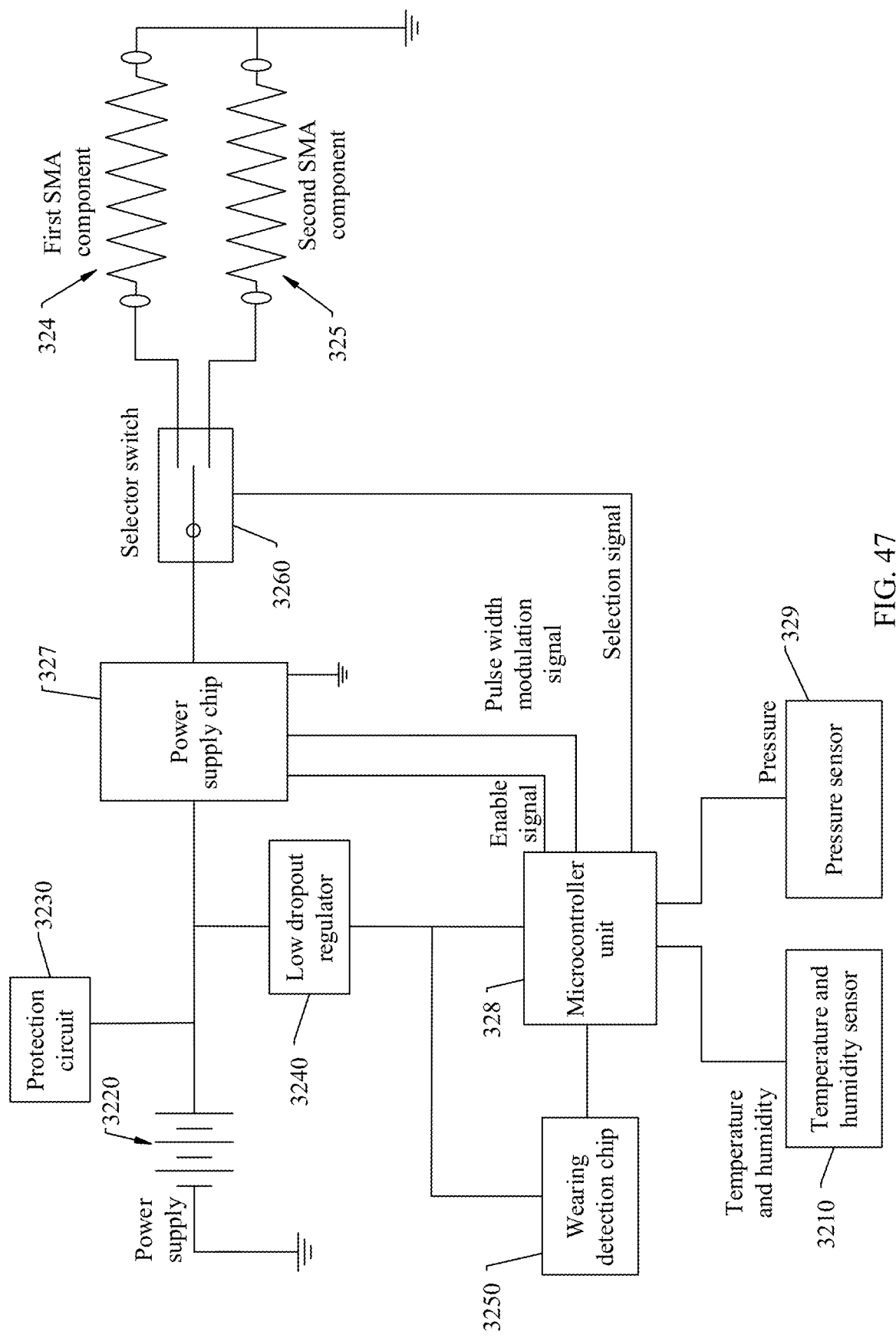
FIG. 47 is a schematic diagram of a circuit structure of a headset shown in FIG. 43 according to some embodiments.

FIG. 47 is a schematic diagram of a circuit structure of the headset 3 shown in FIG. 43 according to some embodiments.

In some embodiments, a circuit of the headset 3 includes the microcontroller unit 328, the power supply chip 327, the pressure sensor 329, the temperature and humidity sensor 3210, the first SMA component 324, and the second SMA component 325 that are described above. The circuit of the headset 3 may further include a power supply 3220, a protection circuit 3230, a low dropout regulator (low dropout regulator, LDO) 3240, a wearing detection chip 3250, and a selector switch 3260. The power supply 3220 is configured to supply power to the circuit of the headset 3, and the power supply 3220 may be electrically connected to the power supply chip 327 and the low dropout regulator 3240. For example, the power supply 3220 can provide an output voltage of 3.8 V. The protection circuit 3230 is connected between the power supply 3220 and the power supply chip 327, and is configured to protect the power supply 3220 and the power supply chip 327. For example, the protection circuit 3230 may be a transient diode (transient voltage suppressor, TVS) and/or an electro-static discharge (electro-static discharge, ESD) device. The low dropout regulator 3240 is connected to the power supply 3220, the microcontroller unit 328, and the wearing detection chip 3250, and is configured to supply power to the microcontroller unit 328 and the wearing detection chip 3250. A value of a voltage output by the low dropout regulator 3240 to the microcontroller unit 328 depends on an operating voltage of the microcontroller unit 328. A value of a voltage output by the low dropout regulator 3240 to the wearing detection chip 3250 depends on an operating voltage of the wearing detection chip 3250. For example, the low dropout regulator 3240 may provide an output voltage of 3.3 V. The wearing detection chip 3250 is electrically connected to the microcontroller unit 328, and the wearing detection chip 3250 is configured to detect whether the headset 3 is in a worn state. Both the temperature and humidity sensor 3210 and the pressure sensor 329 are connected to the microcontroller unit 328. The microcontroller unit 328 obtains the temperature and the humidity in the cavity 323 of the earmuff 32 from the temperature and humidity sensor 3210, and obtains the pressure applied to the earpad 332 of the earmuff 32 from the pressure sensor 329. The microcontroller unit 328 may send a pulse width modulation (pulse width modulation, PWM) signal and an enable (enable, EN) signal to the power supply chip 327. The enable signal is used to control switching-on and switching-off of the power supply chip 327 to supply or not supply power. Pulse width modulation can adjust an amplitude of an output voltage of the power supply chip 327 through a feedback loop of the power supply chip 327. The selector switch 3260 is connected between the power supply chip 327, and the first SMA component 324 and the second SMA component 325. The microcontroller unit 328 may further send a selection signal to the selector switch 3260, to control the selector switch 3260 to connect the power supply chip 327 to the first SMA component 324, or connect the power supply chip 327 to the second SMA component 325. The selector switch 3260 may also be referred to as a selector switch 3260 for the power supply 3220 (power switch). The first SMA component 324 may serve as a stretcher (stretcher) of the earmuff 32, and the second SMA component 325 may serve as a retractor (retractor) of the earmuff 32.

It can be understood that, in some other embodiments, compared with the foregoing embodiments, the circuit of the headset 3 may include more or fewer components, or the foregoing components may be split or combined. This is not strictly limited in this embodiment of this application.

Based on the foregoing solution, this application further provides a method for controlling deformation of the earmuff 32.

Figure 48:
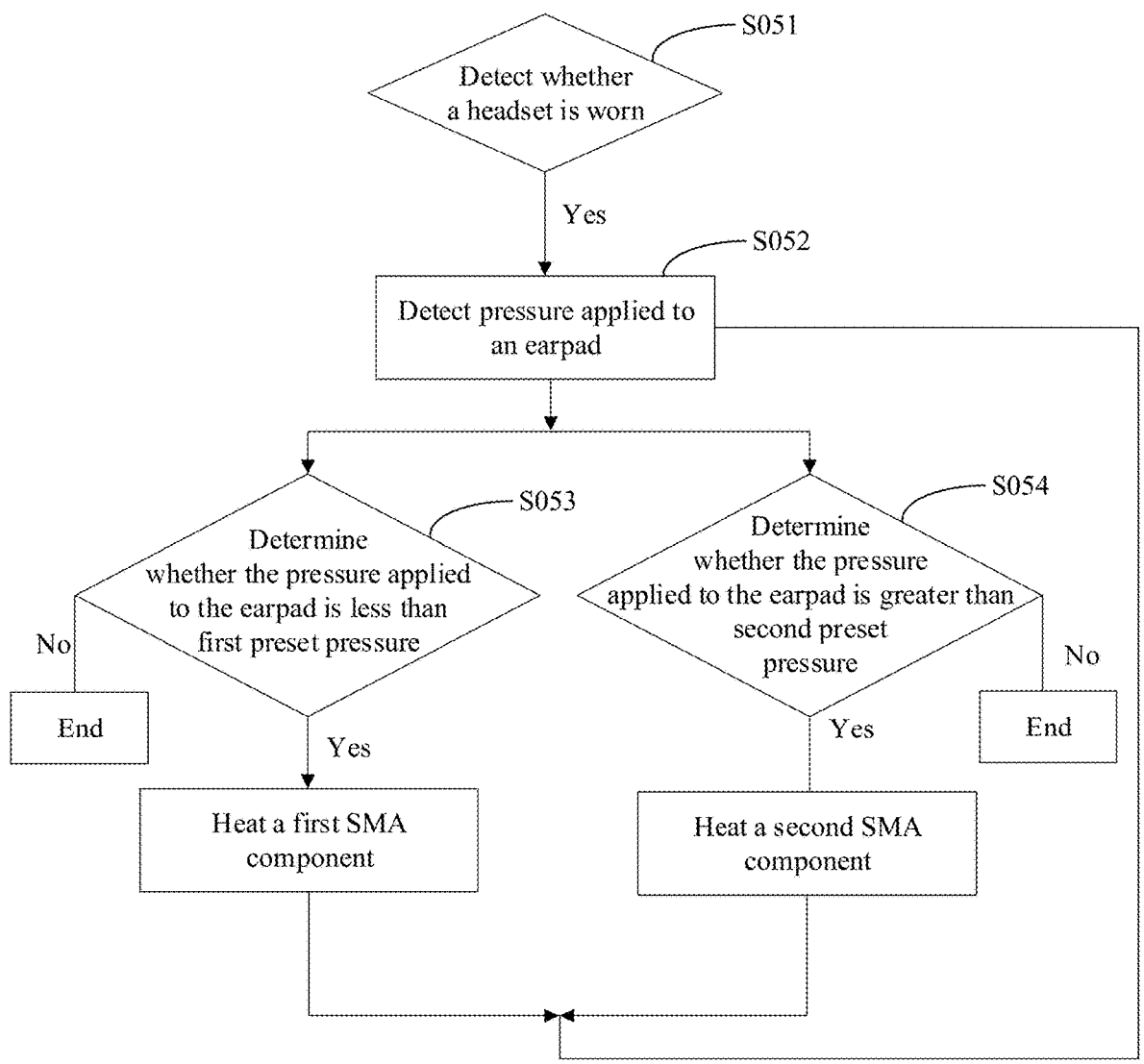
FIG. 48 is a first flowchart of a method for controlling deformation of an earmuff according to an embodiment of this application.

FIG. 48 is a first flowchart of a method for controlling deformation of the earmuff 32 according to an embodiment of this application.

The method for controlling deformation of the earmuff 32 includes the following steps.

Step S051: Detect whether the headset 3 is worn.

Whether the headset 3 is in a worn state may be detected by the wearing detection chip 3250.

Step S052: If the headset 3 is worn, detect pressure applied to the earpad 332.

The pressure applied to the earpad 332 may be detected by the pressure sensor 329.

Step S053: If the pressure applied to the earpad 332 is less than first preset pressure, heat the first SMA component 324, so that the first SMA component 324 drives the earpad 332 to expand.

When the pressure applied to the earpad 332 is less than the first preset pressure, wearing tightness of the earmuff 32 is low, and the earmuff 32 is likely to move or drop. Therefore, the first SMA component 324 is heated, so that the earpad 332 expands, wearing pressure between the earpad 332 and a user increases, the wearing tightness of the earmuff 32 increases, the earmuff 32 can be worn under comfortable wearing pressure, and the wearing is comfortable and stable.

Step S054: If the pressure applied to the earpad 332 is greater than second preset pressure, heat the second SMA component 325, so that the second SMA component 325 drives the earpad 332 to shrink. The second preset pressure is greater than the first preset pressure.

When the pressure applied to the earpad 332 is greater than the second preset pressure, wearing tightness of the earmuff 32 is excessively high, and wearing pressure between the earpad 332 and the user is quite high. Therefore, the second SMA component 325 is heated, so that the earpad 332 shrinks, the wearing pressure between the earpad 332 and the user decreases, the wearing tightness of the earmuff 32 decreases to an appropriate range, the earmuff 32 can be worn under comfortable wearing pressure, and the wearing is comfortable and stable.

Figure 49:
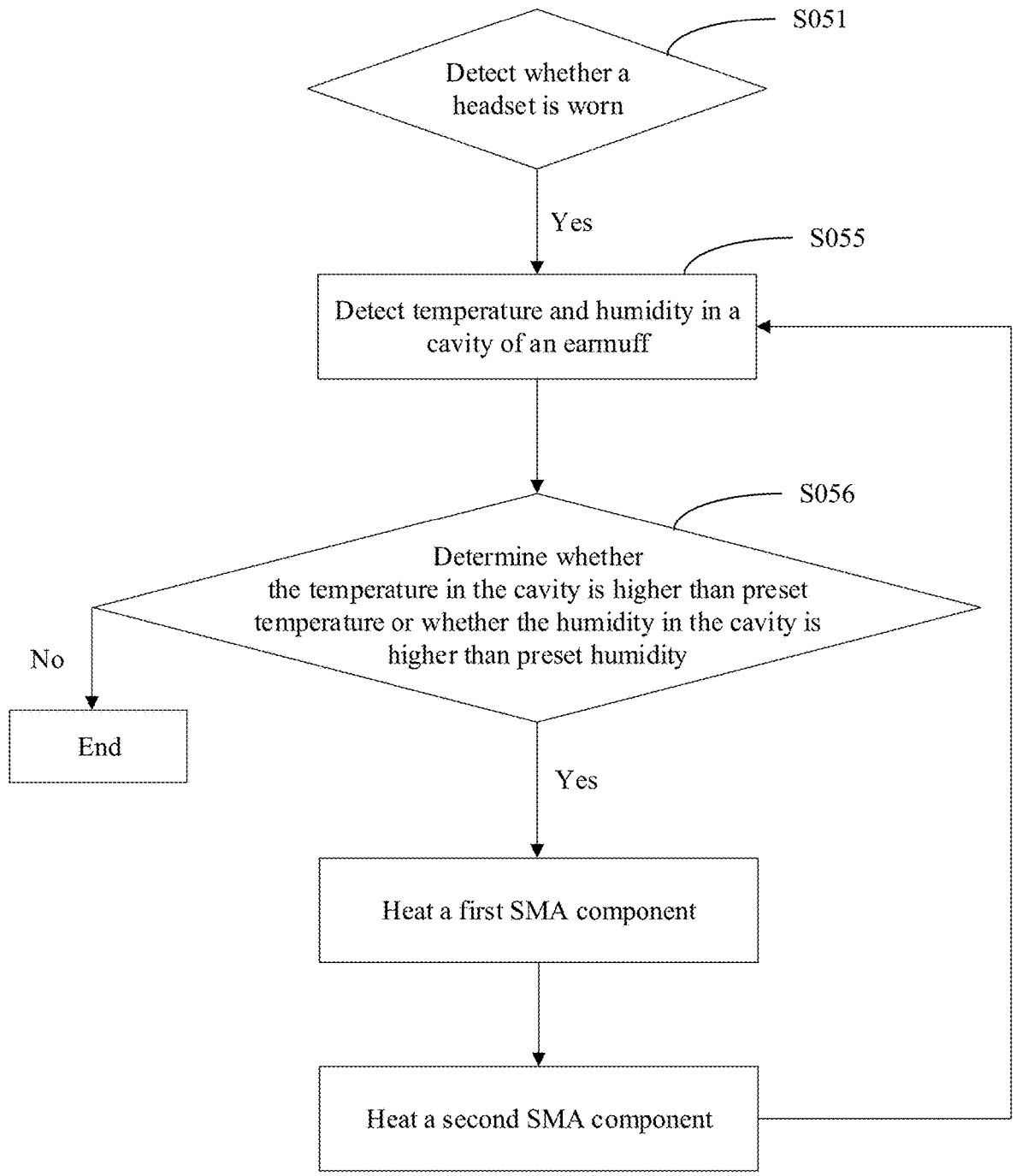
FIG. 49 is a second flowchart of a method for controlling deformation of an earmuff according to an embodiment of this application.

FIG. 49 is a second flowchart of a method for controlling deformation of the earmuff 32 according to an embodiment of this application.

The method for controlling deformation of the earmuff 32 further includes the following steps.

Step S055: If the headset 3 is in a worn state, detect temperature and humidity in the cavity 323 of the earmuff 32.

Step S056: If the temperature in the cavity 323 is higher than preset temperature or the humidity in the cavity 323 is higher than preset humidity, sequentially heat the first SMA component 324 and the second SMA component 325, so that the first SMA component 324 first drives the earpad 332 to expand, and then the second SMA component 325 drives the earpad 332 to shrink, and the temperature and the humidity in the cavity 323 decrease.

When the temperature in the cavity 323 is higher than the preset temperature, air in the cavity 323 of the earmuff 32 is excessively hot. When the humidity in the cavity 323 is higher than the preset humidity, the air in the cavity 323 of the earmuff 32 is excessively humid. The user feels uncomfortable due to excessively high temperature and/or humidity of the air in the cavity 323. In this embodiment, the first SMA component 324 and the second SMA component 325 are sequentially heated, so that the earpad 332 first expands and then shrinks, a depth of the cavity 323 changes, and air in the cavity 323 can be exchanged with external air. In this way, humid and hot air in a region, in the cavity 323, that is in contact with skin of the user is discharged, humidity and temperature of air in the cavity 323 decrease, and wearing comfort is improved.

In step S056, the action of "sequentially heating the first SMA component 324 and the second SMA component 325" may be performed once, or the action of "sequentially heating the first SMA component 324 and the second SMA component 325" may be performed a plurality of times. This is not strictly limited in this embodiment of this application. In some embodiments, alternatively, the second SMA component 325 may be first heated, so that the earpad 332 first shrinks, and then the action of "sequentially heating the first SMA component 324 and the second SMA component 325" is performed once or a plurality of times. This is not strictly limited in this embodiment of this application.

The headset 3 may cyclically perform, based on a specific time cycle, the method for controlling deformation of the earmuff 32, so that the headset 3 can have high wearing comfort for a long time, and the user can wear and use the headset 3 for a long time.

In this application, an adaptive custom earbud solution is designed for an in-ear headset, to improve wearing comfort when a user wears the headset. The solution has the following advantages: Only one type of earbud is used to replace three types (large-sized, medium-sized, and small-sized) of standard earbuds that are available on the market for selection by users. Only one type of earbud is used to adapt to all sizes of ear canals of users, with wearing comfort and wearing stability. Acoustic leakage caused by improper wearing by a user can be avoided, and therefore sound quality and noise cancellation effect are ensured.

In this application, an adaptive custom earmuff solution is further designed for a head-mounted headset, to improve wearing comfort when a user wears the headset. The solution has the following advantages: Pressure applied by an earpad to a human ear region can be adjusted to reach a comfortable range, to improve comfort and extend wearing time. A depth of a cavity of an earmuff is adjusted to produce airflow, to discharge humid and hot air in a region, in the cavity, that is in contact with skin, alleviate a stuffy feeling, and improve comfort.

Figure 50:
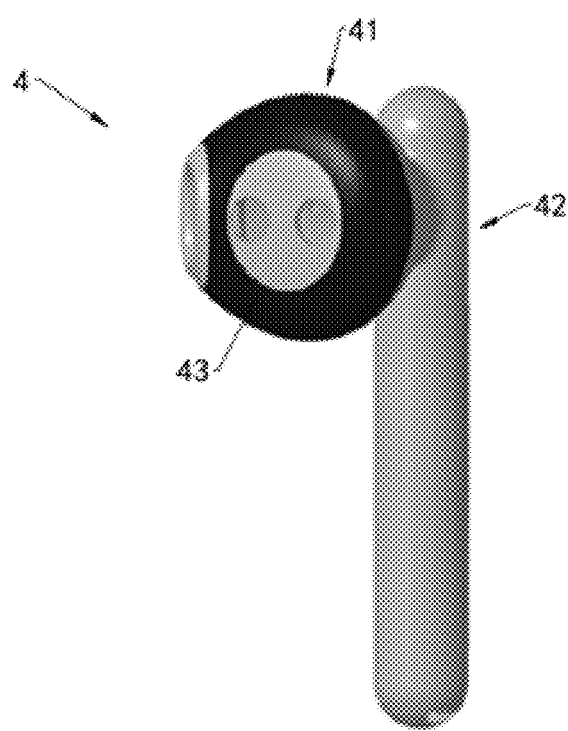
FIG. 50 is a schematic diagram of a structure of another headset according to an embodiment of this application.

FIG. 50 is a schematic diagram of a structure of another headset 4 according to an embodiment of this application.

This application further provides a design of an adaptive headset 4 based on pressure sensing and feedback. The headset 4 includes an ear housing 41 and an ear handle 42 fastened to the ear housing 41. A pressure sensor 43 may be applied to an outer surface of the ear housing 41, to sense pressure. When a user wears the headset 4, the outer surface of the ear housing 4 is in contact with ear skin of the user, and the pressure sensor 43 senses wearing pressure.

Figure 51:
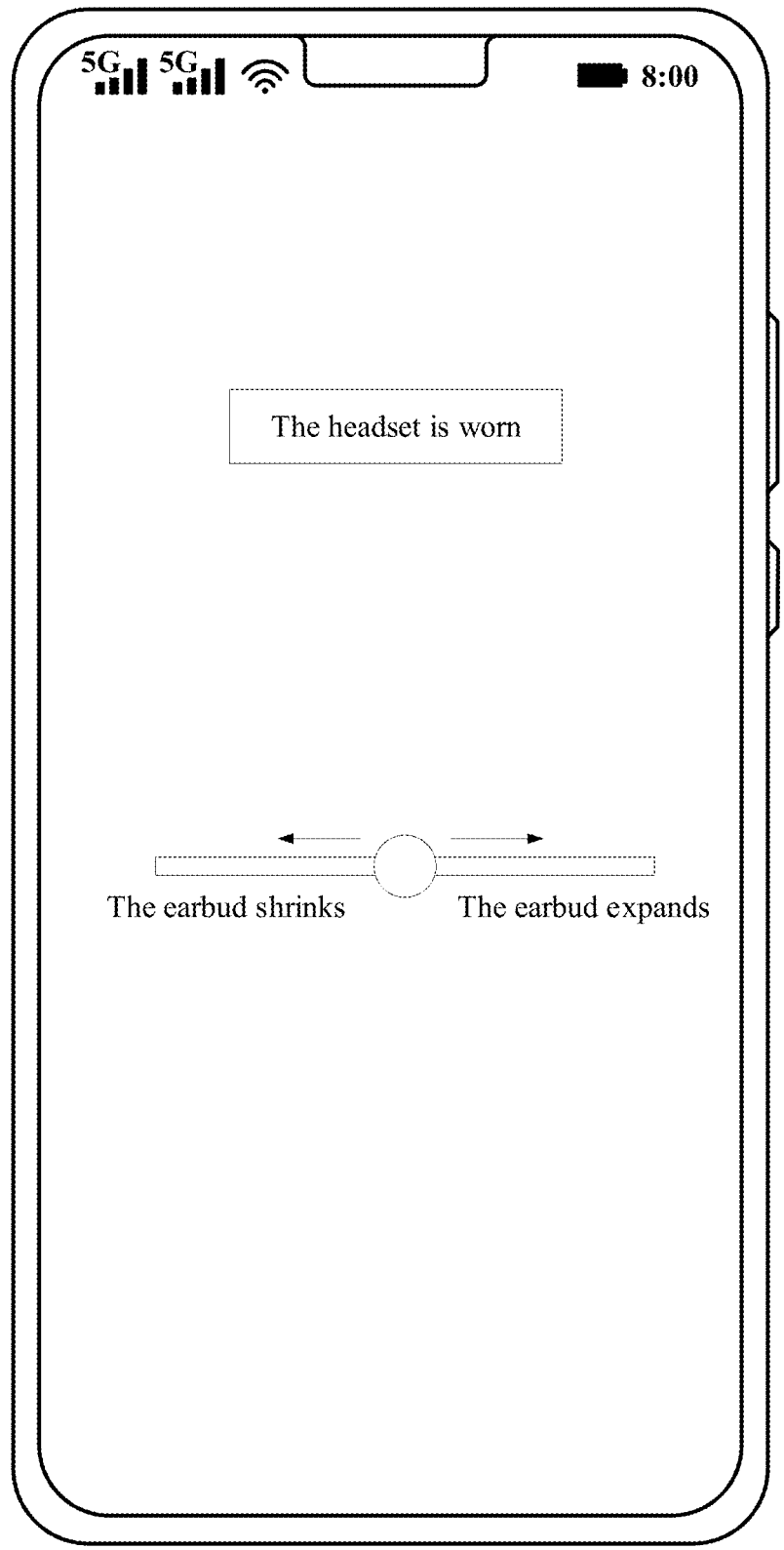
FIG. 51 is a first diagram of a display interface of a terminal according to an embodiment of this application.
Figure 52:
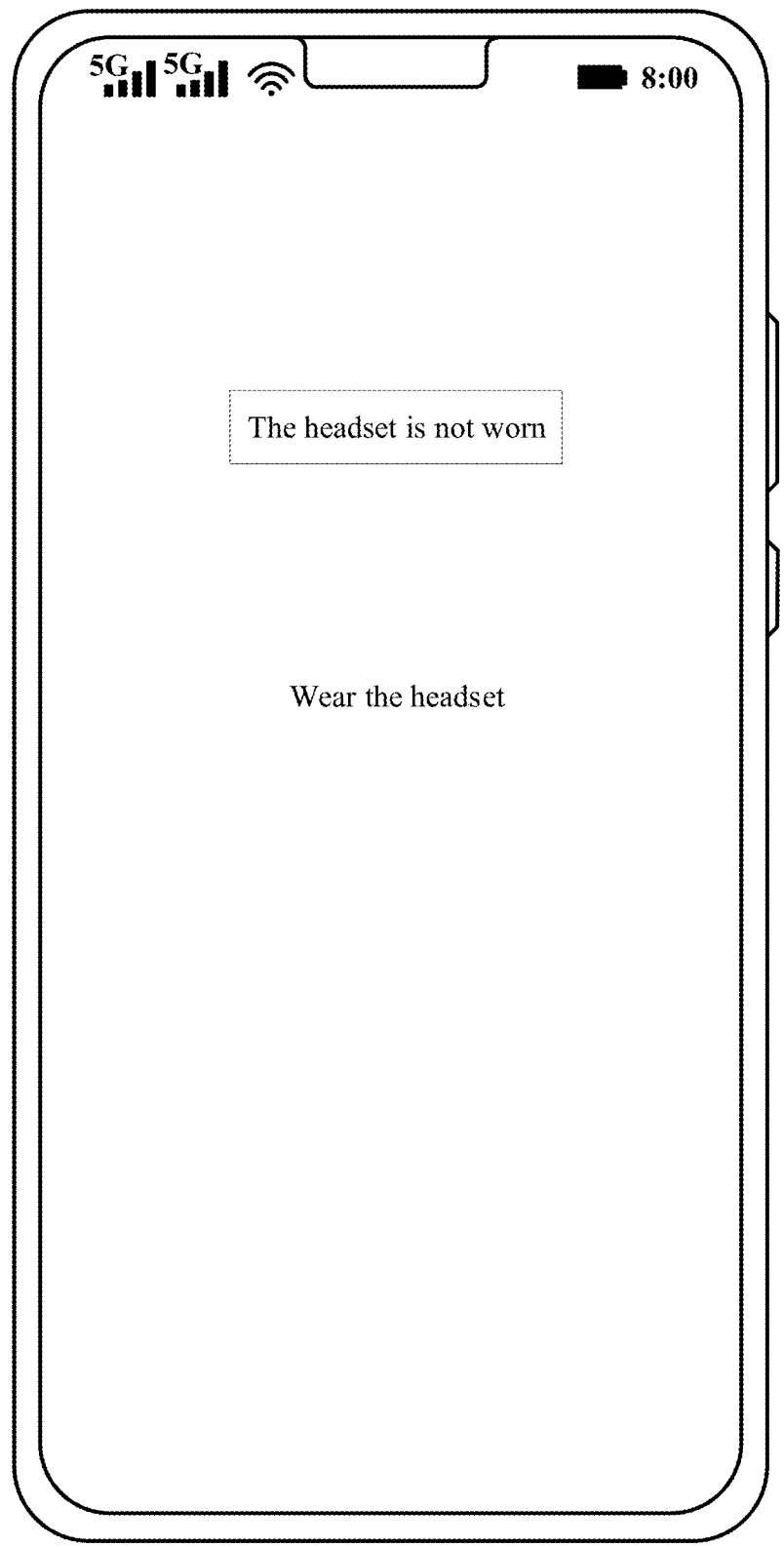
FIG. 52 is a second diagram of a display interface of a terminal according to an embodiment of this application.

Refer to FIG. 51 and FIG. 52. FIG. 51 is a first diagram of a display interface of a terminal according to an embodiment of this application. FIG. 52 is a second diagram of a display interface of a terminal according to an embodiment of this application.

In some embodiments, the headset 1, 3, or 4 in the foregoing embodiments is communicatively connected to the terminal 100. The headset 1, 3, or 4 may be provided with a wireless communication module, for example, a wireless local area network (wireless local area network, WLAN) (for example, a wireless fidelity (wireless fidelity, Wi-Fi) network) module, a Bluetooth (Bluetooth, BT) module, a near field communication (near field communication, NFC) module, or an infrared (infrared, IR) module. The wireless communication module may be electrically connected to a microcontroller unit of the headset 1, 3, or 4. The terminal 100 may be provided with a wireless communication module, for example, a WLAN module, a Bluetooth module, an NFC module, or an IR module. The wireless communication module may be electrically connected to a processor of the terminal 100. The wireless communication module of the headset 1, 3, or 4 is wirelessly connected to the wireless communication module of the terminal 100, to implement communication.

For example, as shown in FIG. 51, when a user wears the headset, a wearing detection chip of the headset detects that the headset is in a worn state, and sends information to the terminal, and the terminal displays prompt text or a prompt pattern like "The headset is worn" on a display interface, to notify the user that the headset is in the worn state. The terminal may further display, on the display interface, a pattern like an adjustment bar or a button for controlling deformation of an earbud. The terminal sends corresponding operation information to the headset in response to a touch operation performed by the user. The headset controls deformation of an SMA component based on the operation information, so that the earbud shrinks or expands, and the earbud can better adapt to a shape of an ear canal of the user according to a wearing requirement of the user. Therefore, wearing comfort is high. When the user wears the headset, if the user feels that wearing of the headset is loose, the user may move a button or a touch button on the adjustment bar on the terminal, to input an operation instruction corresponding to an earbud expansion action; or if the user feels that wearing of the headset is tight, the user may move the button or the touch button on the adjustment bar on the terminal, to input an operation instruction corresponding to an earbud shrinkage action. In some other embodiments, the terminal or the headset may further receive a voice instruction, and control the earbud to shrink or expand in response to the voice instruction.

For example, as shown in FIG. 52, when the headset is communicatively connected to the terminal and the wearing detection chip of the headset detects that the headset is not in a worn state or a wearing posture is incorrect, the wearing detection chip may send related information to the terminal. The terminal displays prompt text or a prompt pattern like "The headset is not worn" on the display interface, and the terminal may further prompt, on the display interface, the user to wear the headset.

In some other embodiments, there may be more solutions for interaction between the headset, the terminal, and the user. This is not strictly limited in this embodiment of this application.

In some embodiments of this application, the headset case of the headset assembly may further include an indicator or a display. When the headset is placed in the headset case, the headset case may detect a status of the headset, and provide a prompt through the indicator or the display. For example, the headset case may detect that the headset is in a shrunk form, in an expanded form, in a process of shrinkage, or in a process of expansion. Corresponding to different statuses or processes of the headset, the indicator may provide a corresponding prompt in a plurality of indication manners such as steady-on, fast blinking, slow blinking, and double blinking, and the display may display different patterns or text.

In some embodiments, the headset case may be further provided with a control assembly like a button or a touch-screen. The user may input an operation instruction through the control assembly, and the headset case or the headset controls, according to the operation instruction, expansion or shrinkage of the SMA component of the earbud.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A headset comprising:
an ear housing; and
an earbud,
wherein the earbud comprises:
a base fastened to the ear housing;
an earbud body comprising a stationary portion and a contact portion, wherein the contact portion is disposed around the stationary portion, the top of the contact portion is connected to the top of the stationary portion, the bottom of the stationary portion is fastened to the base, and the earbud body is made of an elastic material; and
an SMA component embedded in the earbud body in an encircling manner,
wherein when a user wears the headset, the earbud body at least partially fits into an ear canal of the user, and the SMA component deforms at ear temperature, to drive the contact portion to abut against an ear canal wall of the user,
wherein the SMA component has a phase transition temperature that falls in a range of the temperature of the human body.

2. The headset according to claim 1, wherein the SMA component has an expanded form in an environment in which temperature is higher than or equal to the phase transition temperature, and the SMA component drives the earbud body to deform to an expanded form.

3. The headset according to claim 2, wherein the phase transition temperature falls in a range of 36° C. to 40° C.

4. The headset according to claim 2, wherein the SMA component comprises a plurality of SMA wires, the plurality of SMA wires are arranged at spacings in a circumferential direction of the earbud body, and each SMA wire extends from the bottom of the stationary portion to the bottom of the contact portion through the top of the stationary portion and the top of the contact portion.

5. The headset according to claim 4, wherein the SMA wire is a single-stranded wire.

6. The headset according to claim 4, wherein the SMA wire is a double-stranded wire, and the two strands are connected to each other at the bottom of the contact portion.

7. The headset according to claim 3, wherein the SMA component is a continuous single SMA wire, the SMA component comprises a plurality of deformable parts, the plurality of deformable parts are arranged in a circumferential direction of the earbud body, and each deformable part extends from the bottom of the stationary portion to the bottom of the contact portion through the top of the stationary portion and the top of the contact portion.

8. The headset according to claim 2, wherein the SMA component comprises a first SMA wire and a second SMA wire, both the first SMA wire and the second SMA wire are continuous SMA wires, and the first SMA wire and the second SMA wire are arranged in a nested manner and are spaced apart from each other;

the first SMA wire comprises a plurality of first deformable parts, the plurality of first deformable parts are arranged in a circumferential direction of the earbud body, and each first deformable part extends from the bottom of the stationary portion to the bottom of the contact portion through the top of the stationary portion and the top of the contact portion; and the second SMA wire comprises a plurality of second deformable parts, the plurality of second deformable parts are arranged in the circumferential direction of the earbud body, and each second deformable part extends from the bottom of the stationary portion to the bottom of the contact portion through the top of the stationary portion and the top of the contact portion.

9. The headset according to claim 2, wherein the SMA component is a continuous single SMA wire, the SMA component is located in the contact portion, and the SMA component is shaped like a spiral.

10. The headset according to claim 1, wherein the SMA component comprises:

a first SMA wire with first phase transition temperature, wherein the first SMA wire has an expanded form in an environment in which temperature is higher than or equal to the first phase transition temperature, and the first SMA wire drives the earbud body to deform to an expanded form; and a second SMA wire with second phase transition temperature, wherein the second phase transition temperature is higher than the first phase transition temperature, the second SMA wire has a shrunk form in an environment in which temperature is higher than or equal to the second phase transition temperature, and the second SMA wire drives the earbud body to deform to a shrunk form.

11. The headset according to claim 1, wherein the contact portion comprises a plurality of contact regions and a plurality of recessed regions, the contact regions and the recessed regions are alternately arranged around the stationary portion, and the recessed regions are closer to the stationary portion relative to the contact regions.

12. The headset according to claim 1, wherein the earbud further comprises a conductor, the conductor is fastened to the base, and the SMA component is electrically connected to the conductor.

13. A headset comprising:
a headband; and
two earmuffs, wherein the two earmuffs are respectively connected to two ends of the headband; and
wherein each of the earmuffs comprises:
an ear housing, connected to the headband;
an earpad, fastened to the ear housing, wherein the earpad is made of a flexible material or an elastic material;
a first SMA component, embedded in the earpad, wherein when the first SMA component reaches phase transition temperature, the earpad is driven to deform to an expanded form; and
a second SMA component, embedded in the earpad, wherein the second SMA component and the first SMA component are independent of each other, and when the second SMA component reaches phase transition temperature, the earpad is driven to deform to a shrunk form.

14. The headset according to claim 13, wherein the earpad is has a ring shape, the earpad and the ear housing constitute a cavity, the cavity has a first depth when the earpad is in the expanded form, the cavity has a second depth when the earpad is in the shrunk form, and the second depth is less than the first depth.

15. The headset according to claim 14, wherein the earmuff further comprises a circuit board, a power supply chip, a microcontroller unit, and a pressure sensor, the circuit board is mounted in the ear housing, the power supply chip and the microcontroller unit are fastened to the circuit board, the power supply chip is electrically connected to the first SMA component and the second SMA component, and is configured to control a deformation status of the first SMA component and the second SMA component, the pressure sensor is configured to detect pressure applied to the earpad, and the microcontroller unit is electrically connected to the pressure sensor and the power supply chip.

16. The headset according to claim 15 wherein the earmuff further comprises a temperature and humidity sensor, the temperature and humidity sensor is configured to detect temperature and humidity in the cavity, and the microcontroller unit is electrically connected to the temperature and humidity sensor.

17. A method of manufacturing an earbud, comprising:
performing injection molding and curing to form a base;
performing injection molding to form a first soft colloid, wherein the first soft colloid is connected to the base;
curing the first soft colloid to form a first part of an earbud body, wherein the first part of the earbud body has a mounting slot;
mounting the SMA component in the mounting slot;
performing injection molding to form a second soft colloid, wherein the second soft colloid is connected to the first soft colloid, and the second soft colloid covers the mounting slot; and
curing the second soft colloid to form a second part of the earbud body, and assembling the second part of the earbud body and the first part of the earbud body to form the earbud body, wherein the earbud body is wrapped around the SMA component.

18. The method according to claim 17, wherein the first soft colloid and the second soft colloid are made of an ultraviolet cured soft rubber material; and
in the manufacturing method, the first soft colloid and the second soft colloid are cured through ultraviolet curing.

19. The method according to claim 18, wherein the ultraviolet cured soft rubber material is a silicone rubber material, a polyurethane material, or a fluorine rubber material, and comprises a photoinitiator.

20. The method according to claim 18, further comprising:
before performing injection molding to form the first soft colloid, applying a first adhesive to the base;
during curing of the first soft colloid, activating the first adhesive;
before mounting the SMA component in the mounting slot, applying a second adhesive to the SMA component;
before performing injection molding to form the second soft colloid, applying a third adhesive to the first part of the earbud body; and during curing of the second soft colloid, activating the second adhesive and the third adhesive.

21. The method according to claim 20, wherein the first adhesive, the second adhesive, and the third adhesive are ultraviolet cured adhesives, and the method comprises activating the first adhesive, the second adhesive, and the third adhesive by ultraviolet light.

\* \* \* \* \*